(12) United States Patent
Bischoff et al.

(10) Patent No.: US 9,948,782 B2
(45) Date of Patent: Apr. 17, 2018

(54) HYBRID CLOUD ARCHITECTURE WITH OPTIMIZED LOCAL DELIVERY

(71) Applicant: GENESYS TELECOMMUNICATIONS LABORATORIES, INC., Daly City, CA (US)

(72) Inventors: Brian Bischoff, Raleigh, NC (US); Gregg Kerlin, Los Gatos, CA (US); Henry Lum, Markham (CA); Donald Huovinen, Jacksonville, FL (US); Tamal Islam, London (GB); Terry Stocking, San Ramon, CA (US); David H. Anderson, Durham, NC (US); Galina Kovalenko, Walnut Creek, CA (US); Bernard Bretherton, Phoenix, AZ (US); Vyacheslav Sayko, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 520 days.

(21) Appl. No.: 14/069,336

(22) Filed: Oct. 31, 2013

(65) Prior Publication Data
US 2014/0280720 A1    Sep. 18, 2014

Related U.S. Application Data

(63) Continuation-in-part of application No. 13/843,737, filed on Mar. 15, 2013.
(Continued)

(51) Int. Cl.
*H04M 3/00* (2006.01)
*H04M 3/523* (2006.01)
(Continued)

(52) U.S. Cl.
CPC ........ *H04M 3/5237* (2013.01); *G06F 9/5072* (2013.01); *H04L 65/1046* (2013.01);
(Continued)

(58) Field of Classification Search
CPC ............. H04M 11/04; H04M 2242/04; H04M 3/5116; H04M 7/006; H04M 7/1205
(Continued)

(56) References Cited

U.S. PATENT DOCUMENTS 6,014,439 A    1/2000  Walker et al.
6,766,011 B1   7/2004  Fromm
(Continued)

FOREIGN PATENT DOCUMENTS

WO    2004017584 A1    2/2004

OTHER PUBLICATIONS

European Supplementary Search Report for Application No. EP14763098.2, dated Feb. 19, 2016, 6 pages.
(Continued)

*Primary Examiner* — Solomon Bezuayehu
(74) *Attorney, Agent, or Firm* — Lewis Roca Rothgerber Christie LLP

(57) ABSTRACT

A system and method for optimized rendering of contact center services in a hybrid operations environment. A processor in a first operations environment receives a message transmitted by a first contact center resource relating to a contact center service. The message is forwarded to the processor by an edge device coupled to a second operations environment different from the first operations environment. The edge device is configured to hide from the message identification of a location of the contact center resource. Despite such hiding, the processor identifies the location of the first contact center resource based on identification information that the processor retrieves from the message.
(Continued)

The processor selects a second contact center resource based on the identified location of the first contact center resource for providing the contact center service.

20 Claims, 36 Drawing Sheets

Related U.S. Application Data

(60) Provisional application No. 61/816,693, filed on Apr. 26, 2013, provisional application No. 61/822,902, filed on May 13, 2013.

(51) Int. Cl.
| | | |
|---|---|---|
| *G06F 9/50* | (2006.01) | |
| *H04L 29/06* | (2006.01) | |
| *H04M 1/64* | (2006.01) | |
| *H04M 3/42* | (2006.01) | |

(52) U.S. Cl.
CPC ...... *H04L 65/1069* (2013.01); *H04L 65/1006* (2013.01); *H04L 65/1036* (2013.01); *H04L 65/1073* (2013.01); *H04M 3/42008* (2013.01); *H04M 3/42221* (2013.01)

(58) Field of Classification Search
USPC .......................................... 379/88.01–88.19
See application file for complete search history.

(56) References Cited

U.S. PATENT DOCUMENTS

| | | | |
|---|---|---|---|
| 6,992,974 | B1 | 1/2006 | Tripathi |
| 7,212,625 | B1 | 5/2007 | McKenna et al. |
| 7,330,463 | B1 | 2/2008 | Bradd et al. |
| 7,613,170 | B1 | 11/2009 | Grabelsky et al. |
| 7,626,979 | B1 * | 12/2009 | Bugenhagen ....... H04L 65/1046 370/238 |
| 7,924,812 | B1 | 4/2011 | Schlesener et al. |
| 8,477,941 | B1 * | 7/2013 | Dhanoa ............. H04W 36/0038 380/270 |
| 8,855,287 | B1 | 10/2014 | Bates |
| 2001/0024497 | A1 | 9/2001 | Campbell et al. |
| 2003/0007625 | A1 * | 1/2003 | Pines ................ H04M 3/42008 379/223 |
| 2003/0026245 | A1 * | 2/2003 | Ejzak ..................... H04L 12/66 370/352 |
| 2003/0031302 | A1 | 2/2003 | Resuta |
| 2003/0097438 | A1 | 5/2003 | Bearden et al. |
| 2003/0165231 | A1 | 9/2003 | Singh et al. |
| 2004/0032862 | A1 | 2/2004 | Schoeneberger et al. |
| 2004/0109555 | A1 | 6/2004 | Williams |
| 2006/0002403 | A1 | 1/2006 | Bettis et al. |
| 2006/0067506 | A1 | 3/2006 | Flockhart et al. |
| 2006/0072557 | A1 | 4/2006 | Croak et al. |
| 2006/0221941 | A1 | 10/2006 | Kishinsky et al. |
| 2006/0270413 | A1 | 11/2006 | Matteo et al. |
| 2007/0003024 | A1 * | 1/2007 | Olivier .................. H04M 11/04 379/45 |
| 2007/0047711 | A1 | 3/2007 | Florkey et al. |
| 2007/0217589 | A1 | 9/2007 | Martin et al. |
| 2008/0069011 | A1 | 3/2008 | Sekaran et al. |
| 2008/0171559 | A1 * | 7/2008 | Frank ..................... G06Q 30/02 455/456.5 |
| 2008/0205378 | A1 | 8/2008 | Wyss et al. |
| 2008/0260137 | A1 | 10/2008 | Poi et al. |
| 2009/0168986 | A1 | 7/2009 | Jackson et al. |
| 2009/0227253 | A1 * | 9/2009 | Hwang .................. H04W 8/10 455/432.2 |
| 2010/0070563 | A1 | 3/2010 | Baker et al. |
| 2011/0161005 | A1 * | 6/2011 | Hajianpour ....... G06F 17/30241 701/408 |
| 2011/0213860 | A1 | 9/2011 | Ezerzer et al. |
| 2012/0078609 | A1 | 3/2012 | Chaturvedi et al. |
| 2012/0148040 | A1 * | 6/2012 | Desai .................... H04M 3/493 379/265.13 |
| 2012/0195415 | A1 | 8/2012 | Wyss et al. |
| 2012/0224681 | A1 | 9/2012 | Desai et al. |
| 2013/0003537 | A1 | 1/2013 | Khasnabish |
| 2013/0034025 | A1 | 2/2013 | Simoes et al. |
| 2013/0083908 | A1 | 4/2013 | Kolesov et al. |
| 2013/0190013 | A1 | 7/2013 | Moshrefi et al. |
| 2013/0202101 | A1 | 8/2013 | LaBoyteaux et al. |
| 2013/0291043 | A1 | 10/2013 | Xie et al. |
| 2013/0303130 | A1 | 11/2013 | Dhodapkar |
| 2013/0339781 | A1 | 12/2013 | Wamorkar et al. |
| 2014/0032636 | A1 | 1/2014 | Nelson |
| 2014/0181898 | A1 | 6/2014 | Apparao et al. |
| 2014/0269258 | A1 | 9/2014 | Bischoff et al. |
| 2014/0270119 | A1 | 9/2014 | Bischoff et al. |
| 2014/0270142 | A1 | 9/2014 | Bischoff et al. |
| 2014/0277598 | A1 | 9/2014 | Bischoff et al. |
| 2014/0280720 | A1 | 9/2014 | Bischoff et al. |
| 2015/0201071 | A1 * | 7/2015 | Gainsboro .......... H04M 3/2281 379/88.02 |

OTHER PUBLICATIONS

International Preliminary Report on Patentability and Written Opinion of the International Searching Authority for PCT/US2014/029771, dated Sep. 24, 2015, 13 pages.

Korean English Translation of Office Action for Application No. 10-2015-7029894, dated Jan. 18, 2017, 3 pages.

Chinese Patent Office action with English Translation for Application No. 201480028429.X, dated Mar. 21, 2017, 14 pages.

Chinese Patent Office Second Office Action with English Translation for Application No. 201480028429.X, dated Nov. 9, 2017, 11 pages.

Korean Intellectual Property Office Notice of Allowance with English Translation for Application No. 10-2015-7029894, dated Nov. 10, 2017, 6 pages.

* cited by examiner

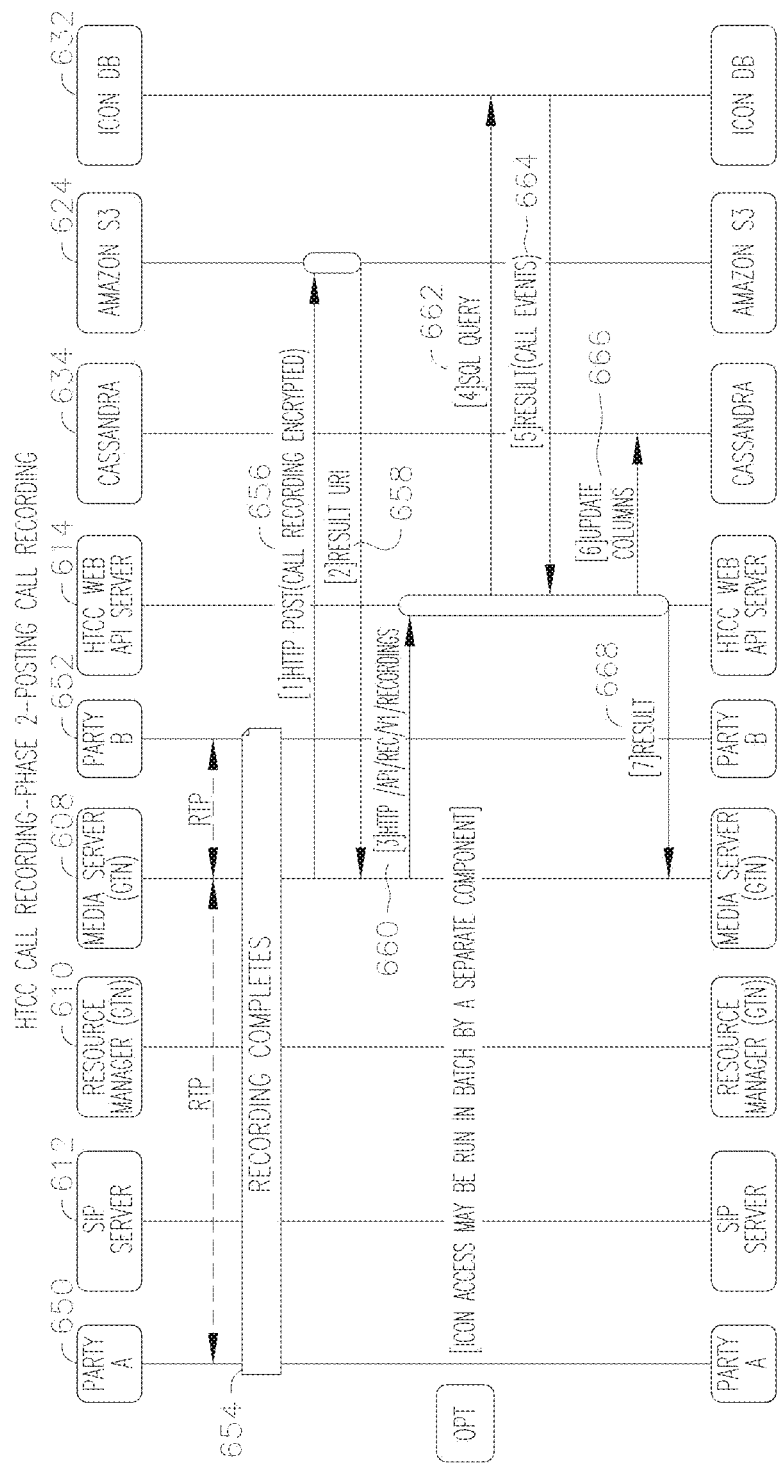

```
{
 "recordings" : [{
   "url" :
"http://mybucket.s3.amazonaws.com/00PV5Q27MG8A88VNE49362L      ~ 1002
AES000013.wav",
   "type" : "audio/wav",
   "start" : "2013-02-06T10:20:58.002Z",  ~ 1004
   "end" : "2013-02-06T10:29:52.234Z",  ~ 1006
   "duration" : "534s",  ~ 1008
   "parameters" : {
     "record" : "source",
     "id" : "00PV5Q27MG8A88VNE49362LAES000013",
     "recorddn" : "3222",                                 } 1010
     "key1" : "value1",
     "key2" : "value2"
   },
   "metadata" : {
     "uuid":"00PV5Q27MG8A88VNE49362LAES000013",
     "ani":"1234",  ~ 1014
     "dnis":"9999",  ~ 1016                              } 1012
     "agentdn":"2222",  ~ 1018
     "datetime": " 2013-02-06T10:20:58.002Z" ~1020
   }
   "masks" : {
     {"time":"2013-02-06T10:23:10.034Z","type":"paused"},   } 1022
     {"time":"2013-02-06T10:23:23.124Z","type":"resume"}
   },
   "pkcs7" : "..." // base64 string  ~ 1024
 }],
 "metadata" : {
   "uuid" : "00PV5Q27MG8A88VNE49362LAES000013"
 }
}
```

FIG. 16

```
{
  "metadata" : {
    "uuid" :
    "00PV5Q27MG8AB8VNE49362LAES000013",
    "ANI" : "+14152213344",
    "DNIS" : "+18007774455",
    "start" : "2012-12-18T13:45:32-08:00",
    "end" : "2012-12-18T14:15:36-08:00",
  },
  "recordings" : [
  {
    "url" : "https://url.to.access.the.voice.file.here",
    "start" : "2012-12-18T13:45:32-08:00",
    "end" : "2012-12-18T14:15:36-08:00"
  }
  ],
  "events" : [
  {
    "timestamp" : "2012-12-18T13:45:32-08:00",
    "DN" : "+1415221344",
    "event" : "Connected",
  },
  {
    "timestamp" : "2012-12-18T13:45:32-08:00",
    "DN" : "+16501112222 ",
    "firstname" : "Alice",
    "lastname" : "Amber",
    "event" : "Connected",
  },
  ...
  {
    "timestamp" : "2012-12-18T14:15:36-08:00",
    "DN" : "+1415221344",
    "name" : "EXTERNAL",
    "event" : "Disconnected",
  },
  ]
}
```

FIG. 17

| Time | Number | Name | Event | Call tags |
|---|---|---|---|---|
| 13:45:32 | (415) 221 3344 | EXTERNAL | Joined the call | |
| 13:45:32 | (650) 111 2222 | Alice Amber | Joined the call | |
| 13:46:53 | (650) 111 2222 | Alice Amber | Added tag | CREDIT_CARD |
| 13:46:28 | (650) 111 2222 | Alice Amber | Added tag | AUTOPAY |
| 13:48:52 | (519) 222 3333 | Bob Brown | Joined the call | |
| 13:51:04 | (519) 222 3333 | Bob Brown | Disconnected | |
| 13:53:41 | (650) 111 2222 | Alice Amber | Added tag | PERSONAL_CHECKING |
| 13:53:49 | (925) 333 4444 | Charlie Crimson | Joined the call | |
| 13:53:49 | (650) 111 2222 | Alice Amber | Disconnected | |
| 14:15:36 | (415) 221 3344 | EXTERNAL | Disconnected | |
| 14:15:36 | (925) 333 4444 | Charlie Crimson | Disconnected | |

FIG. 18

```
{
  "metadata" : {
    "uuid" :
"01LF2H0T2088D72N0KGB82LAES000OJ7",
    "ANI" : "+14152213344",
    "DNIS" : "+1800774455"
  },
  "recordings" : [
    {
      "url" :
"https://url.to.access.the.voice.file.here"
    }
  ],
  "events" : [...],
  "next" :
"/api/rec/v1/recording/00RP30KH7088L11C08GB82
LAES00030T"
}
```

FIG. 19

```
{
  "metadata" : {
    "uuid" :
"00RP30KH7088L1IC08GB82LAES00030T",
    "ANI" : "+14152213344",
    "DNIS" : "+18007774455"
  },
  "recordings" : [
    {
      "url" :
"https://url.to.access.the.voice.file.here"
    }
  ],
  "events" : [...],
  "prev" :
"/api/rec/v1/recording/01LF2H0T2088D72N0KGB8
2LAES000J7"
}
```

FIG. 20

HYBRID CLOUD ARCHITECTURE WITH OPTIMIZED LOCAL DELIVERY

CROSS-REFERENCE TO RELATED APPLICATIONS

This application claims the benefit of U.S. Provisional Application No. 61/816,693 filed Apr. 26, 2013, and U.S. Provisional Application No. 61/822,902 filed May 13, 2013, and is a continuation-in-part of U.S. application Ser. No. 13/843,737, filed Mar. 15, 2013 the content of all of which are incorporated herein by reference.

This application is also related to U.S. application Ser. No. 13/843,238, filed on Mar. 15, 2013, and U.S. application Ser. No. 13/842,208, filed on Mar. 15, 2013, the content of both of which are incorporated herein by reference. This application is also related to U.S. application Ser. No. 14/069,328, filed on Oct. 31, 2013, the content of which is incorporated herein by reference.

BACKGROUND

The emergence of new technologies including cloud computing technology allows the distribution of workload between local resources and resources on a remote operations environment. While many enterprises would like to take advantage of cloud technology for their contact centers, there continue to be a number of inhibitors with this approach ranging from security concerns, voice network requirements, and contractual commitments with existing vendors (carriers). While there are current approaches which may be able to superficially overcome some of these challenges, as the customer requirements evolve, there are a number of common challenges which remain which are not currently addressed by existing vendors or technologies and require a unique approach. These challenges commonly arise as the deployments move from a single site to multiple sites, in which case there is a need for a mixed model where media traffic is managed both locally at the contact center premises and in the cloud.

SUMMARY

Embodiments of the present invention are directed to a system and method for optimized rendering of contact center services in a hybrid operations environment. A processor in a first operations environment receives a message transmitted by a first contact center resource relating to a contact center service. The message is forwarded to the processor by an edge device coupled to a second operations environment different from the first operations environment. The edge device is configured to hide from the message identification of a location of the contact center resource. Despite such hiding, the processor identifies the location of the first contact center resource based on identification information that the processor retrieves from the message. The processor selects a second contact center resource based on the identified location of the first contact center resource for providing the contact center service.

The identification information may be a telephone number, an IP address, or metadata specific to the first contact center resource.

The contact center service may be delivery of real-time media to a target, or recording real-time media exchanged with a target.

According to one embodiment, the first contact center resource is an end device of a contact center agent, and the second contact center resource is a media server configured to provide media services for the contact center.

According to one embodiment, the first contact center resource is located in the first operations environment.

According to one embodiment, the first and second contact center resources are located in a third operations environment separate from the first and second operations environments. The edge device in the second operations environment may be invoked to forward the message transmitted by the first contact center resource in response to a second edge device in the third operations environment being non-responsive.

According to one embodiment, the processor maintains mapping information of contact center resources and corresponding location information, and retrieves the mapping information for identifying the location of the first contact center resource.

According to one embodiment, the processor encodes the identification information contained in the message for preserving the information as the message traverses the edge device.

As a person of skill in the art should appreciate, identification information contained in one or more fields of the message transmitted by a resource allow the location of the resource to be exposed to the processor despite the topology hiding by the edge device. The location information may then be used by the processor to select a second resource that allows a contact center service to be provided in an optimized manner. The optimization may be in terms of cost, bandwidth use, and the like.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 13 is signaling flow diagram for posting a recorded call according to one embodiment of the invention;

FIG. 16 is a diagram of a structure of call recording metadata provided to a web server according to one embodiment of the invention;

FIG. 17 is a diagram of a structure of call recording metadata provided to a web server according to one embodiment of the invention;

FIG. 18 is a conceptual layout diagram of a call record displayed by a client playback application according to one embodiment of the invention;

FIGS. 19 and 20 are diagrams of the structure of call recording metadata generated for different segments of a call according to one embodiment of the invention;

DETAILED DESCRIPTION

In general terms, embodiments of the present invention are directed to a system and method for providing contact center services in a hybrid operations environment where some of the services are provided via software and hardware resources in one operations environment while other services are provided via software and hardware resources in another operations environment. The operations environments may be different due to a difference in their locations (e.g. local vs. remote), a difference in the entities controlling the resources in the two environments (e.g. different business enterprises), and/or the like. The environments used as examples for describing various embodiments of the invention are an operations environment at a contact center premise (also referred to as a local operations or computing environment), and an operations environment at a remote location (referred to as a remote operations or computing environment), although the invention is not limited thereto. That is, a person of skill in the art should recognize that the embodiments of the invention may extend to any two different or separate operations environments conventional in the art.

In providing contact center services to customers of an enterprise, the software and hardware resources of the contact center servicing the enterprise are invoked to engage in interactions with the customers. The services may vary depending on the type of contact center, and may range from customer service to help desk, emergency response, telemarketing, order taking, and the like. The interactions that may ensue in order to render the services may include, for example, voice/telephony calls, emails, text messages, social media interactions, and the like.

According to embodiments of the present invention, control or influence over an interaction is provided and retained in whole or in part by an appliance at the contact center premise while media is provided by resources in the remote operations environment. According to some embodiments, control or influence over an interaction is provided and retained in whole or in part by a resource in the remote operations environment, while media is provided by resources in the local operations environment. In further embodiments, a resource controlling an interaction may invoke media in one operations environment (e.g. local environment) for certain aspects of the interaction, and then invoke media in a different operations environment (e.g. remote environment) for other aspects of the interaction.

Unlike a traditional hybrid operations environment where control of an interaction and media for the interaction are either in one operations environment or another, embodiments of the present invention allow both environments to be actively involved in the processing of the interaction at the same time by, for example, providing control from one environment and media from another environment.

Figure 1:
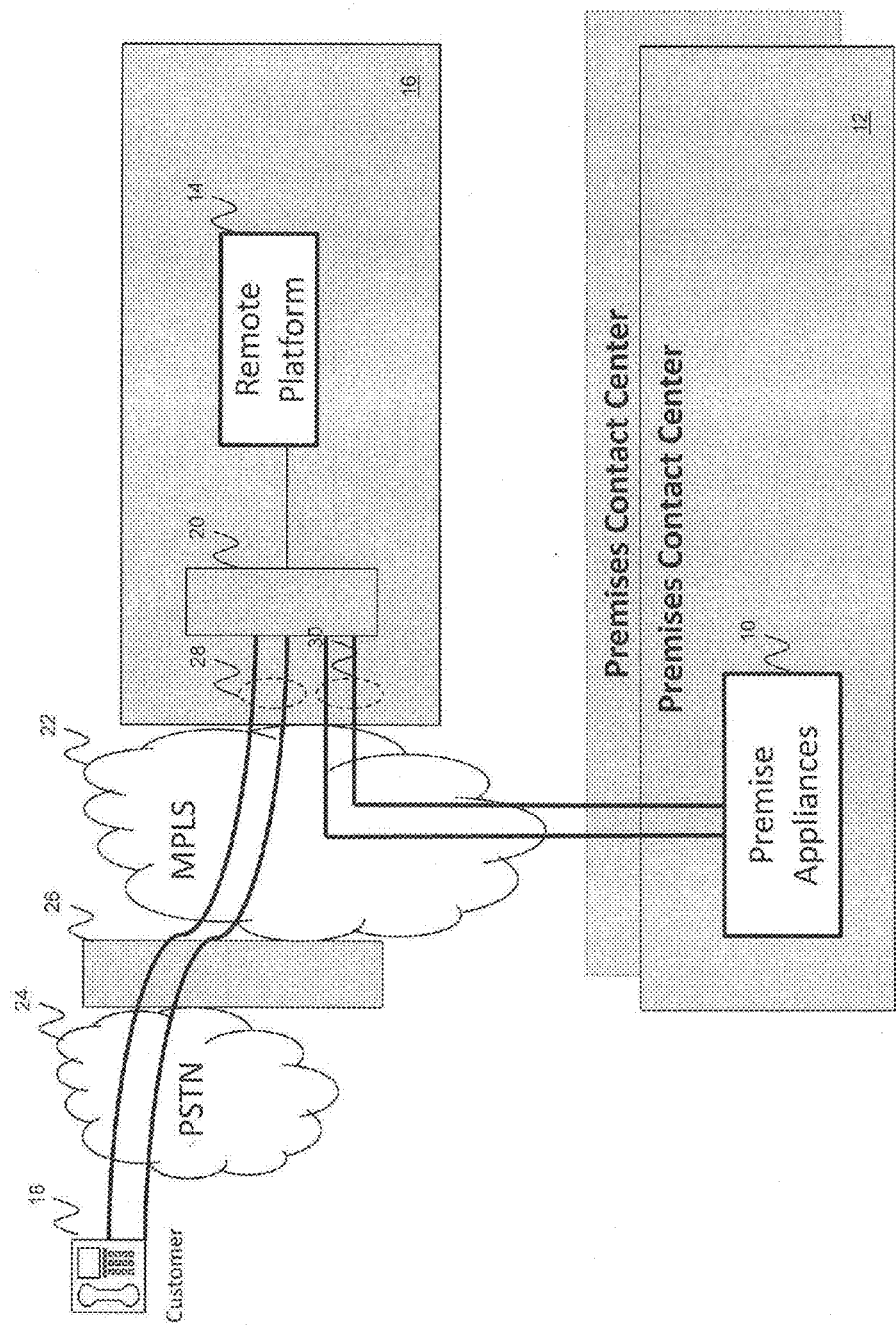
FIG. 1 is a schematic block diagram of a system for providing contact center services in a hybrid operations environment according to one embodiment of the invention.

FIG. 1 is a schematic block diagram of a system for providing contact center services in a hybrid operations environment according to one embodiment of the invention. The system includes premise appliances 10 at a contact center premise 12, and a remote platform 14 in a remote operations environment 16. Both the premise appliances 10 and the remote platform 14 include software, hardware, and network infrastructure that make up different contact center components for providing contact center services to a customer having access to an end user device 18. Exemplary contact center components include, without limitation, a switch and/or media gateway, telephony server, Session Initiation Protocol (SIP) server, routing server, media server, recording server, outbound call server, statistics server, reporting server, web server, configuration server, and/or the like. Each server may include a processor and memory storing instructions which, when executed by the processor, allow a function of the server to be performed. The various servers may also be referred to as controllers and may be implemented via an architecture other than a client-server architecture.

According to one embodiment, the contact center components are distributed between the premise 12 and the remote operations environment 16. In this regard, a particular contact center component may be provided by either the premise 12 as part of the premise appliances 10, or by the remote operations environment 16 via the remote platform 14. In some embodiments, a particular contact center component may be provided by both the premise 12 and the remote operations environment 16. In this regard, logic in either the premise or in the remote operations environment may determine, dynamically (e.g. upon arrival of a call) which component to invoke.

According to one embodiment, the remote operations environment 16 is a cloud operations environment that utilizes servers and other types of controllers, and is coupled to premises contact centers over a wide area network. Contact center services from the remote operations environment may be provided by a cloud service provider on behalf of multiple contact centers (also referred to as tenants) as a software as a service (SaaS), over the wide area network. The tenants may own their own infrastructure for providing some of the contact center services. The infrastructure and capabilities at the tenant premises may differ from the infrastructure and capabilities in the remote operations environment. According to one embodiment, the premise contact center may be operated by enterprise operations team while the remote operations environment may be operated by an operations team outside of the enterprise.

The remote operations environment 16 is configured to provide a point of presence for connection to various telephony service providers. According to one embodiment, media traffic transmitted using a Real-time Transport Protocol (RTP) terminates in the remote operations environment. The remote operations environment may provide a guaranteed quality of service (QoS) for the media traffic. In another embodiment, no QoS guarantees are provided for the media traffic traversing the remote operations environment 16.

According to one embodiment, the remote operations environment 16 includes an edge device 20 configured to control signaling and media streams involved in setting up, conducting, and tearing down voice conversations and other media communications between, for example, a customer and a contact center agent. According to one embodiment, the edge device 20 is a session border controller controlling the signaling and media exchanged during a media session (also referred to as a "call," "telephony call," or "communication session") between the customer and the agent. According to one embodiment, the signaling exchanged during a media session includes SIP, H.323, Media Gateway Control Protocol (MGCP), and/or any other voice-over IP (VoIP) call signaling protocols conventional in the art. The media exchanged during a media session includes media streams which carry the call's audio, video, or other data along with information of call statistics and quality.

According to one embodiment, the edge device 20 operates according to a standard SIP back-to-back user agent (B2BUA) configuration. In this regard, the edge device 20 is inserted in the signaling and media paths established between a calling and called parties in a VoIP call. In the below embodiments, it should be understood that other intermediary software and/or hardware devices may be invoked in establishing the signaling and/or media paths between the calling and called parties.

According to one embodiment, the remote platform 14 is a multi-tenant platform shared by multiple tenants. The platform includes standard hardware components such as, for example, one or more processors, disks, memories, and the like, used for implementing one or more of the contact center components (e.g. media server, recording server, SIP server, etc.). According to one embodiment, the one or more contact center components are implemented as software on the remote platform. The software components may be hosted by one or more virtual machines. The virtual machines may be dedicated to each tenant, or shared among the various tenants.

The appliances 10 maintained at each contact center premise 12 include contact center components which may or may not be included in the remote operations environment 16. For example, the appliances may include a telephony/SIP server, routing server, statistics server, agent devices (e.g. telephones, desktops, etc.), and/or other controllers typical for rendering contact center services for the particular contact center. Because the appliances are located locally within the contact center premise, the contact center retains control of such appliances.

According to one embodiment, VoIP infrastructure 26 (e.g. SIP trunk) is used to provide connectivity between a public switched telephony network (PSTN) 24 and the private network 22. According to one embodiment, the private network 22 implements MPLS (Multi-Protocol Label Switching) for transmitting VoIP communication over a wide area network (WAN) via leased lines. Although MPLS is used as an example, a person of skill in the art should recognize that any other mechanism in addition or in lieu of MPLS may be used for ensuring quality of service guarantees, bit rates, and bandwidth for calls traversing the private network. Due to the quality of service guarantees provided by the private network 22, consistent call quality and security can generally be expected for those calls while traversing the private network.

According to one embodiment, the edge device 20 in the remote operations environment 16 exerts control over the signaling (e.g. SIP messages) and media streams (e.g. RTP data) routed to and from customer devices 18 and premise appliances 10 that traverse the private network 22. In this regard, the edge device 20 is coupled to trunks 28 that carry signals and media for calls to and from customer devices 18 over the private network 22, and to trunks 30 that carry signals and media to and from the premise appliances 10 over the private network. The edge device 20 is also coupled to the remote platform 14 which provides contact center services to the customers.

The remote operations environment 16 may also be coupled to other public operations environments (e.g. public cloud computing environments), and some processing may be distributed to the other remote operations environments as will be apparent to a person of skill in the art. For example, processing intelligence and media handling that do not require QoS may be distributed to the other remote operations environments on behalf of one or more tenants. For example, the public operations environment may host a virtual machine dedicated to each tenant with a SIP server, routing service, and the like, for handling inbound and outbound voice contacts.

I. Contact Center Services in Hybrid Environment

Figure 2:
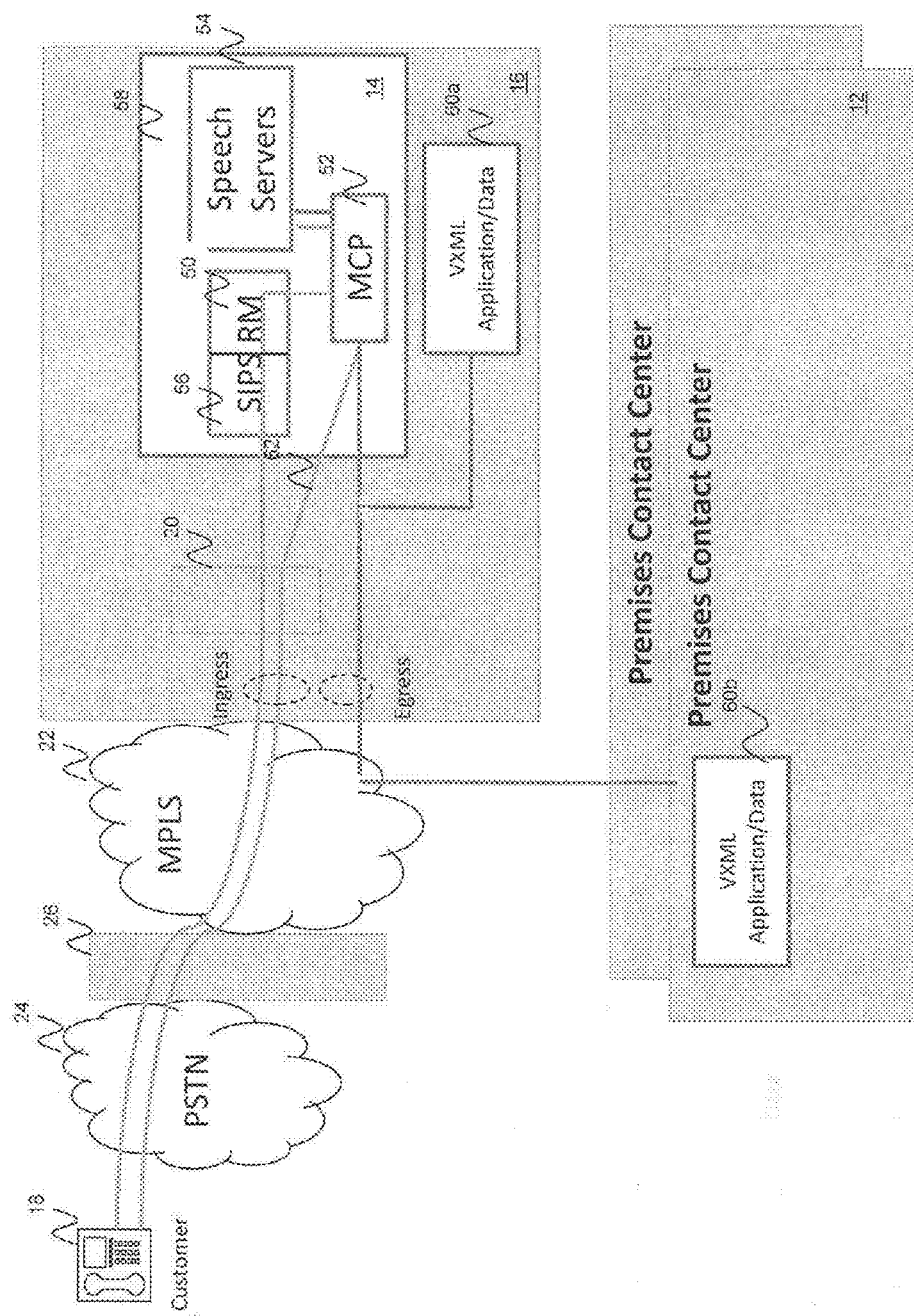
FIG. 2 is a schematic block diagram of a system for providing customer self-service in a hybrid operations environment according to one embodiment of the invention.

FIG. 2 is a schematic block diagram of a system for providing customer self-service in a hybrid operations environment according to one embodiment of the invention. The customer self-service may be referred as an interactive-voice-response (IVR) self-service. In this regard, the remote platform 14 provides a voice platform 58 for multiple subscribing tenants for providing customer self-service functionality for inbound calls directed to any of the multiple tenants. Although self-service and assisted-service capabilities are contemplated to be provided by the voice platform, a person of skill in the art should recognize that other types of assisted service, multimedia interactions, and applications outside of the contact center are also possible.

The voice platform 58 may host, for example, a SIP server 56, resource manager 50, speech servers 54, and a media control platform 52. The resource manager 50 and media control platform 52 may collectively be referred to as a media controller. According to one embodiment, the SIP server 56 acts as a SIP B2UBA, and controls the flow of SIP requests and responses between SIP endpoints. Any other controller configured to set up and tear down VoIP communication session may be contemplated in addition or in lieu to the SIP server as will be apparent to a person of skill in the art. The SIP server 56 may be a separate logical component or combined with the resource manager 50. In some embodiments, the SIP server may be hosted at the contact center premise 12, and/or in the remote operations environment. Although a SIP server is used as an example in the various embodiments of the present invention, a person of skill in the art should recognize that any other call server configured with any other VoIP protocol may be used in addition or in lieu of SIP, such as, for example, the well-known H.232 protocol, Media Gateway Control Protocol, Skype protocol, and the like.

The resource manager 50 is configured to allocate and monitor a pool of media control platforms for providing load balancing and high availability for each resource type. According to one embodiment, the resource manager 50 monitors and selects a media control platform 52 from a cluster of available platforms. The selection of the media control platform 52 may be dynamic, for example, based on identification of a location of a calling customer, type of media services to be rendered, a detected quality of a current media service, and the like.

According to one embodiment, the resource manager is configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to one embodiment, the resource manager may provide hierarchical multi-tenant configurations for service providers, enabling them to apportion a select number of resources for each tenant.

According to one embodiment, the resource manager is configured to act as a SIP proxy, SIP registrar, and/or a SIP notifier. In this regard, the resource manager may act as a proxy for SIP traffic between two SIP components. As a SIP registrar, the resource manager may accept registration of various resources via, for example, SIP REGISTER messages. In this manner, the voice platform 58 may support transparent relocation of call-processing components. In some embodiments, components such as the media control platform, do not register with the resource manager at startup. The resource manager detects instances of the media control platform 52 through configuration information retrieved from the configuration database. If the media control platform resource group has been configured for monitoring, the resource manager monitors resource health by using, for example, SIP OPTIONS messages. For example, to determine whether the resources in the group are alive, the resource manager periodically sends SIP OPTIONS messages to each media control platform resource in the group. If the resource manager receives an OK response, the resources are considered alive.

According to one embodiment, the resource manager act as a SIP notifier by accepting, for example, SIP SUBSCRIBE requests from the SIP server 56 and maintaining multiple independent subscriptions for the same or different SIP devices. The subscription notices are targeted for the tenants that are managed by the resource manager. In this role, the resource manager periodically generates SIP NOTIFY requests to subscribers (or tenants) about port usage and the number of available ports. The resource manager supports multi-tenancy by sending notifications that contain the tenant name and the current status (in- or out-of-service) of the media control platform that is associated with the tenant, as well as current capacity for the tenant.

The resource manager is configured to perform various functions:

Resource management—The resource manager allocates and monitors SIP resources to maintain a current status of the resources within a voice platform 58 deployment. In this regard, the resource manager provides load balancing and high availability for each resource type, as the workload is evenly distributed among resources of the same type. These processes help to ensure that new, incoming services are not interrupted when a resource is unavailable.

Session management—The resource manager combines two logical functions of session management:

Physical resource management—The resource manager monitors the status of the various voice platform resources and, based on request-for-service and capability mapping, routes to resources that offer a particular set of capabilities or services.

Logical service management—The resource manager applies high-level application and business logic to select the service that is delivered and the parameters that are applied. In this regard, the resource to fulfill the service does not need to be specified in advance. In this way, the resource manager provides session management functions to handle logical call sessions, individual calls within a logical session, and the lifetime and coordination of call legs within a call session.

Service selection—When a call session arrives at the resource manager, the resource manager maps the call to an IVR profile and, if applicable, to a tenant, and selects a service for the request. There are various ways in which the resource manager may determine which IVR profile to execute. According to one embodiment, a dialed number identification service (DNIS) may be used to identify which application to run. In this scenario, the incoming call corresponds to the DNIS.

According to one embodiment, when a platform administrator segregates services into a multi-tiered hierarchy, the resource manager also identifies the tenant for which a request is intended. The IVR profile, policy enforcement, and service parameters may be determined by the tenant that is associated with the request. In a hierarchical multi-tenant (HMT) environment, when a tenant is selected, the policies enforced, and application and service parameters associated with that tenant, may also affect the child tenants within that tenant object.

After the resource manager has determined the IVR profile for a session, it identifies the service type and the service prerequisites for each call leg (also referred to as a call path or segment of a call connection). For each type of service within an IVR profile, one may configure a set of service parameters that the resource manager forwards to the VoiceXML application to affect the way that the application is executed. For example, default languages may be configured for the VoiceXML services for voice applications.

Policy enforcement—According to one embodiment, for each IVR Profile and, if applicable, for each tenant, policies may be configured such as, for example, usage limits, dialing rules, and service capabilities. The resource manager enforces policies by imposing them on the VoiceXML application to determine whether or not to accept a SIP session. If the session is accepted, the resource manager locates a resource to handle it. The resource manager may also enforce policies related to how a VoiceXML or CCXML application uses a resource. For multiple tenants, the resource manager may be configured to apply and enforce policies in a hierarchical manner. HMT enables a service provider or parent tenant to allocate portions of its inbound ports to each reseller (or child tenant). The reseller can, in turn allocate ports to a number of child tenants within its tenant object. When tenant policies are enforced at the child tenant level, the policies are propagated to all other child tenants within that child tenant object.

Service request modification—According to one embodiment, before the resource manager forwards a request to a resource that can handle the mapped service, it can modify the SIP request to add, delete, or modify the SIP parameters. This may be defined on a per-service/per-application basis.

Resource selection—After the resource manager has identified an IVR Profile and service type, it identifies a resource group that can provide the service. Then, on the basis of the load-balancing scheme for the group and the status of individual physical resources in the group, it allocates the request to a particular physical resource.

Resource selection with geo-location information—When the resource manager receives a request with geo-location information from a gateway resource (e.g. SIP Server, session border controller, media gateway, etc.), it checks the resource groups to determine if the geo-location parameter that is configured for the group matches the geo-location in the request. If it finds a match, the resource manager routes the call to the group based on port availability, preference and other criteria.

Resource selection for outbound campaigns—For outbound-call campaigns, the resource manager is configured to predict the ratio of agent calls to customer calls. When there are multiple media control platforms in a deployment, the resource manager may distribute calls based on the maximum number of calls and free ports for a particular campaign.

Call-data reporting—When data collection and logging events occur, the resource manager sends these log events to, for example, a reporting server.

In some embodiments, the voice platform 58 may not include a resource manager 50, or the functionality of the resource manager 50 may be incorporated into another voice platform component, such as, for example, the media control platform 52.

Referring again to FIG. 2, the speech servers 54 are configured with speech recognition technology to provide automatic speech recognition and text-to-speech functionality for use in voice applications.

The media control platform 52 is configured to provide call and media services upon request from a service user. Such services, include, without limitation, initiating outbound calls, playing music or providing other media while a call is placed on hold, call recording, conferencing, call progress detection, playing audio/video prompts during a customer self-service session, and the like. One or more of the services are defined by voice applications 60a, 60b (e.g. VoiceXML applications) that are executed as part of the process of establishing a media session between the media control platform and the service user.

According to one embodiment, the voice platform 58 is shared by various contact centers for which contact center services are provided. According to this embodiment, multiple voice applications for multiple tenants run on the same media control platform instance without interfering with one another. Identification of the tenant (e.g. based on the telephone number dialed by the customer), for which a voice application is run, allows a proper voice application to be selected and executed for that call.

In one example where customer self-service is to be provided for an inbound call, the call comes in to the edge device 20 and is forwarded to the SIP server 56. The edge device 20 is configured to identify a tenant to which the call is directed, and identify the SIP server 56 configured for the tenant (e.g. based on the inbound phone number that was dialed). According to one embodiment, the SIP server 56 passes the call to the resource manager 50 by sending a signaling message (e.g. SIP INVITE message) to the resource manager. According to one embodiment, there is no separate SIP server 56 set up for the tenant, and some of the functionalities of the SIP server are instead incorporated into the resource manager 50. According to one embodiment, the resource manager is shared by multiple tenants.

The resource manager is configured to identify the contact center associated with the SIP server 56 generating the signaling message (e.g. based on a source address of the SIP server), and further identify a voice or call-control application (referred to as an interactive voice response (IVR) profile), and a service/resource for the request. The particular service that is requested may be identified, for example, in the signaling message to the resource manager.

The resource manager 50 is configured to identify the appropriate media control platform 52 instance from a cluster of media control platform instances based on the IVR profile, load balancing considerations, and the like, and forward a request to the identified media control platform. In forwarding the request, the resource manager is configured to insert additional headers or parameters as specified by the service requirements, service parameters, and polices that have been configured for the IVR profile.

The media control platform 52 is configured to fetch the voice application 60a, 60b from, for example, a web server, via an HTTP request. The web server hosting the voice application 60a, 60b may reside in the remote operations environment 16 or contact center premise 12.

According to one embodiment, the media control platform 52 includes an interpreter module for interpreting and executing the voice application. In some embodiments, the media control platform, through the resource manager 50, may invoke additional services such as, for example, automatic speech recognition or text-to-speech services, from the speech servers 54.

An RTP media path 62 is established between the media control platform 52 and the end user device 18 through the edge device 20, upon the executing of the voice application. The resource manager 50 ends the call when one of the parties (end user device 18 or media control platform 52) disconnects (e.g. at the end of self-service), or when the call is transferred out of the voice platform 58 (e.g. transferred to an agent).

Figure 3:
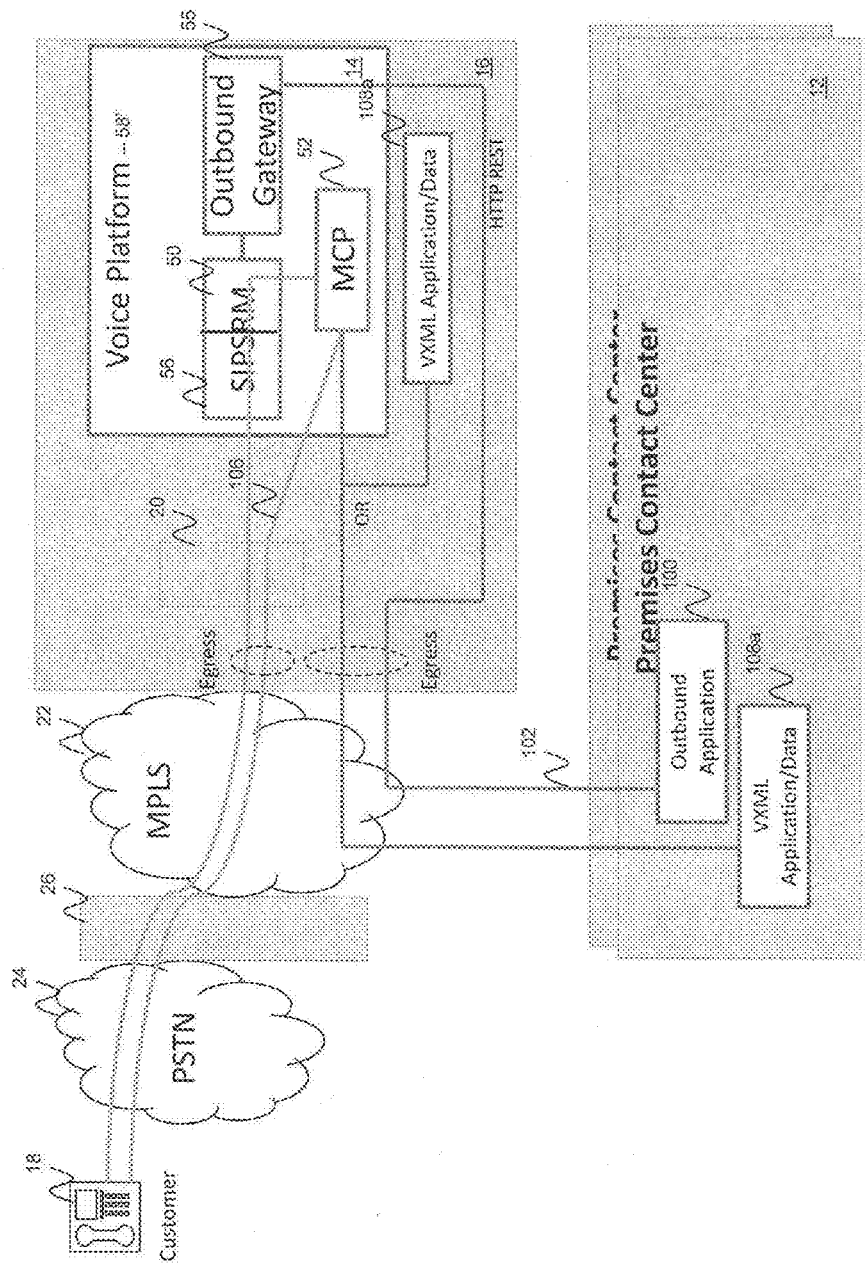
FIG. 3 is a schematic block diagram of a system for providing outbound notifications in a hybrid operations environment according to one embodiment of the invention.

FIG. 3 is a schematic block diagram of a system for providing outbound notifications in a hybrid operations environment according to one embodiment of the invention. The system is similar to the system in FIG. 2 in that it includes a remote voice platform 58' which hosts the SIP server 56, resource manager 50, and media control platform 52. In addition, the voice platform 58' further hosts an outbound gateway 55 configured to manage the initiation of outbound sessions. According to one embodiment, an outbound session is controlled by an outbound application 100, which in the illustrated embodiment, is depicted to reside in a web server (not shown) at the contact center premise 12. A person of skill in the art should recognize, however, that the outbound application may also reside in a server hosted by the remote operations environment 16.

According to one embodiment, the outbound application initiates an outbound call session via an HTTP request to the outbound gateway 55 over a data link 102 traversing the private network 22. The request includes, in one embodiment, the necessary information for initiating the outbound call which may be provided by the outbound application. For example, the outbound application may control the timing of the call, the number to be called, and a voice application 108a, 108b to be invoked for the call.

The outbound gateway 55 is coupled to the SIP server 56 which is configured to establish call legs from the edge device 20 to the end user device 18, and from the edge device 20 to the media control platform 52, and bridge the two call legs together for establishing a media path 106 between the end user device 18 and the media control platform 52. The voice notification provided to the customer during the outbound call depends on the voice application 108a, 108b identified by the outbound application 100. As in the embodiment of FIG. 2, the voice application may be retrieved from a web server in the contact center premise 12 or in the remote operations environment 16.

Upon completion of the outbound notification, the outbound gateway 55 is configured to collect results of the call from the media control platform 52, and provide such results to the outbound application 100 in a notification message.

Figure 4:
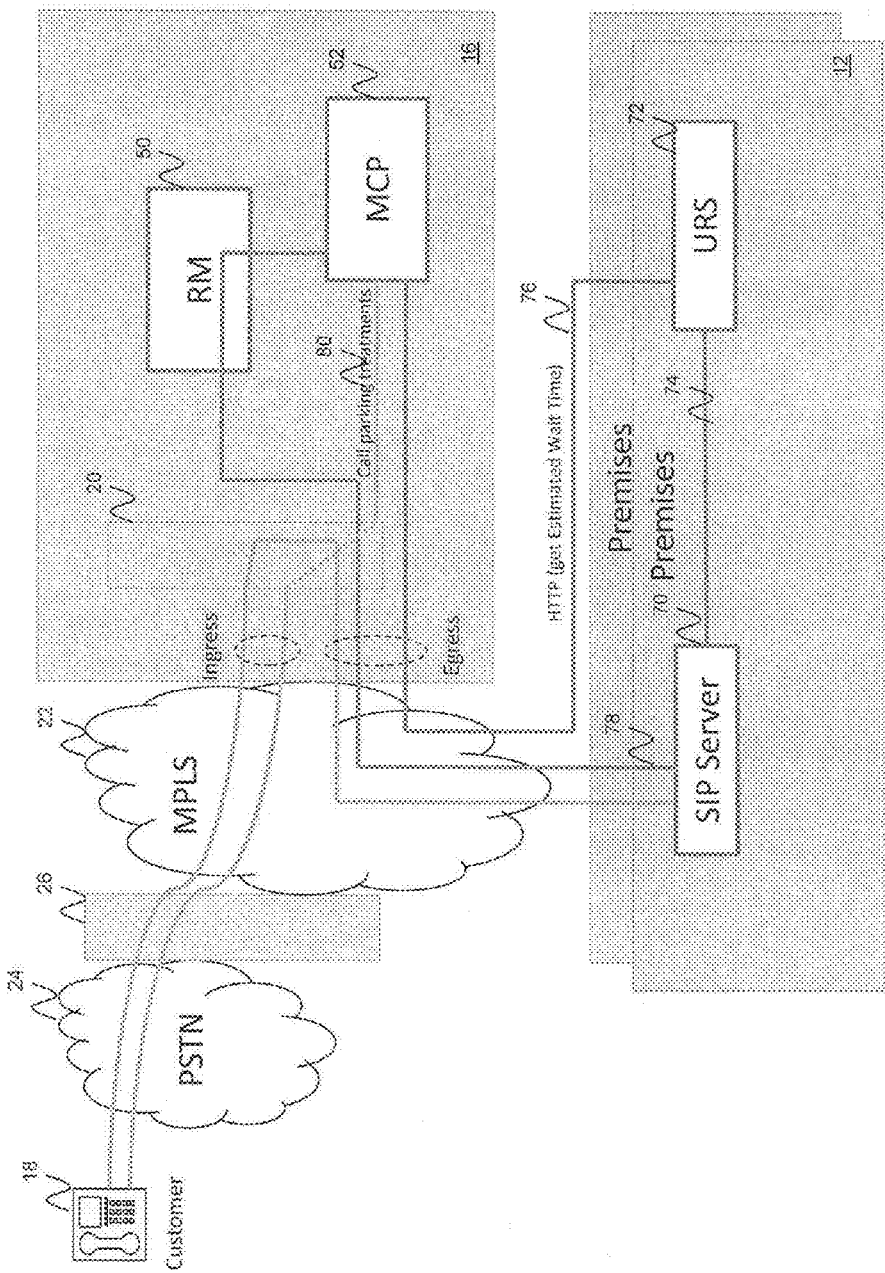
FIG. 4 is a schematic block diagram of a system for providing call parking services in a hybrid operations environment according to one embodiment of the invention.

FIG. 4 is a schematic block diagram of a system for providing call parking services in a hybrid operations environment according to one embodiment of the invention. According to this embodiment, a SIP server 70 similar to the SIP server of FIG. 2 is hosted at the contact center premise 12 instead of the remote operations environment 16. The premise farther hosts a routing server 72 configured to route an interaction to a contact center resource based on a routing strategy identified by the routing server. The SIP and routing servers 70, 72 being local to the premise may also be referred to as local controllers. Media services are provided remotely, however, via the resource manager 50 and medial controller 52 in the remote operations environment 16.

In one example, an inbound VoIP call is received by the edge device 20 and routed to the SIP server 70. The SIP server 70 queues the call locally at the contact center premise and transmits a message to the routing server 72 for routing the call to an available contact center resource (e.g. agent). In the event that no resources are available for handling the call, the routing server 72 transmits a message to the SIP server 70 over a local data connection 74 of this fact. In response, the SIP server 70 queues the call locally in an inbound queue, and transmits to the resource manager 50 over a data link 78 traversing the private network 22, a request for call parking media services. The resource manager 50 identifies the appropriate media control platform 52 to handle the request, and upon identification of such a platform, a media channel/path 80 is established between the end user device 18 and the media control platform 52 via the edge device 20. Although control of the call is retained by the SIP server 70 at the contact center premise, the media channel 80 need not loop through the contact center premise. According to one embodiment, the SIP server 70 retains control of the call by transmitting signaling messages to various components, including the resource manager 50, to control the media paths that are generated and/or broken down.

As part of the call parking service, the media control platform 52 may use the media channel 80 to provide media such as, voice notifications and/or music, to the customer, for indicating that no agents are currently available. The voice notifications and/or music that are selected may depend on the voice application retrieved by the media control platform. As part of the call parking service, the media control platform may also be configured to periodically transmit a message to the routing server 72 requesting an amount of estimated wait time calculated by the routing server 72. The request may be transmitted over a data link 76 that traverses the private network 22. In response, the routing server 72 provides the requested information to the media control platform 52, and is used by the voice application to output corresponding audio (e.g. "we estimate your wait time to be between 5 and 10 minutes") via the media channel established between the media control platform and the end user device 18.

The routing server 72 is configured to monitor for availability of the contact center resource, and upon identification of such a resource, transmits a message to the SIP server 70. In response to the availability message, the SIP server 70 is configured to transmit a message to the resource manager 50, via the data link 78, requesting termination of the call parking service. In this manner, service provided by the media control platform 52 is revoked by the local SIP server 70 who retains control of the call while media services are being provided from the remote operations environment. The media controller controls the media based on the request, and terminates the call parking service. Upon exchange of signaling messages between the SIP server 70 and the identified contact center resource, such as, for example, an agent device at the contact center premise 12, a call leg is established from the edge device 20 to the contact center resource to allow exchange of media between the customer and the contact center resource. The control signals transmitted by the SIP server 70, therefore, replaces a call leg between the edge device 20 and the media control platform 52 in the remote operations environment 16, with a new call leg established between the edge device 20 and the contact center resource at the contact center premise.

Figure 5:
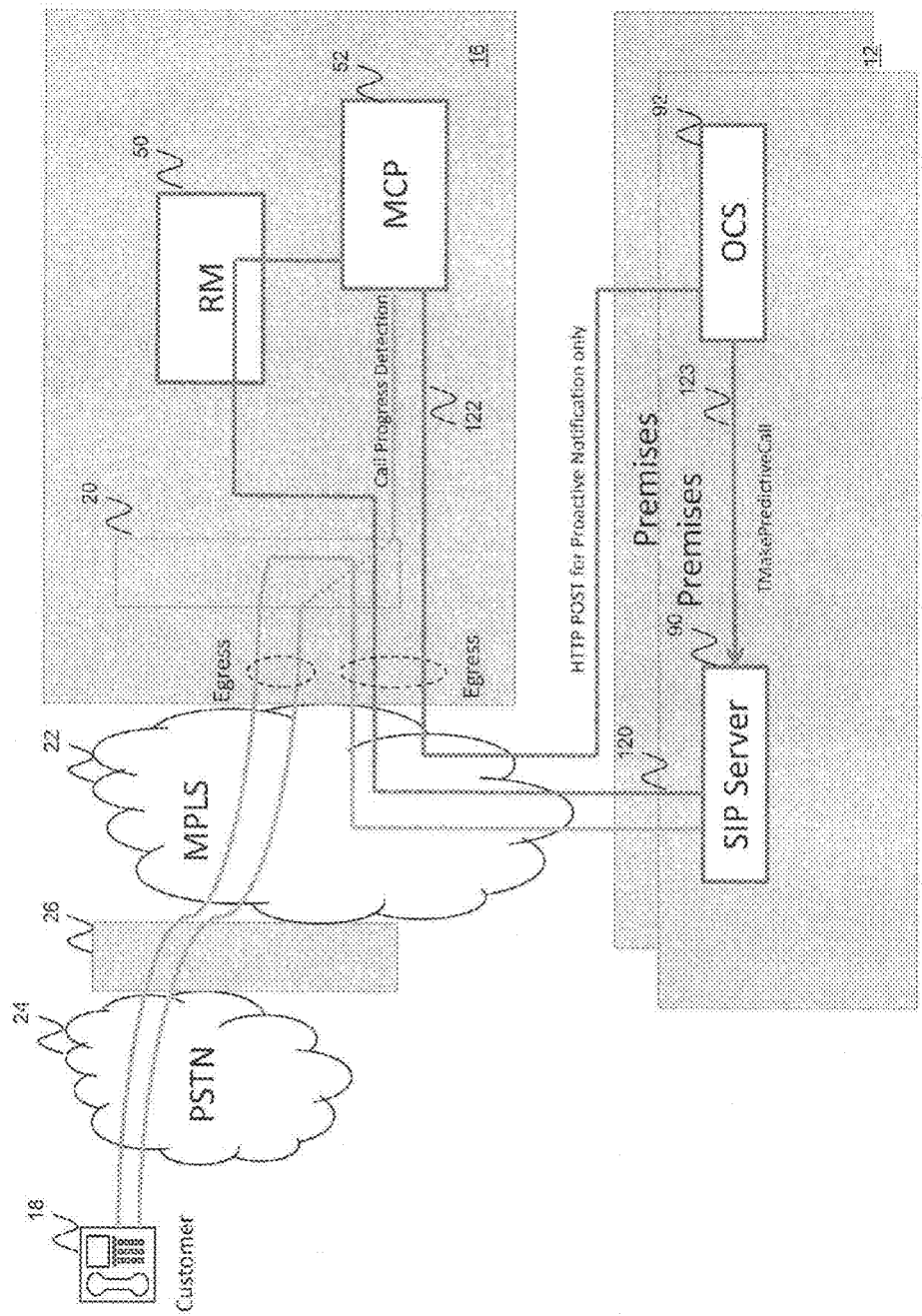
FIG. 5 is a schematic block diagram of a system for providing call progress detection for outbound calls made in a hybrid operations environment according to one embodiment of the invention.

FIG. 5 is a schematic block diagram of a system for providing call progress detection for outbound calls made in a hybrid operations environment according to one embodiment of the invention. According to this embodiment, the local contact center premise 12 hosts a SIP server 90 and an outbound call server 92 as local appliances 10, while the remote platform 14 in the remote operations environment 16 hosts the resource manager 50 and media control platform 52. The SIP server 90 may be similar to the SIP server 56 of FIG. 2, and may be configured to receive commands to initiate an outbound call as directed by the outbound call server 92. In this regard, the outbound call server 92 may be configured with an outbound application (not shown) which provides call control during, for example, an outbound campaign. The outbound application may be similar to the outbound application 108a, 108b, of FIG. 3. In this regard, the outbound application may control the times and numbers to call, the voice applications to be invoked, and the like. A difference in the outbound applications is that the outbound application in FIG. 3 controls the media control platform to leave a message if the call is picked up by a person or an automated answering system, while the outbound application in FIG. 5 controls the media control platform to send a message if the call is picked up by a person for connecting the call to an agent According to one embodiment, an outbound call is initiated as instructed by the outbound application executed by the outbound call server 92, in a manner similar to what was discussed with respect to the embodiment of FIG. 3. According to one embodiment, the media control platform provides the media for the outbound notification. In addition, the media control platform 52 may be configured to provide call progress detection based on for example, a request for such service from the SIP server 90 as determined by the executed outbound application. The request for initiating the outbound call and for call progress detection may be transmitted via a data link 120 that traverses the private network 22.

In response to the request for call progress detection, the media control platform 52 monitors the call progress for identifying triggering actions, such as, for example, the answering (or not) of the outbound call, including identifying the type of device or person answering the call (if at all). The call progress information is forwarded to the outbound call server 92 over a data link 122 as well as to the SIP server over data link 120. In response to the information, the outbound call server 92 may update its records, attempt calls to alternate numbers (in case a call to a first number was unsuccessful), and the like.

According to one embodiment, in response to receiving an update that a customer (as opposed to an answering machine or fax machine) has answered the call, the SIP server 90 may be configured to transmit a message to the outbound call server, to connect the customer with a live agent. According to one embodiment, the outbound call server 92 may be configured to match an agent camping on a media control platform to the answering customer that is connected to the same media control platform. Once the agent is identified, the call is connected by establishing a call leg from the edge device 20 to the device of the identified agent. This results in the call leg between the edge device 20 and the media control platform 52 being replaced with the call leg between the edge device 20 and the agent device.

Figure 6:
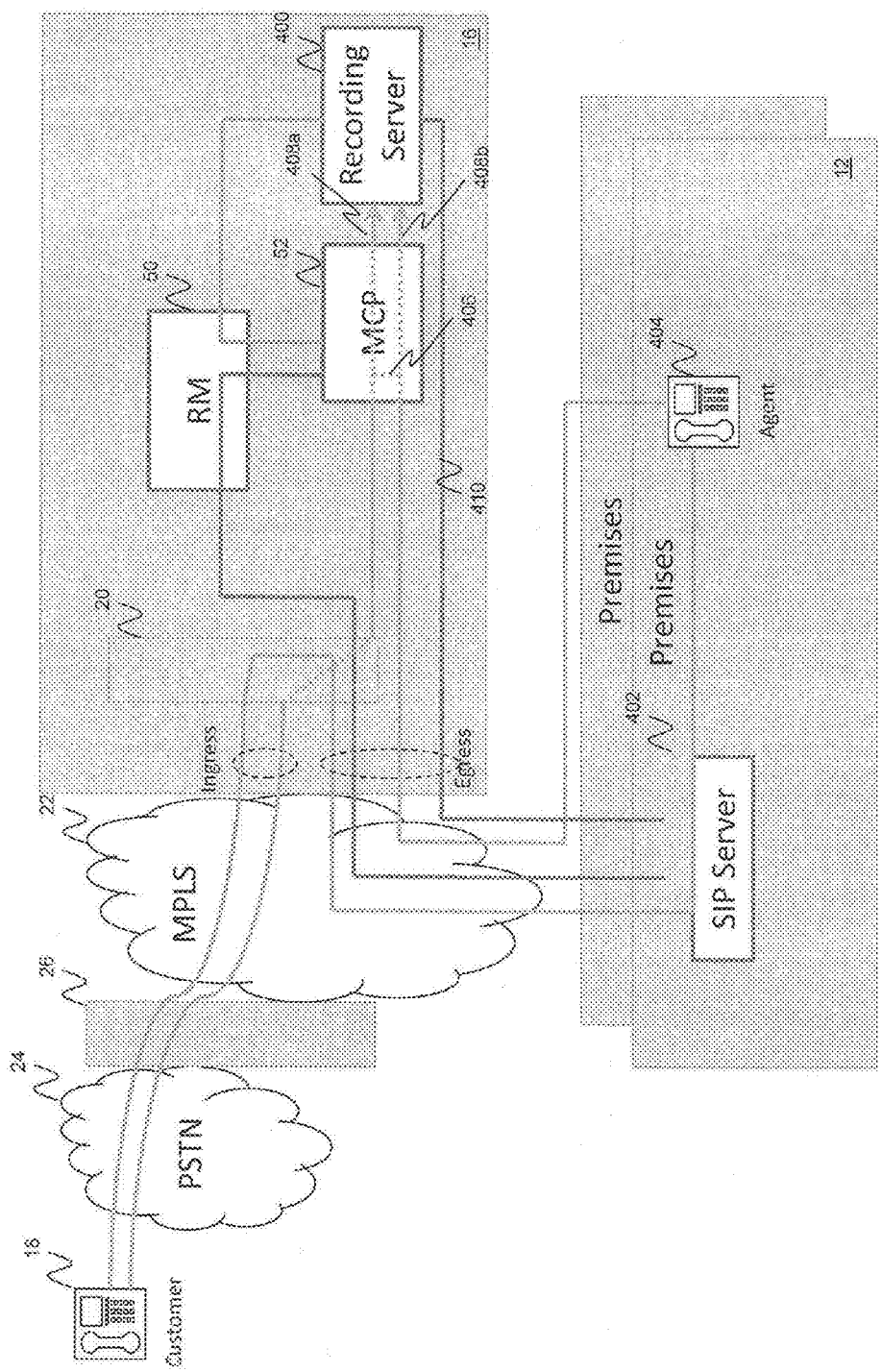
FIG. 6 is a schematic block diagram of a system for call recording in a hybrid operations environment according to one embodiment of the invention.

FIG. 6 is a schematic block diagram of a system for call recording in a hybrid operations environment according to one embodiment of the invention. This embodiment is similar to the embodiments of FIGS. 4 and 5 in that the resource manager 50 and media control platform 52 are hosted by the remote platform 14 in the remote operations environment 16. In addition to the resource manager and media control platform, the remote platform further hosts a recording server 400 configured to record media exchanged during a media session. Although the recording server 400 is depicted as a separate component, a person of skill in the art should recognize that functionality of the recording server may be incorporated into the media control platform 52.

According to one embodiment, the media control platform 52 is configured for active recording. Unlike passive recording where VoIP recording is done by connecting a passive recording system to a switch to monitor all network traffic and pick out only the VoIP traffic to record, active recording allows a recording device to be an active participant in the call for recording purposes. In this regard, the media control platform 52 is in the media path established between two communicating parties in order to actively record (e.g. replicate and store) the media traversing the media path.

According to one embodiment, the contact center premise hosts a SIP server 402 which may be similar to the SIP server 70 of FIG. 4, to initiate a call recording of a call established between the end user device 18 and an agent device 404, via the media control platform in the remote operations environment 16. In response to a request for recording services, the media control platform 52 performs media bridging 406 between the end user device 18 and the agent device 404, and initiates a recording session. The media control platform 52 replicates the media 408a, 408b to and from the end user device 18 and the agent device 404, and streams the replicated media to the recording server 400 which then proceeds to store the replicated media in a local and/or remote storage device (not shown). The local storage device may be, for example, a disk storage mechanism (e.g. disk array) in the remote operations environment 16 that may be scaled for the cluster of media control platforms in the remote operations environment. The remote storage device may be hosted, for example, in an environment (e.g. a public cloud computing environment) separate from the remote operations environment 16. According to one embodiment, the storage devices store media recordings for a plurality of tenants, in a safe and secure manner. In this regard, the recordings are stored in the storage devices in an encrypted manner (e.g. via a public key), which is configured to be decrypted (e.g. for listening) by the tenant who may own, for example, a private key.

According to one embodiment, the recording server 400 is configured to receive metadata of the call recordings from the SIP server 402 over a data link 410. The metadata may be stored in association with the corresponding call recordings in the same or separate data storage device as the actual call recordings. According to one embodiment, the metadata is stored as header data for the call recordings.

Recording can be enabled from routing strategy by sending a RequestRouteCall message from the SIP server 402 to the media control platform 52 with extension key "record"

and value set to "source" to record all legs until customer leaves the call, or "destination" to record while the target agent is on the call. Choosing recording using a routing strategy is referred to as selective recording. According to one embodiment, in recording based on a routing strategy, a tenant's recording parameters are checked for identifying a percentage of calls to be recorded and requesting recording for a particular call based on the identified percentage.

According to one embodiment, the SIP server 402 may be configured to record calls for specific agent DNs, or for all incoming calls. According to one embodiment, a "norecord" extension key may be supported for the RequestRouteCall message. When a "norecord" key is set, no recording is performed even if the call is set to record at the DN level. Dynamic recording control may still be allowed, however, after the call is established, so as to allow the agent to being recording the call when desired.

According to one embodiment, the agent device 404 may provide a graphical user interface with dynamic recording controls for allowing the agent to start, pause, resume, and stop a recording. According to one embodiment, commands for controlling the recording are forwarded by the SIP server 402. Other clients other than the agent device 404 may provide the recording commands even if not party to the call.

Figure 7:
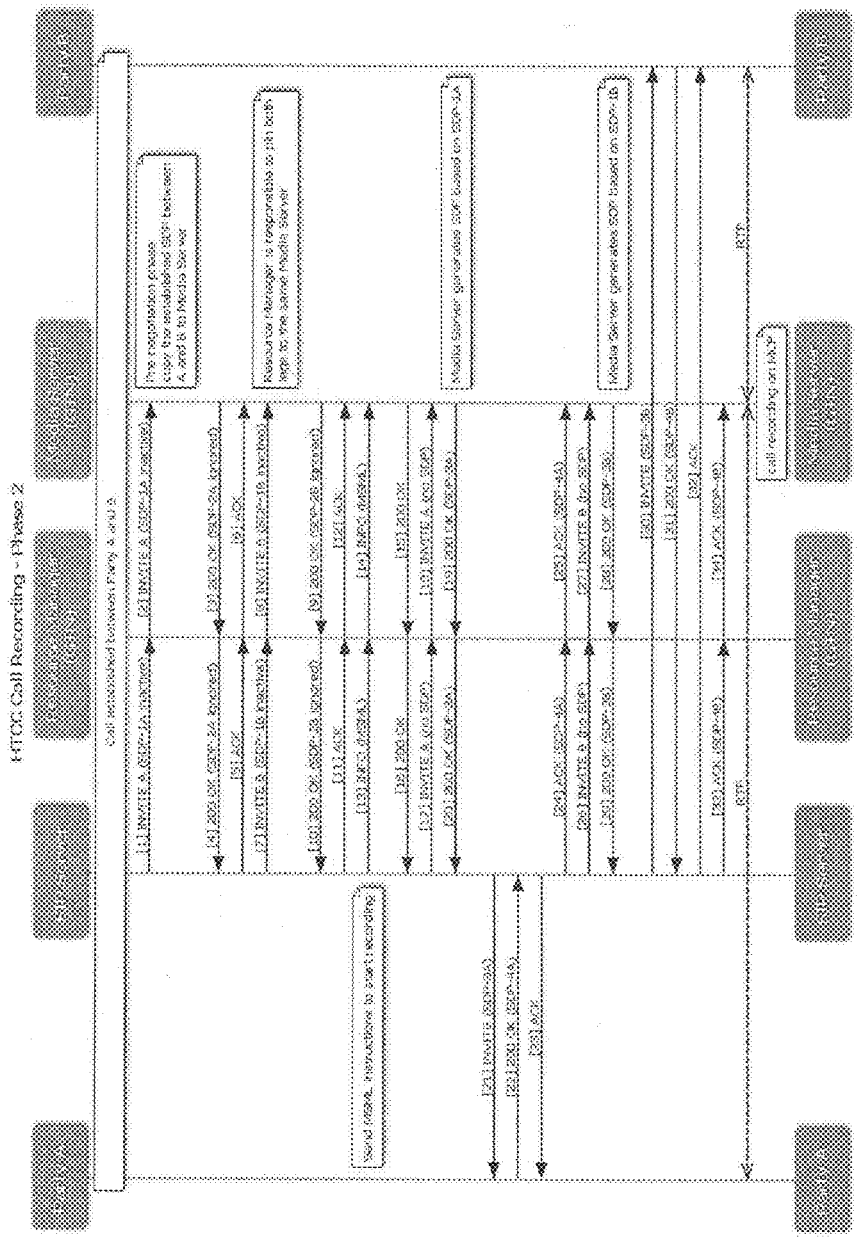
FIG. 7 is a signaling flow diagram for recording a call in a hybrid operations environment according to one embodiment of the invention.

FIG. 7 is a signaling flow diagram for recording a call in a hybrid operations environment according to one embodiment of the invention. The flow begins with step 420 where a media session is established between two communication devices referred to as party A 440 and party B 442.

In steps collectively identified as steps 422 and 424, a pre-negotiation phase ensues between the SIP server, resource manager, and media control platform 52, for providing a copy of the established media session between party A 440 and party B 442, to the media control platform 52. According to one embodiment, the information on the media session with party A is provided to the media control platform 52 in step 422 via the resource manager 50 via a session description protocol (SDP) that includes information such as, for example, IP address, port number, and codec used for sending and receiving RTP streams with party A. Information on the media session with party B is similarly provided to the same media control platform in step 424.

In steps collectively referred to as step 426, the SIP server 402 transmits a request to the media control platform 52 to record the call. In this regard, during signaling which is collectively referred to as step 428, the SIP server 402 transmits an INVITE message to the media control platform 52 (via the resource manager 50), for establishing a media path with party A 440, in which case the media control platform generates a session based on the session information received in the pre-negotiation phase in step 422 for party A. A media path for the generated media session is then established via signaling between the SIP server 402 and party A 440, as shown collectively as step 430.

Similarly during signaling which is collectively referred to generally as step 432, the SIP server 402 transmits an INVITE message to the media control platform 52 (via the resource manager 50), for establishing a media path with party B 442. The media control platform generates, in response, a session based on the session information received in the pre-notation phase in step 424 for party B. A media path for the generated media session is then established via signaling between the SIP server 402 and party B 442, as shown collectively as step 434.

Media is then exchanged via established media paths 436 and 438. In this manner, the media control platform 52 bridges media between party A 440 and party 460, and records the exchanged media in step 439.

II. Handling Connection Failures in Hybrid Environment

Figure 8:
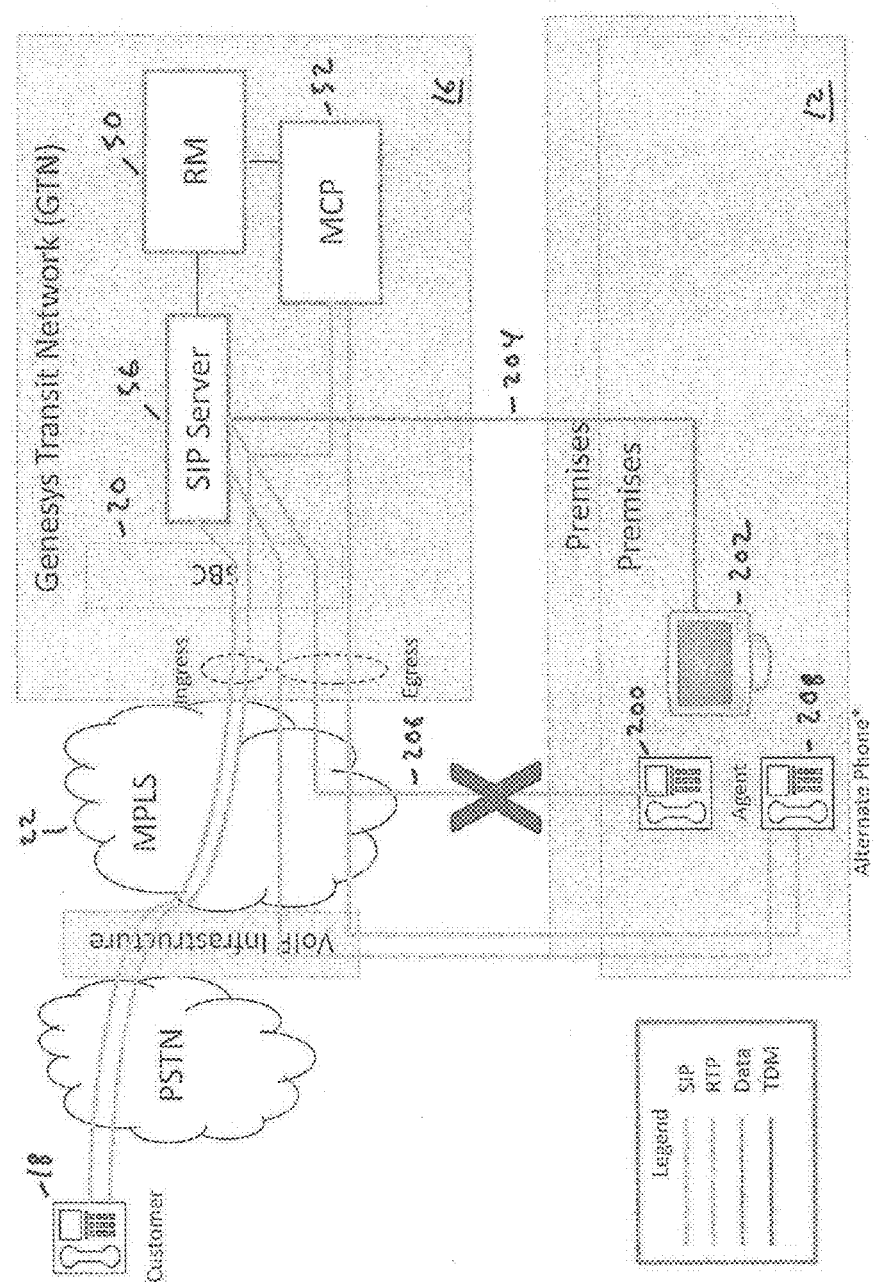
FIG. 8 is a schematic block diagram of a hybrid operations environment with failover capabilities according to one embodiment of the invention.

FIG. 8 is a schematic block diagram of a hybrid operations environment with failover capabilities according to one embodiment of the invention. An inbound call from the customer end device 18 is forwarded to the SIP server 56 for routing to a contact center agent. In the illustrated embodiment, the contact center agent registers with the SIP server 56 a directory number associated with an agent telephone 200. The agent also has access to a desktop 202 which may be used for receiving data about the inbound call from the SIP server 56. According to one embodiment, the data is transmitted over a data link 204 over a wide area network which may not utilize the same connections used for the private network 22. The desktop 202 may also provide a graphical user interface with call control options, such as, for example, options for answering calls, putting calls on hold, transferring calls, and the like.

According to one embodiment, the SIP server 56 is configured to monitor on a regular or irregular basis, the status of a connection to the agent device 200. In this regard, the SIP server 56 may be configured to transmit polling/heartbeat messages to the agent device 200 over a data link 206 traversing the private network 22, and wait for an acknowledgement within a preset amount of time. If the SIP server does not receive the acknowledgement within the set time period, the SIP server may be configured to assume that data link 206 or agent device 200 is faulty. In this case, the SIP server is configured to retrieve a list of alternate numbers (e.g. direct inward dialing (DID) numbers) to alternate phones 208 maintained by the SIP server for the agent. According to one embodiment, the alternate number is a number that is not used by any agent for registering with the SIP server.

In response to identifying the alternate number, calls to be routed to the agent are sent to the alternate phone number instead of the directory number in a seamless manner. According to one embodiment, call data continues to be delivered to the agent desktop 202 over the data link 204 which is not affected by the faulty data link 206 traversing the private network 22. According to one embodiment, the agent may engage in call control via the agent desktop for controlling calls routed to the alternate number. Routing to the directory number for the agent resumes when connection to the agent device 200 over the data link 206 is functional again.

According to one embodiment, a media path 205a, 205b from the end user device 18 to the alternate phone 208 is bridged through the media control platform 52, as shown in FIG. 8, if the call between the customer and the agent is to be recorded. Otherwise, the media path is bridged through the edge device 20 without traversing through the media control platform.

Figure 9:
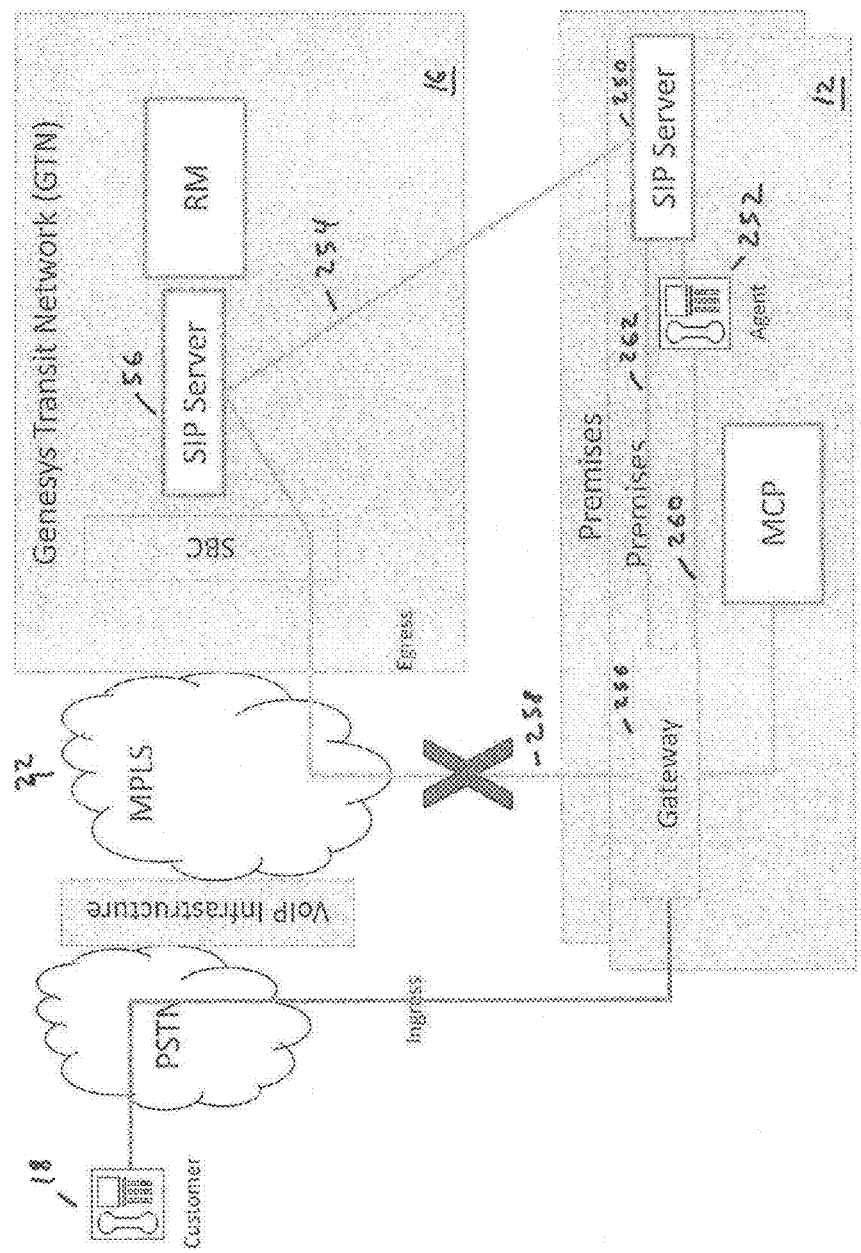
FIG. 9 is a schematic block diagram of a hybrid operations environment with failover capabilities according to one embodiment of the invention.

FIG. 9 is a schematic block diagram of a hybrid operations environment with failover capabilities according to one embodiment of the invention. In the illustrated embodiment, the SIP server 56 is deployed in an active/hot-standby pair. For example, the remote SIP server 56 in the remote operations environment 16 may be deployed as a primary instance, while a local SIP server 250 in the contact center premise is deployed as a standby (failover) instance. Although a SIP server is used as an example for which failover capabilities are provided, a person of skill in the art should recognize that other contact center components may have similar failover capabilities.

According to one embodiment, an agent registers with the local SIP server 250 his or her registration information including, for example, a directory number associated with an agent device 252. The local SIP server 250 deployed as the hot-standby instance proxies the registration to the remote SIP server 56 deployed as the primary instance. In this regard, a copy of the agent registration information is forwarded to the remote SIP server 56 over a data link 254 for storing therein.

In the illustrated embodiment, an inbound call arrives at a media gateway, session border controller, or SIP server (collectively referred to as media gateway 256) which attempts to transmit, over a data link 258 traversing the private network 22, a request to route the call to the remote SIP server 56. If the request is successfully received by the remote SIP server 56, and assuming that the call is to be routed to the agent device 252, the SIP server signals the media gateway 256 to route the call to the agent device based on the registration information stored at the remote SIP server 56. A media channel 260 is then established to the agent device 252 for communicating with the end user device 18.

In the event, however, that the remote SIP server 56 does not respond within a preset amount of time to the request to route from the media gateway 256, the local SIP server 250 takes over, and the media gateway proceeds to send the request to the local SIP server over a local data link 262.

Figure 10:
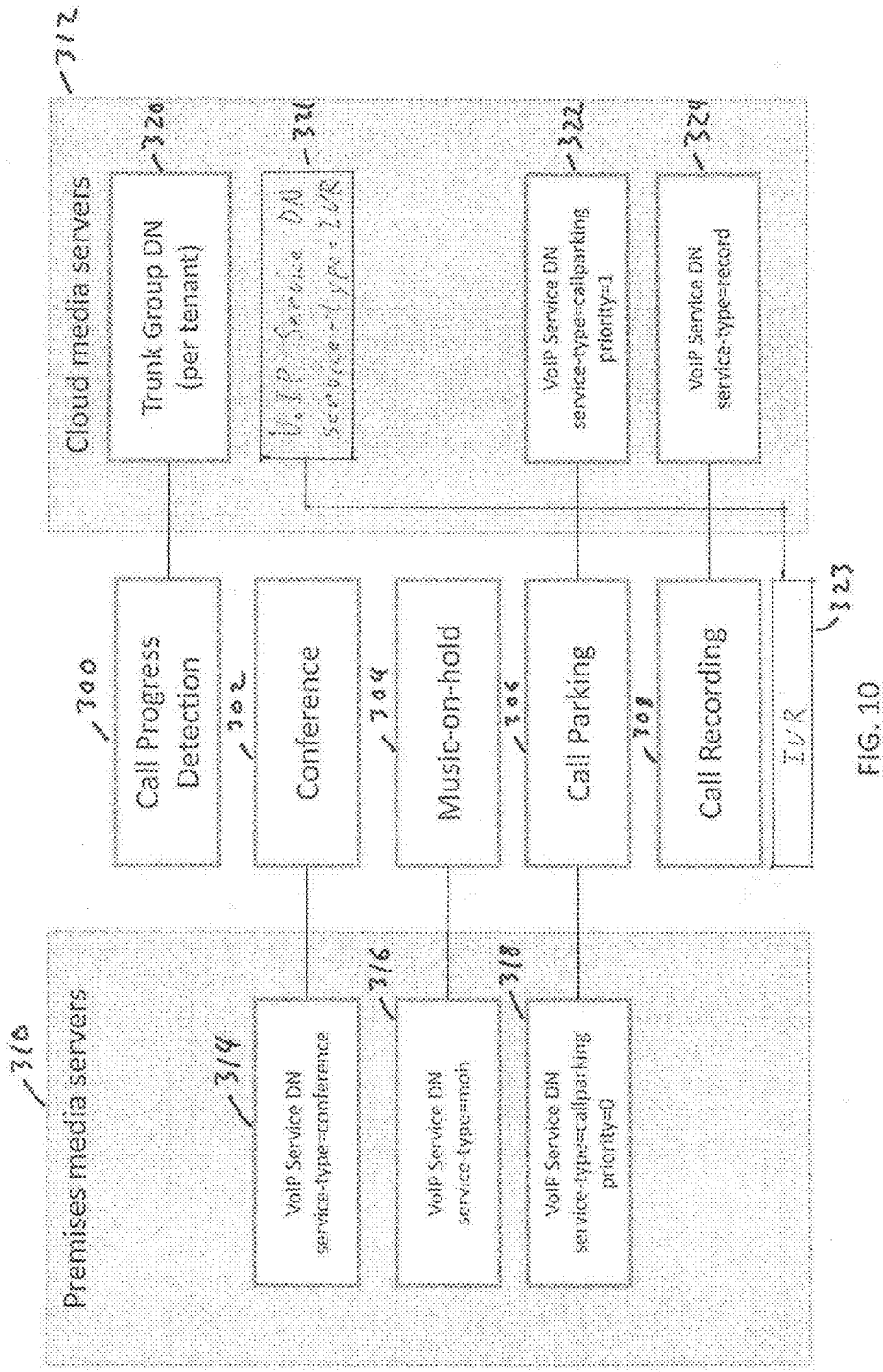
FIG. 10 is a schematic layout diagram of distribution of various media services in a hybrid operations environment according to one embodiment of the invention.

FIG. 10 is a schematic layout diagram of distribution of various media services in a hybrid operations environment according to one embodiment of the invention. The media services include but are not limited to call progress detection 300, conference 302, music-on-hold 304, call parking 306, call recording 308, and IVR self-service. Services such as conference 302 and music-on-hold 304 may be provided by one or more media controllers 310 at the contact center premise 12 by storing in the SIP server as the contact parameter 314, 316 for these services, the address of the resource manager at the contact center premise 12. Other services such as call progress detection 300, call recording 308, and IVR self-service 323 may be provided by one or more media controllers 312 at the remote operations environment by storing in the SIP server as the contact parameter 320, 321, 324 for these services, the address of the resource manager at the remote operations environment 16.

Other services, such as, for example, call parking 306 may be configured to be provided by media controllers 310, 312 at the contact center premise 12 as well as in the remote operations environment 16, in order to provide overflow support. The media controller that is to be invoked first is determined by a priority level stored by the SIP server in the contact parameter 318, 322 set for the service. In the illustrated example, the priority level set for the media controller 310 at the contact center premise (e.g. priority=0) signifies a higher priority than a priority level set for the media controller 312 in the remote operations environment (e.g. priority=1).

The SIP server transmits a request for media service to the media controller 310 at the higher priority. If the media controller 310 has reached a maximum threshold configured for the media controller, the SIP server receives a SIP response from the resource manager indicating this fact. The SIP server then sends the request to the overflow media controller 312 at the lower priority. The overflow media controller 312 continues to provide media services in response to requests from the SIP server until the load in the primary media controller 310 falls below a desired threshold.

Figure 21:
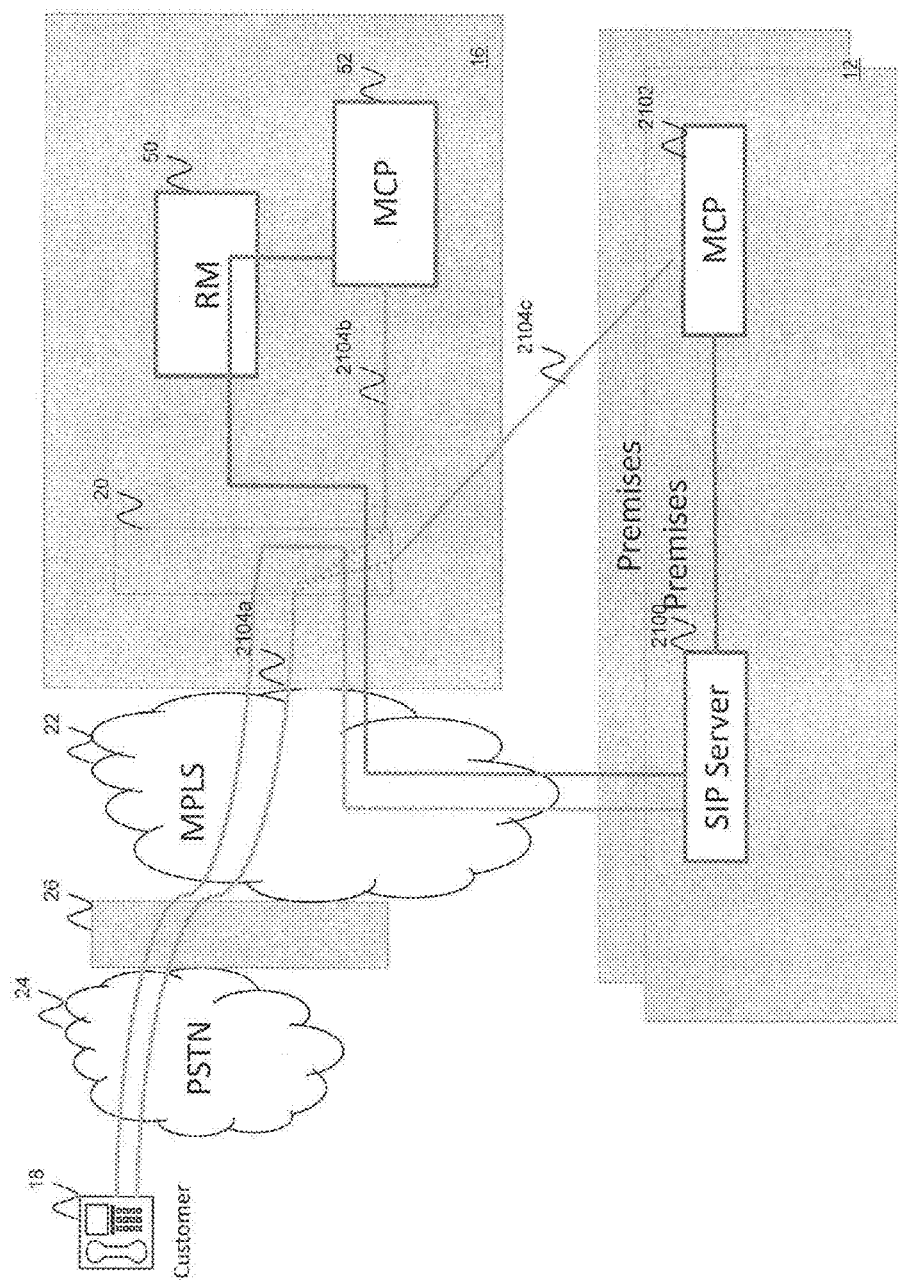
FIG. 21 is a schematic block diagram of a hybrid operations environment for providing media services according to one embodiment of the invention.

FIG. 21 is a schematic block diagram of a hybrid operations environment for providing media services according to one embodiment of the invention. In the illustrated embodiment, a SIP server 2100 is deployed at the contact center premise 12. The SIP server may be similar, for example, to the SIP server 56 of FIG. 3.

According to one embodiment, a call to the particular contact center is received by the edge device 20, and the edge device signals the SIP server 2100 to route the call. In response, the SIP server 2100 determines a media service appropriate for servicing a portion of the call, and identifies a media resource based on the type of media service. For example, if the media service is IVR self-service, the SIP server may identify the resource manager 50 in the remote operations environment 52 based on the contact parameter stored in the SIP server for this particular service. In response to the identification, the SIP server transmits a request to the resource manager 50 for connecting the call to the remote control platform 52 which provides voice prompts during the IVR self-service. Thus, for this portion of the call, a call leg 2104a is established from the customer end user device to the edge device, and another call leg 2104b from the edge device 20 to the remote media control platform 52.

During the call, the SIP server 2100 decides that another media service is to be provided for a different segment of the call. For example, the media service may be playing music while the call is placed on hold (e.g. music-on-hold service). The request for this media service may be, for example, from a routing server (not shown) based on a routing strategy executed by the routing server.

In response determining that a second media service is to be provided, the SIP server identifies the location of the media resource (e.g. a local resource manager) to provide the requested service. In the illustrated example, a media control platform 2102 at the local premise is invoked to provide media for the second portion of the call. For a music-on-hold service, the media that is provided by the media control platform 2012 is music configured by the tenant for this service. In this regard, the call leg 2104b from the edge device 20 to the remote media control platform 52 is replaced with a newly established call leg 2104c from the edge device 20 to the media control platform 2102. In this manner, media is moved from the remote operations environment 16 to the local operations environment 12 via control signals transmitted by the SIP server 2100 at the local operations environment.

Figure 22:
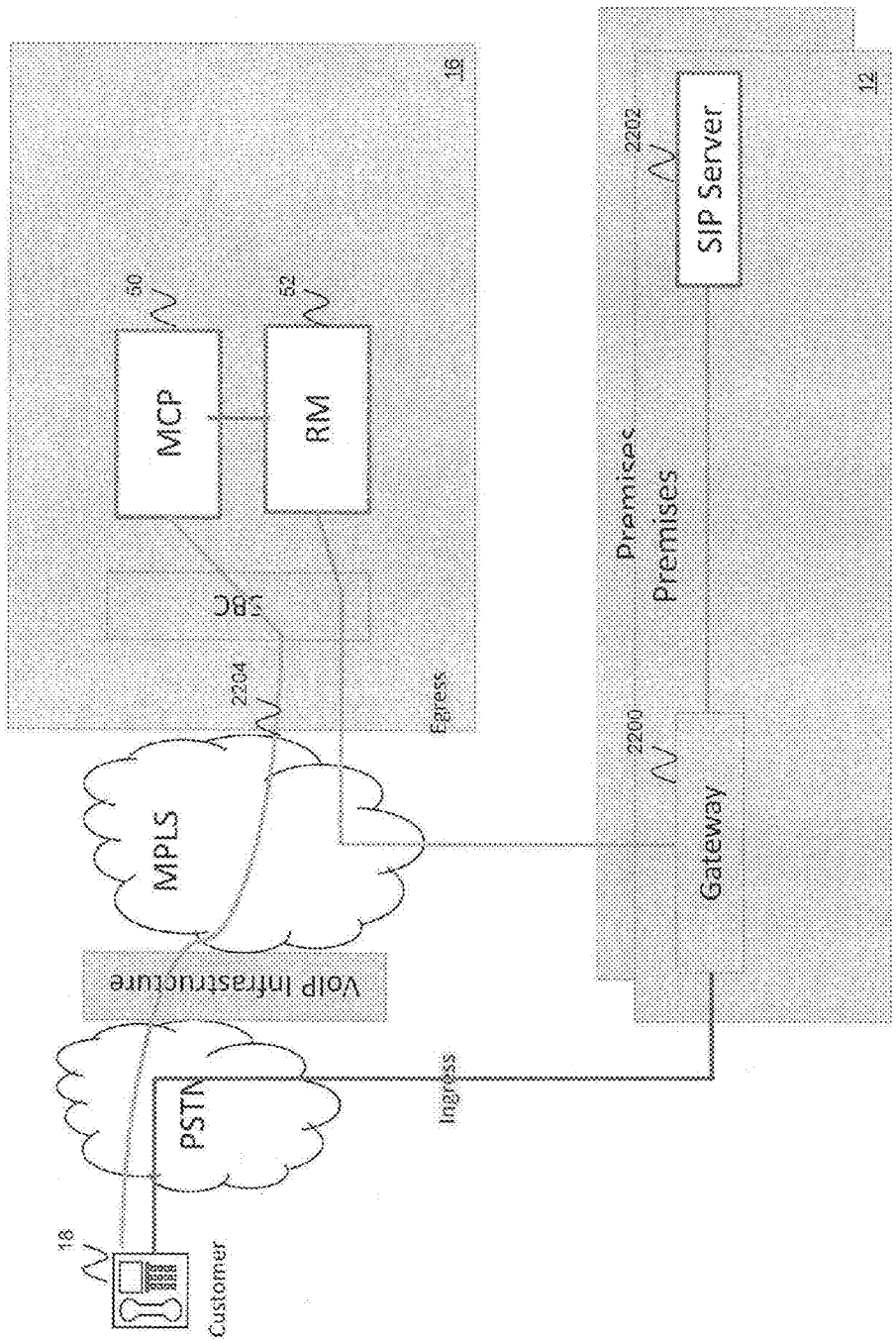
FIG. 22 is a schematic block diagram of a hybrid operations environment for providing media services according to another embodiment of the invention.

FIG. 22 is a schematic block diagram of a hybrid operations environment for providing media services according to another embodiment of the invention. According to this embodiment, a SIP server 2202 is at the contact center premise 12 and media is provided via the resource manager 52 and media control platform 50 in the remote operations environment 16. The SIP server 2202 may be similar to the SIP server 56 of FIG. 2. In the illustrated embodiment, a call from the end user device 18 arrives at a media gateway 2200 at the contact center premise 12 and the SIP server 2202 is invoked for routing the call. When media service is to be provided for the call, the SIP server identifies the resource manager 52 in the remote operations environment 16 (e.g. via the directory number configured at the SIP server for the particular media service), and transmits a signaling message for providing the media service to the resource manager 52. The resource manager forwards the request to the media control platform 50 selected to handle the service, and a media path 2204 is established between the end user device and the media control platform 50. Of course, intermediary software and/or hardware infrastructure may be invoked in establishing the media path.

Figure 23:
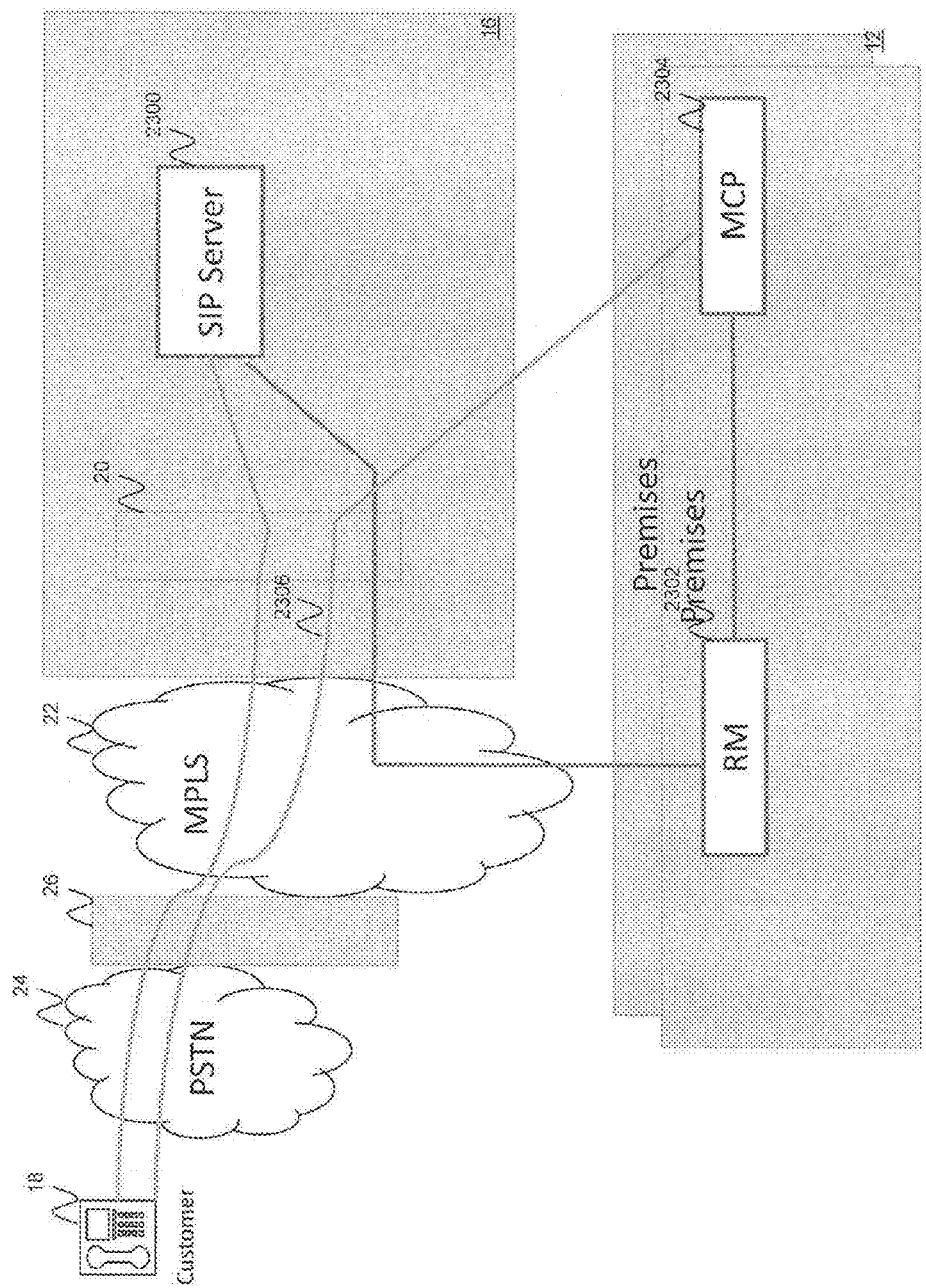
FIG. 23 is a schematic block diagram of a hybrid operations environment for providing media services according to another embodiment of the invention.

FIG. 23 is a schematic block diagram of a hybrid operations environment for providing media services according to another embodiment of the invention. According to this embodiment, a SIP server 2300 is in the remote operations environment 16 for controlling media while media itself is provided via a resource manager 2302 and media control platform 2304 at the local operations environment 12. The SIP server 2300 may be similar to the SIP server 56 of FIG. 2. An inbound call is received at the edge device 20, and a request to route the call is transmitted to the SIP server 2300. If media is to be provided for the call, the SIP server identifiers a resource manager, which, in the example of FIG. 23, is the resource manager 2302 at the contact center premise 12. The resource manager in turn identifies the appropriate media control platform, which, in the example of FIG. 23, is the media control platform 2304 at the contact center premise 12. A media path 2306 is established between the end user device 18 and the media control platform 2304.

III. Geo-Location Based Call Recording

Embodiments of the present invention are also directed to recording in a contact center that provides geo-location support. Geo-location support allows a contact center with multi-site deployment of particular components to select one of the multi-sites for invoking the components in the selected site. This helps minimize WAN traffic or minimize latency in certain situations.

Figure 11A:
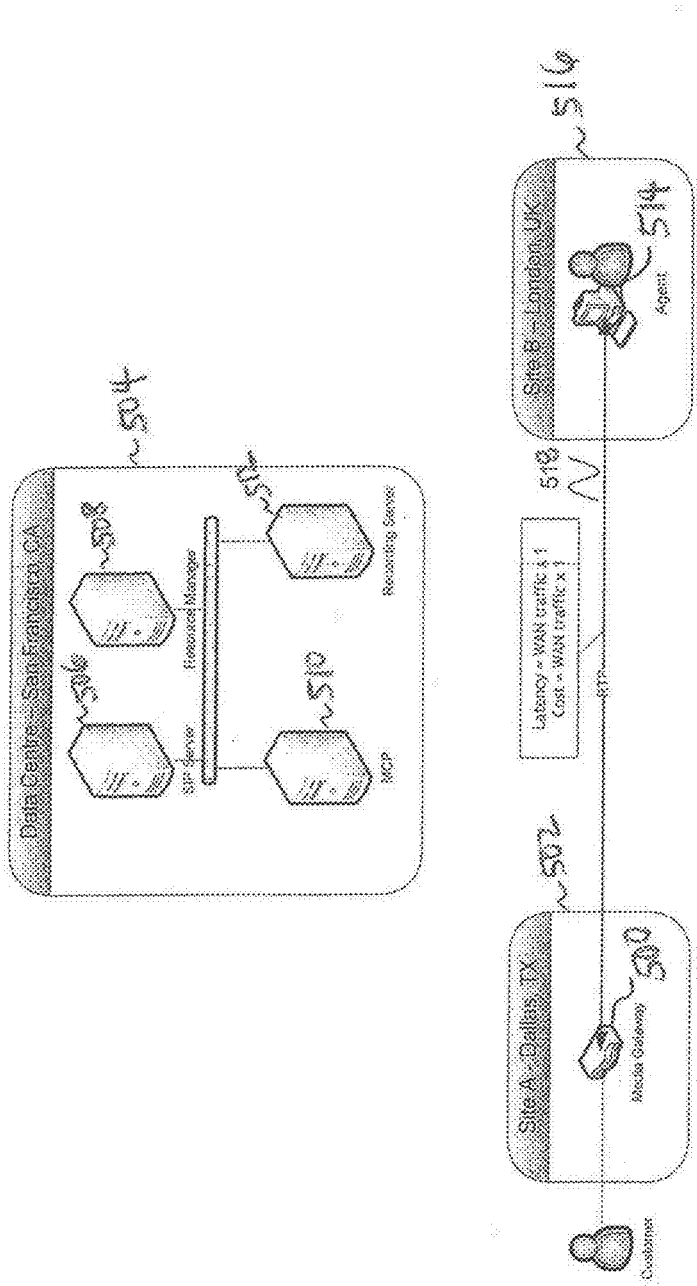
FIG. 11A is a schematic block diagram of a contact center system illustrating cost and latency for an typical VoIP call without call recording according to one embodiment of the invention.

FIG. 11A is a schematic block diagram of a contact center system illustrating cost and latency for an typical VoIP call without call recording according to one embodiment of the invention. In the illustrated embodiment, a customer utilizes a media gateway 500 in a particular geographic location 502 (e.g. Dallas, Tex.), to transmit a VoIP call to a contact center located in another geographic location 504 (e.g. San Francisco, Calif.). One or more appliances 506-512 hosted at the contact center premise 504 may be invoked for routing the call. For example, a SIP server 506 may determine that the call should be routed to an agent device 514 located in a second geographic location 516 remote to both the first geographic location and the second geographic location. A media channel 518 that traverses the wide area network, such as, for example, the public Internet, is established between the media gateway 500 and the agent device 514. Voice data is transmitted via the media channel. The latency and traffic created in transmitting the voice data is the latency and traffic associated with traversing the wide area network once, for each voice packet transmitted between the customer and the agent.

Figure 11B:
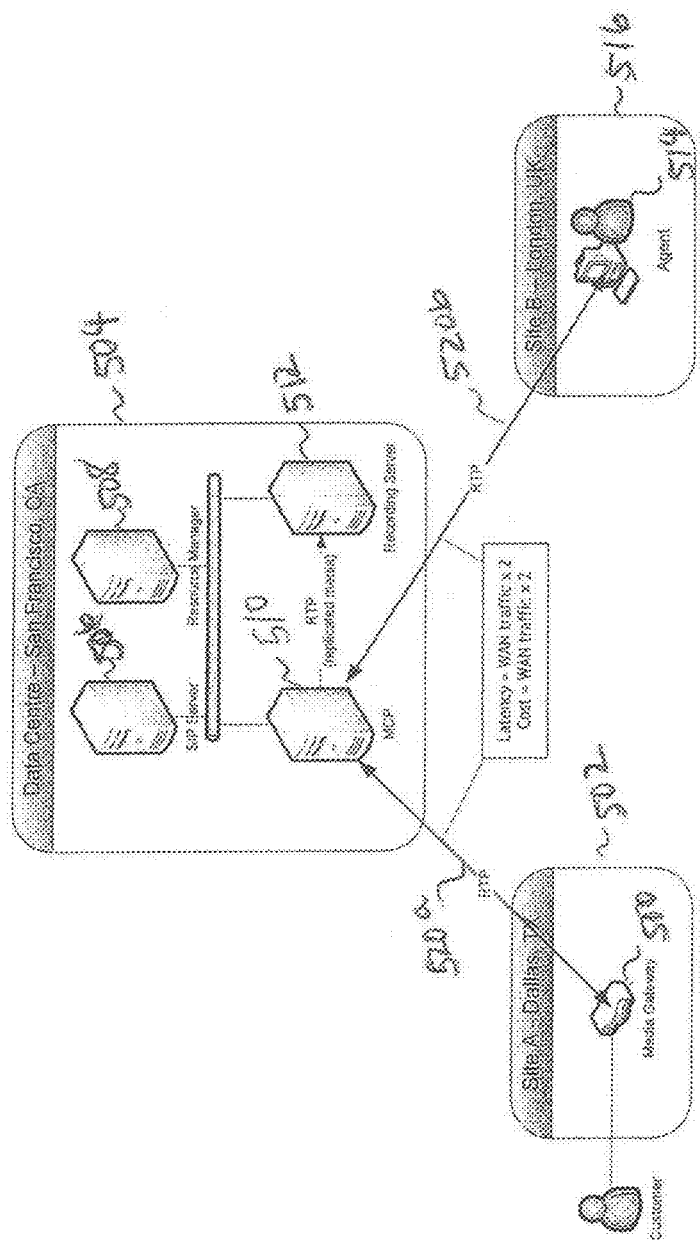
FIG. 11B is a schematic block diagram of the contact center system of FIG. 11A, illustrating cost and latency involved for the call between the customer and agent, but with call recording enabled.

FIG. 11B is a schematic block diagram of the contact center system of FIG. 11A handling call recording according to existing solutions. In the illustrated prior art system, both the media control platform 510 and the recording server 512 are deployed at the contact center premise 504. Thus, in response to the SIP server 510 transmitting a command to the media control platform 510 to record the call between the customer and the agent, an established media path 520a, 520b is bridged through the media control platform 510 at the contact center premise 504, and media transported over the media path is recorded by the recording server 512 also at the contact center premise. This solution, however, doubles the traffic over the wide area network given that the traffic first traverses to the media control platform 510 before reaching its destination. The solution also adds to the latency of the media path. Such latency, however, may not be acceptable for real-time calls.

According to one embodiment, a contact center is enabled for geo-location-based call recording which helps minimize latency and cost associated with traditional call recordings.

Figure 11C:
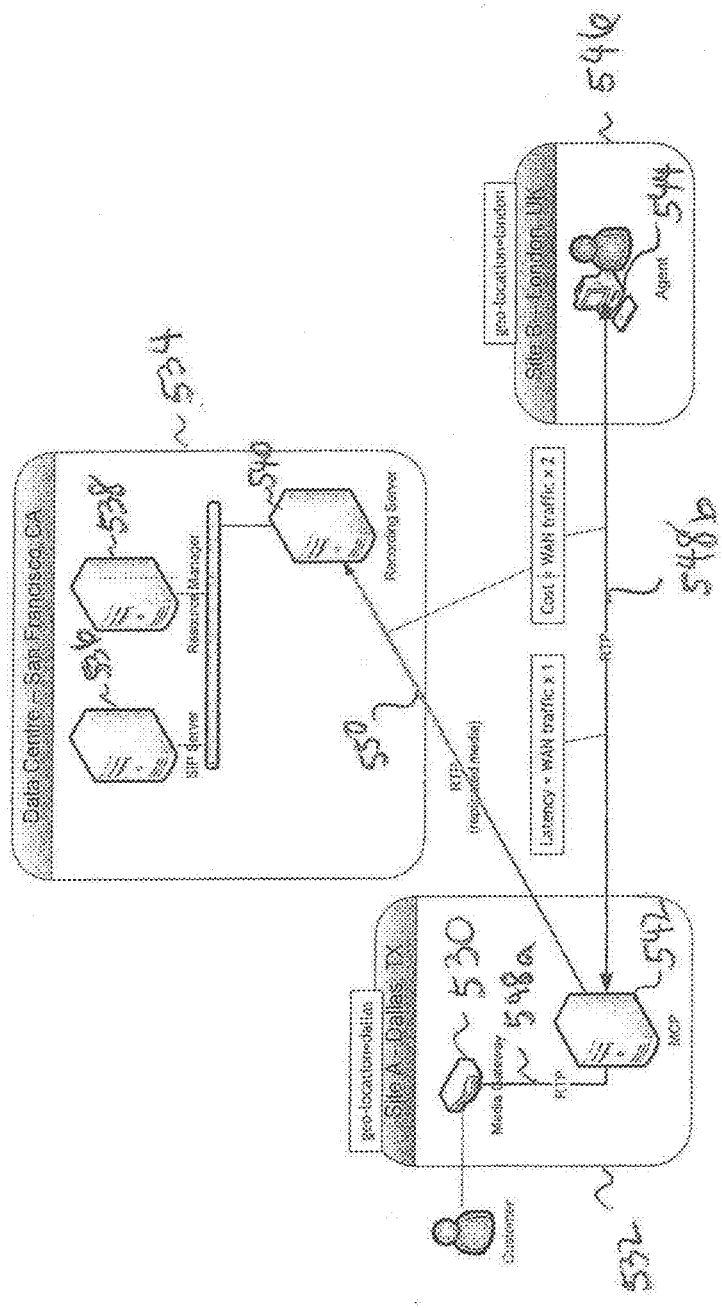
FIG. 11C is a schematic block diagram of a contact center system configured for geo-location based call recording according to one embodiment of the invention.

FIG. 11C is a schematic block diagram of a contact center system configured for geo-location-based call recording according to one embodiment of the invention. As in the example of FIG. 11B, a customer utilizes a media gateway (which could be replaced by an SBC or SIP server) 530 in a particular geographic location 532 (e.g. Dallas, Tex.), to transmit a VoIP call to a contact center located in another geographic location 534 (e.g. San Francisco, Calif.). According to one embodiment, the contact center premise hosts appliances such as, for example, a SIP server 536, resource manager 538, and recording server 540. In other embodiments, one or more of the appliances may be hosted in a remote operations environment such as, for example, the remote operations environment 16 of FIG. 6.

According to one embodiment, one or more media control platforms 542 associated with the contact center are distributed to different geographic regions, such as for example, the geographic location 532 at or near the media gateway 530. According to one embodiment, a pool of media control platforms 542 is deployed in each geographic region. For example, a pool of media control platforms associated with a particular contact center may be deployed somewhere in North America, another pool of media control platforms may be deployed somewhere in Europe, and yet another pool of media control platforms may be deployed somewhere in Asia. The exact locations may depend on various factors, such as, for example, the location of the contact center premise, amount of business conducted in certain geographic regions, locations of agents, and the like.

According to one embodiment, other contact center components such as the recording server 540, SIP server 536, and resource manager 538 are not distributed to the various geographic locations. This helps minimize cost for the contact center without compromising quality of real time calls between a customer and an agent. In other embodiments, one or more of the other contact center components are deployed to the various geographic regions.

In the example of FIG. 11C, a customer utilizes the media gateway 530 to initiate a call to the contact center. A SIP server 536 at the contact center premise 534 routes the call to an agent device 544 in a geographic location 546 remote from both the geographic location 532 of the media gateway 530 and the contact center premise 534. The SIP server 536 further determines that the call should be recorded based on, for example, a DN of the agent handling the call, an express request from the agent, or other configuration parameters accessed by the SIP server for the contact center. The SIP server 536 selects a geographic region based on one or more configuration parameters, and forwards the selected geographic region (e.g. geo-location=dallas) to the resource manager 538 along with a request to record the call. The resource manager in turn runs a routine for selecting a media control pool tagged to the identified geographic region. An appropriate media control platform is selected from the pool based on load balancing and other considerations, and a message for recording the call is transmitted to the selected media control platform. An established media path 548a, 548b is bridged through the selected media control platform 542. Assuming that the media control platform 542 is local to the media gateway 530, the media path 548a between the media gateway and the media control platform 542 traverses a local network. Network latency is assumed to be negligible when media is sent over the local network.

The media path 548a between the media control platform 542 and the agent device 544 traverses a wide area network. The latency associated with the media path 548b is the latency associated with traversing the wide area network once. Thus, overall latency in the recorded media communication between the customer and the agent is minimized when compared to the prior art solution described with respect to FIG. 11B.

According to one embodiment, the replicated media is transmitted for recording to the recording server 540 over the wide area network via a media path 550. Any delay encountered in transmitting the media due to traffic on the wide area network may be acceptable due to the fact that the replicated media is generally not required to be available in real time. In other embodiments, the recording server 540 is deployed in the same geographic location as the media control platform 542. According to those embodiments, the replicated media traverses a local network instead of the wide area network.

According to one embodiment, configuration of geo-location may happen, for example, in two places: DN objects in a switch, and resource groups for the media control platform and recording servers. A geo-location tag for each DN (of type trunk DN, route point DN, extension DN, and trunk group DN) is assigned for the media control platform and recording server resource groups. A graphical user interface available to a contact center administrator may be used for the assignment of the geo-location tags.

How a geo-location is selected for each call depends on how the SIP server 536 is configured. According to one embodiment, the SIP Server selects a geo-location with the following order or preference for inbound calls:
 1) Geo-location configured in the extension of a request to route a call (RequestRouteCall) (e.g. an agent's telephone extension number);
 2) Geo-location configured in the routing point DN (e.g. a DN for a contact center component which may further route a call);
 3) Geo-location configured in the inbound trunk DN (e.g. DN of a trunk transporting an inbound call); and
 4) Geo location configured in the DN where the recording is enabled.

Of course, other orders are also contemplated. For outbound calls, the following order of preference may be used, although other orders are also contemplated:
 1) Geo-location configured in the extensions of RequestRouteCall;
 2) Geo-location configured in the routing point DN;
 3) Geo-location configured in the agent DN; and
 4) Geo-location configured in the outbound trunk DN if recording is enabled According to one embodiment, when a DN is configured to be recorded, the geo-location set at the DN is selected. When more than one DN involved in the call has a geo-location set (e.g. both inbound Trunk DN and the Routing Point DN have geo-location set), then the SIP server 536 may be configured to select the geo-location based on a configured order of preference, such as, for example, the preference described above.

The selection of the geo-location may also vary based on the routing strategy invoked by the SIP server 502 for routing a particular call. For example, if a parameter "record=source" is set in the extension identified in a request to route the call, then the geo-location of the inbound Trunk DN of the call is selected if configured. If a parameter "record=destination" is set in the extension of the request to route the call, then the geo-location of the agent (extension DN) is selected. Selection of the geo-location may also depend on instructions provided by a party specifically requesting dynamic recording.

IV. Handling Call Recording Failures

Figure 12A:
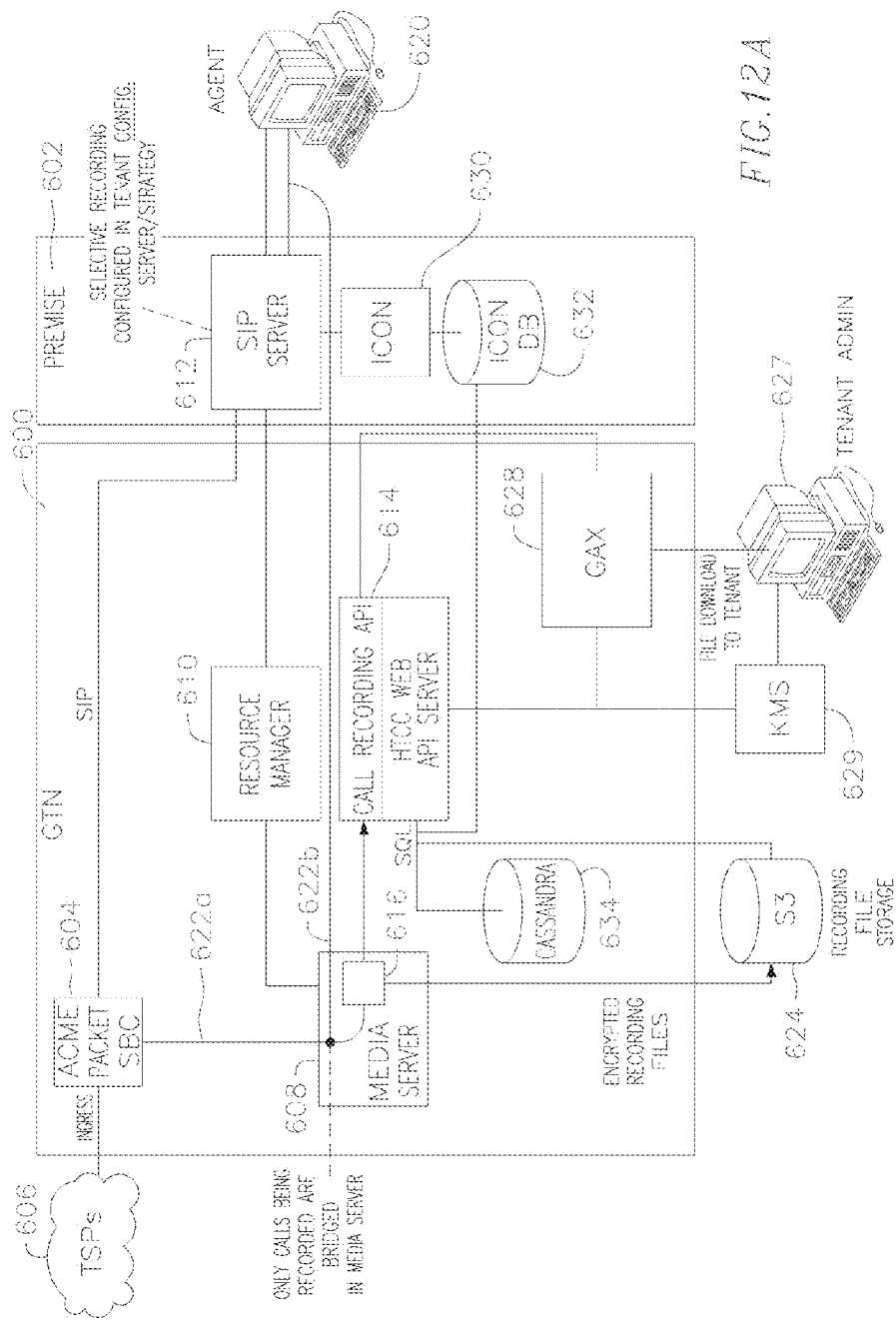
FIG. 12A is a schematic block diagram of a system for contact center call recording and recording posting according to one embodiment of the invention.

FIG. 12A is a schematic block diagram of a system for contact center call recording and recording posting according to one embodiment of the invention. The system includes a remote operations environment 600 with an edge device 604 for routing calls between customers that utilize various telephony service providers 606, and contact center resources in a contact center premise 602. The edge device 604, remote operations environment 600, and contact center premise 602 may be similar to respectively the edge device 20, remote operations environment 16, and contact center premise 12 of FIG. 6.

In the embodiment illustrated in FIG. 12A, the remote operations environment 600 hosts a resource manager 610, media control platform 608, and recording server 616 (which may be incorporated into the media control platform 608), which may be similar to respectively the resource manager 50, media control platform 52, and recording server 400 of FIG. 6.

The contact center premise 602 hosts a SIP server 612 in communication with the resource manager 610 over a wide area network for signaling the media control platform 608 to record media transmitted between an agent device 620 and a customer (via a telephony service provider 606). In this regard, a media path 622a, 662b is bridged by the media control platform 608, and media transmitted over the media path 622a, 622b is replicated and transmitted to the recording server 616 via messages similar to the messages described with respect to FIG. 7.

The system of FIG. 12A further includes a mass storage device 624 configured to store recordings transmitted by the recording server 616. The mass storage device may be, for example, an online storage in a public cloud computing environment offered, for example, by Amazon Web Services (e.g. Amazon S3 online storage web service). The mass storage device 624 may also be a local storage device at the contact center premise 602.

According to one embodiment, the recording is encrypted by the media control platform 608 prior to posting into a bucket associated with the tenant for which recordings are being stored. The encryption of the audio recording may be via an encryption key stored in the IVR profile of the tenant. An authorization key for posting in the mass storage device may also be obtained, as necessary, from the tenant's IVR profile.

According to one embodiment, the remote control environment 600 further hosts a web server 614 providing a call recording API for interfacing with the media control platform 608 and a graphical user interface 628. According to one embodiment, the media control platform 608 uses the API to post call metadata for a recorded call, including a universal resource identifier (URI) or any other link to the recording stored in the mass storage device 624. The graphical user interface 628 accesses the API for accessing call recordings stored in the mass storage device 624, and for performing searching and other analytics on the recordings.

According to one embodiment, a key management server 629 is deployed by a tenant for performing key management for the tenant for encryption and decryption of call recordings. In this regard, the key management server 629 provides a user interface for access by tenant administrators 627 for uploading and managing certificates for the encryption and decryption of the call recordings. The key management server 629 may be deployed in the remote operations environment 600 (or another remote environment) or at the contact center premise 602. In one embodiment, the graphical user interface 628 for accessing the call recordings is integrated into the key management server 629.

The contact center premise 602 may host a server providing an interaction concentrator (ICON) application 630 coupled to an ICON database 632. According to one embodiment, the ICON application receives call and other interaction event details from the SIP server 612 and stores the details in the ICON database 632. The web server 614 is configured to access the ICON database 632 over a wide area network and retrieve event details associated with the call metadata received from the media control platform 616, and store the event details and associated call metadata in a call record maintained in a call database 634.

Figure 12B:
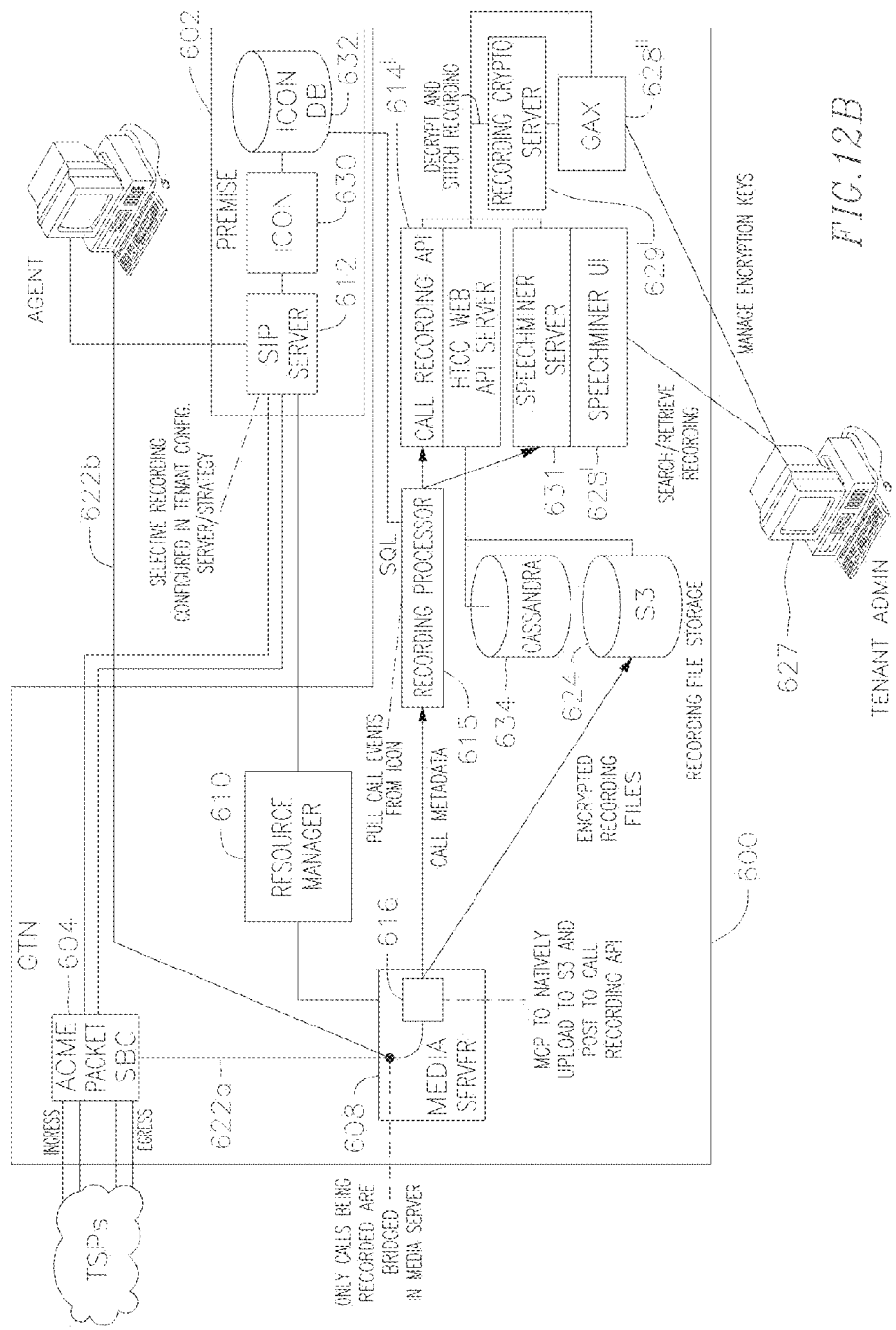
FIG. 12B is a schematic block diagram of a system for contact center call recording and recording posting according to another embodiment of the invention.

FIG. 12B is a schematic block diagram of a system for contact center call recording and recording posting according to another embodiment of the invention. The like element numbers are intended to indicate like elements or features. The key management server according to the embodiment of FIG. 12B is referred to as a recording crypto server 629'. In this illustrated embodiment, the user interface 628 of FIG. 12A is split into a playback user interface 628' and recording user interface 628". The playback user interface 628' provides prompts and other mechanisms for allowing a user to search, playback, and perform other actions (e.g. searches for key words or phrases) relating to recorded calls. The recording user interface 628" provides prompts and other mechanisms for an administrator to manage cryptographic keys maintained by the recording crypto server 629'.

According to the embodiment illustrated in FIG. 12B, a speech server 631 provides the playback user interface 628' to access and invoke various functionalities of the speech server. The speech server 631 may be similar to speech server 54 of FIG. 2, and may provide various speech analytics and text processing functionalities as will be understood by a person of skill in the art.

According to the embodiment illustrated in FIG. 12B, part of the processing by the web server 614 is called out and handled by a separate recording processor 615. Specifically, it is the recording processor 615 which executes instructions to access the ICON database 632, to retrieve event details associated with the call metadata received from the media control platform 616, and to forward the event details and associated call metadata to the web server 614 for storing in a call record maintained in the call database 634. According to one embodiment, the recording processor 615 may be process or thread running in the same or separate processor or computing device as the web server 614.

Figure 12C:
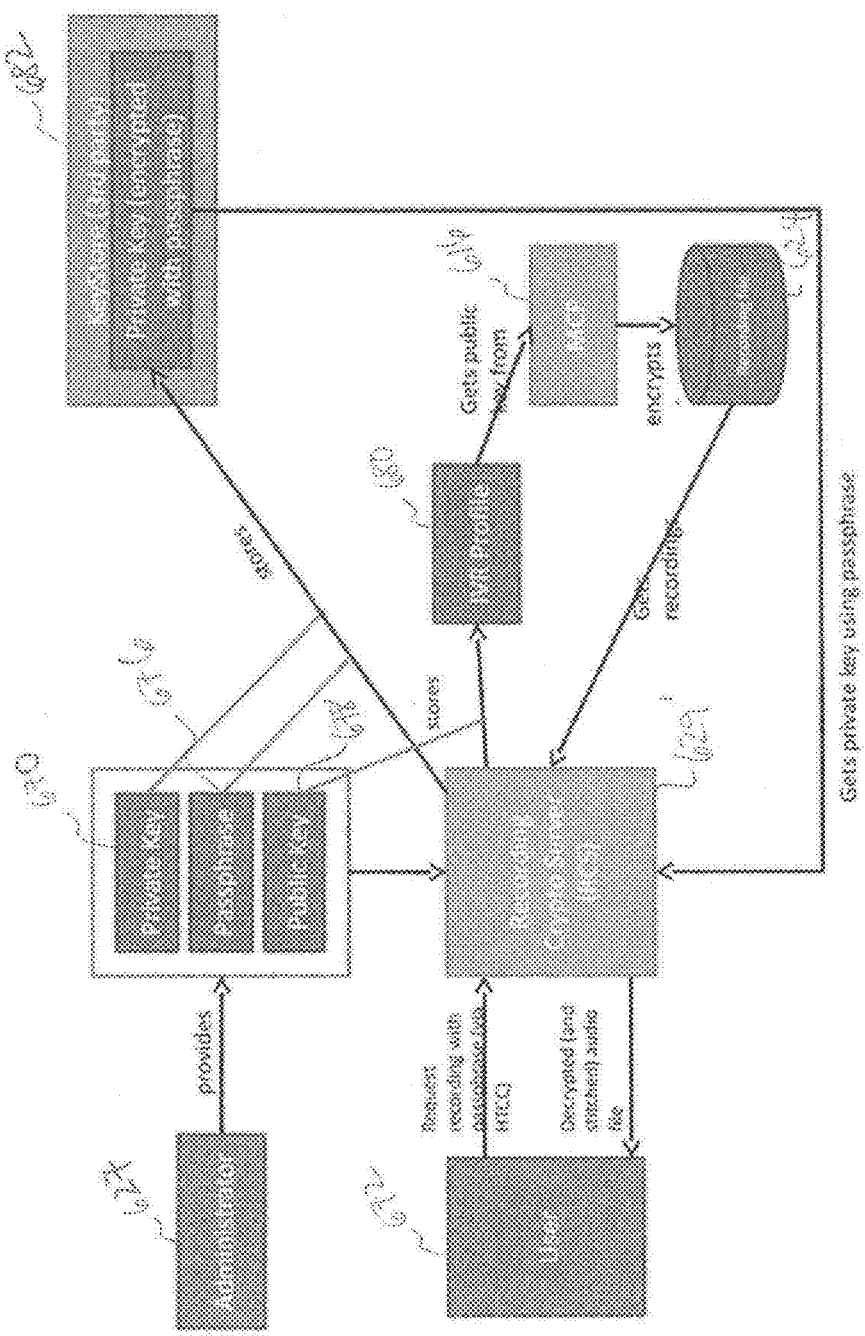
FIG. 12C is a conceptual layout diagram of various components interacting with a key management server for allowing encryption and decryption of call recordings according to one embodiment of the invention.
Figure 12D:
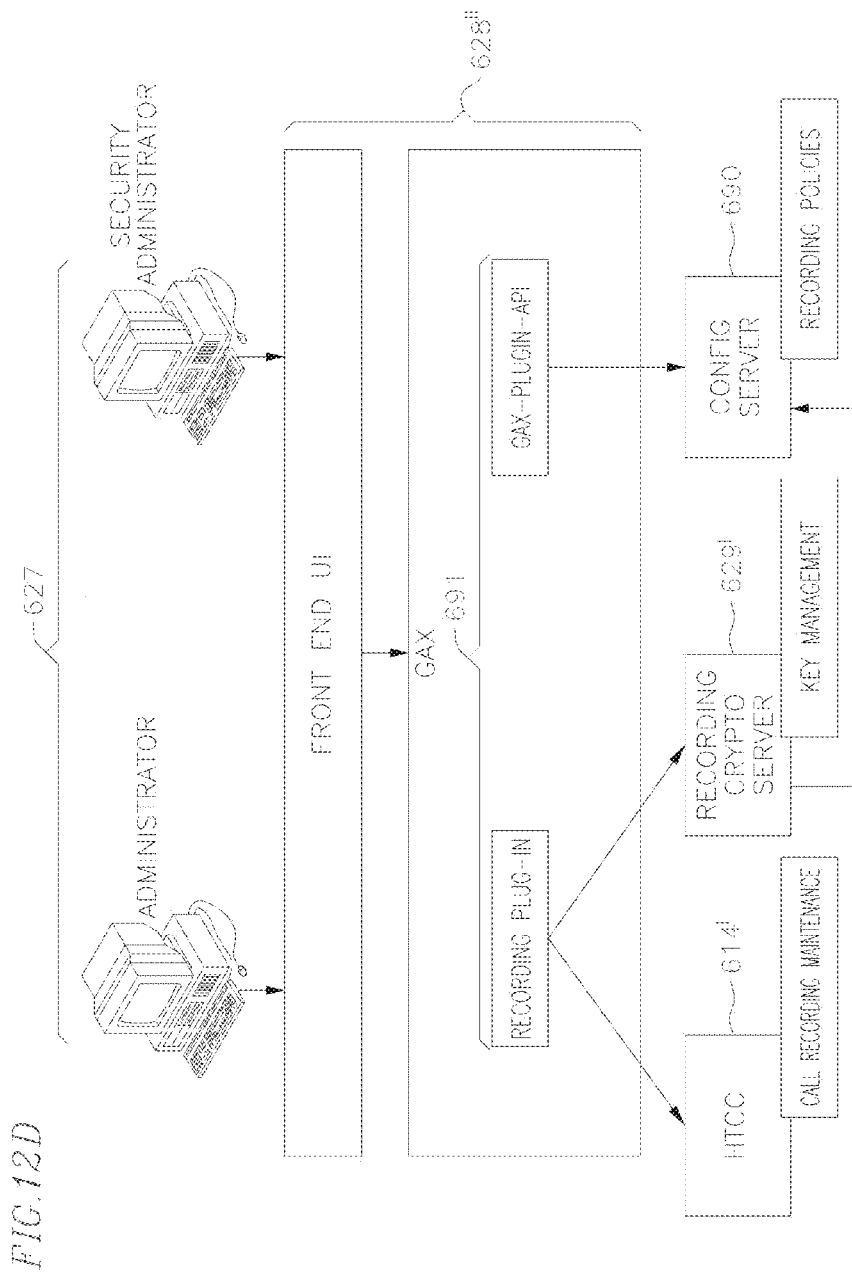
FIG. 12D is a more detailed block diagram of a recording user interface according to one embodiment of the invention.

FIG. 12D is a more detailed block diagram of the recording user interface 628" according to one embodiment of the invention. According to one embodiment, the recording user interface includes a front-end UI as well as a container for one or more plug-ins 691 for providing various recording related functionalities. A tenant administrator 627 may, via an end user device, access the recording user interface 628" for accessing one or more of such functionalities. For example, the administrator may access the interface to provide policies for call recording maintenance by the web server 614'. The administrator may also access the interface for providing cryptographic keys and general key management by the recording crypto server 629'. The administrator may also access the interface for setting call recording policies in a configuration server 690. According to one embodiment, a separate policy is maintained for each tenant, and may include policies such as recording retention policies, policies related to where call recordings are to be stored, policies relating to how a file name is to be generated, and the like.

FIG. 13 is signaling flow diagram for posting a recorded call according to one embodiment of the invention. The media control platform 608 detects in step 654 that a recording for media exchanged between party A 650 and party B 652 has terminated. This may be based, on for example, one of the parties dropping off the call, an end-recording command from one of the parties, or the like.

In step 656, the media control platform 608 encrypts and stores the call recording in the mass storage device 624, and receives, in step 658, from a processor coupled to the mass storage device, a URI to the recording.

In step 660, the media control platform 608 posts to the web server 614 call metadata including, for example, the received URI.

In step 662, the web server 614 or recording processor 615 performs a query of the ICON database 632 for pulling additional call events from the database in step 664. In step 666, the web server stores the call metadata and events in the call database 634. The web server may also cache and batch-update the call records at a later time.

In step 668, the web server 614 informs the media control platform 608 of results of the posting of the call recording.

When the media is bridged through the media control platform 608, the platform becomes a single point of failure for the duration of the communication session. According to one embodiment, if the resource manager 610 detects failure of a particular media control platform 608, the resource manager notifies the SIP server 612 for prompting the SIP server to take alternative action on the call.

Figure 14A:
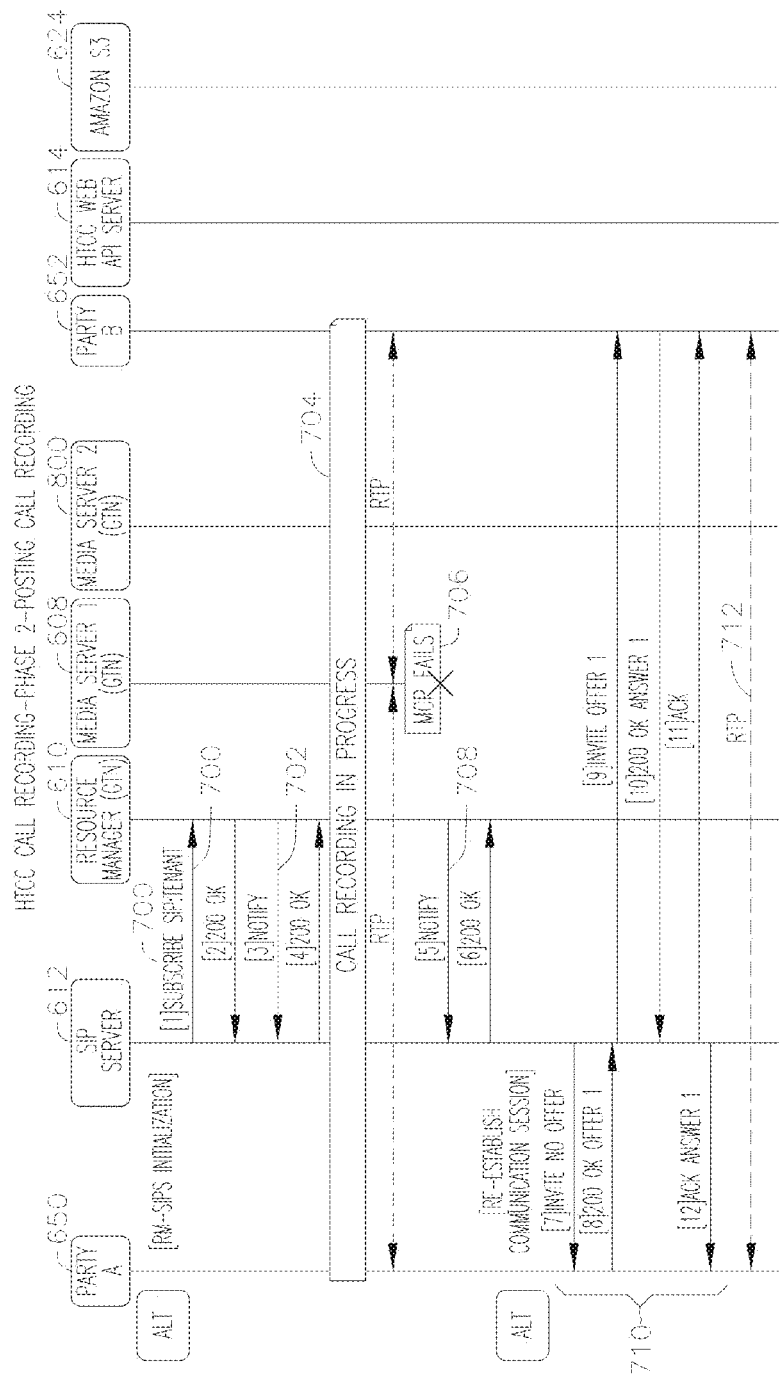
FIGS. 14A-14B are signaling flow diagrams for handling failure of a media control platform during a recording according to one embodiment of the invention.
Figure 14B:
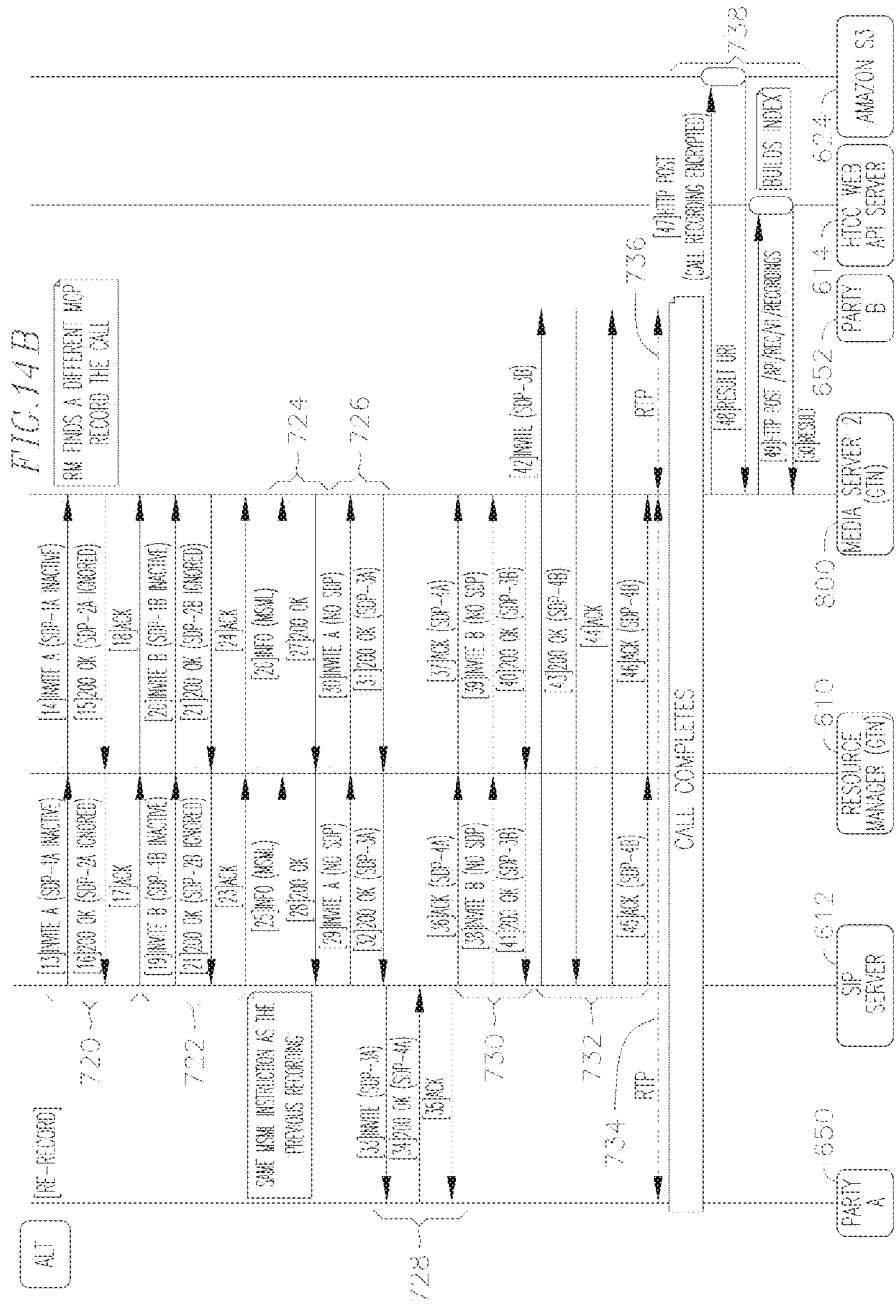

FIGS. 14A-14B are signaling flow diagrams for handling failure of a media control platform during a recording according to one embodiment of the invention. In step 700, the SIP server 612 provides a message to the resource manager 610 for prompting the resource manager to subscribe the media control platform 608 with the SIP server. In response, the resource manager 610 transmits, in step 702, information on the media control platform 608 and other media control platforms it manages and which have been assigned to calls. Each media control platform may handle, for example, hundreds of calls at a time. The SIP server 612 maintains this information in memory until the associated calls terminate.

While a recording for a particular call between party A 650 and party B 652 bridged by the media controller 608 is in progress 704, the media controller fails as depicted via step 706. The failure is detected by the resource manager 610 via, for example, periodic heartbeat messages broadcast by the resource manager to all active media control platforms.

In step 708, the resource manager 610 transmits notification on the specific media control platform 608 that has failed.

The failure of the media control platform 608 results in a break of the media path between party A 650 and party B. Accordingly, in steps which are referenced generally via reference 710, the SIP server 612 quickly re-establishes the disconnected media path via standard SIP messages so that the communication session continues. A media channel is established in step 712, and party A 650 continues to communicate with party B 652.

In steps 720-736, the SIP server 612 attempts to record the call again by initiating a new recording session with the same parameters. The steps taken by the SIP server 612 in establishing the new recording session for a particular call is similar to the steps discussed with reference to FIG. 7. In this regard, the SIP server 612 identifies, based on the subscription information, that the call between party A and party B was assigned to the failing media control platform 608, and engages in pre-negotiation with the resource manager 610 for providing a copy of the established media session between party A 650 and party B 652, to a second media control platform 800 selected by the resource manager 610. According to one embodiment, the information on the media session with party A is provided to the media control platform 800 in step 720 via the resource manager 610 via a session description protocol (SDP) that includes information such as, for example, IP address, port number, and codec used for sending and receiving RTP streams with party A. Information on the media session with party B is similarly provided to the same media control platform in step 722.

In steps collectively referred to as step 724, the SIP server 612 transmits a request to the second media control platform 800 to record the call. In this regard, during signaling which is collectively referred to as step 726, the SIP server 612 transmits an INVITE message to the media control platform 800 (via the resource manager 610), for establishing a media path with party A 650, in which case the media control platform generates a session based on the session information received in the pre-negotiation phase in step 720 for party A. A media path for the generated media session is then established via signaling between the SIP server 612 and party A 650, as shown collectively as step 728.

Similarly during signaling which is collectively referred to generally as step 730, the SIP server 612 transmits an INVITE message to the second media control platform 800 (via the resource manager 610), for establishing a media path with party B 652. The media control platform generates, in response, a session based on the session information received in the pre-notation phase in step 722 for party B. A media path for the generated media session is then established via signaling between the SIP server 612 and party B 652, as shown collectively as step 732.

Media is then exchanged via established media paths 734 and 736. In this manner, the second media control platform 800 bridges media between party A 650 and party 652, and replicates the media for recording.

The following step 738 for posting the recorded media in the mass storage device 624 is similar to the steps discussed above with respect to FIG. 13.

In addition to re-recording the call upon the failure, the failed media control platform 608 instance also provides a mechanism to recover the recording up to the point of the failure. According to one embodiment, the media control platform 608 stores the call recording on a local disk as the recording is going on, which allows the recording to be submitted later for storing in the mass storage device 624 when the media control platform 608 restarts.

Figure 15:
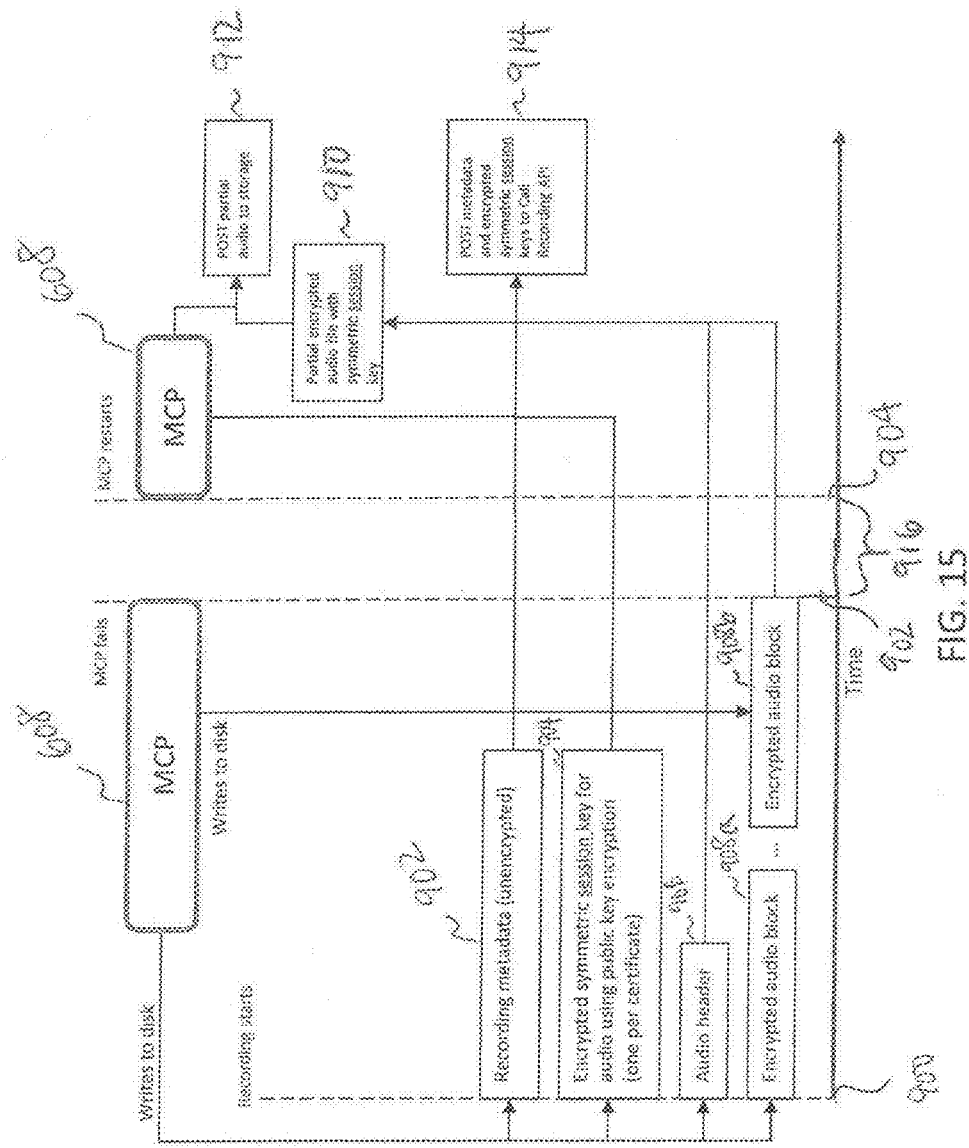
FIG. 15 is a conceptual layout diagram of process for recovering a recording upon failure and recovery of a media control platform according to one embodiment of the invention.

FIG. 15 is a conceptual layout diagram of process for recovering a recording upon failure and recovery of a media control platform according to one embodiment of the invention. Prior to failure of the media control platform 608, recording starts at time 900 and the media control platform writes the call metadata 902 to the local disk. According to one embodiment, once the metadata 902 is written to the disk in the beginning of the recording, the media control platform 608 does not modify the metadata file. Thus, according to one embodiment, runtime information such as timestamps of pause and resume periods are not stored; however, audio masking is done in the audio file so there is no risk not masking the audio of sensitive and/or confidential information. According to one embodiment, the metadata 902 is written to the disk unencrypted since metadata does not contain sensitive information.

In embodiments where the audio recording is to be stored in an encrypted form (based on configuration settings for a particular tenant), the media control platform 608 begins to store encrypted audio recording beginning from time 900. As recording proceeds in time, the encrypted audio recording is temporarily stored in the disk in blocks 908a, 908b. According to one embodiment, the media control platform 608 uses an encryption algorithm based on, for example, the Advanced Encryption Standard (AES), which allows block cipher so that encrypted audio may be written in blocks.

According to one embodiment, the media control platform 608 randomly generates a symmetric session key and uses the generated key to encrypt the audio. The session key is further encrypted using, for example, a public key provisioned for the tenant, and the encrypted session key 904 is also written to the disk at time 900 when the recording begins. According to one embodiment, the encryption of the session key is according to any one of various public key cryptography mechanisms known in the art, such as, for example, public-key cryptography. The media control platform 608 does not have access to the symmetric key to decrypt the audio file as the key is protected by public key encryption.

According to one embodiment, audio header data 906 is also stored in the disk when recording begins at time 900.

At time 902, the media control platform 608 fails. The recording metadata 902, encrypted session key 904, audio header 906, and encrypted audio blocks 908a, 908b, however, remain on the disk. Assuming that conversation continues during time 916, the conversation is recorded by the second media control platform 800 as discussed with respect to FIGS. 14A-14B.

At a later time 904, the media control platform 608 restarts. According to one embodiment, upon restarting, the media control platform 608 checks the local disk and detects recordings in the disk. The media control platform 608 packages the audio blocks 908a, 908b into a partial encrypted audio file 910, and posts the file to the mass storage device 624. In addition, the media control platform 608 submits the recording metadata and the encrypted session key to the call recording API of the web server 614. Once the media control platform 608 submits the encrypted audio and full metadata to the call recording API of the web server 614, the temporary files are removed from disk.

According to one embodiment, the audio in the partial audio file is associated with a timestamp so that, upon playback, the partial audio file is played in the correct order relative to other audio recordings that may have been written to the mass storage device by other media control platforms (e.g. the second media platform 800 that takes over after failure of the media control platform 608), for the same call. In this regard, all audio files associated with a particular call are retrieved upon a command for playback, and the various call recording segments (each stored in a separate audio file) are stitched together so that the audio stored in each call recording segment is played in the correct order. The fact that the recording of a call may be segmented into different audio files, however, is made transparent to a user who may be searching and selecting an audio recording to be played. That is, the playback graphical user interface 628' displays a single entry for a call recording which may be identified, for example, by a time, date, and identification of the members in the conversation.

FIG. 16 is a diagram of a structure of call recording metadata provided to the web server 614 according to one embodiment of the invention. The metadata includes a "recordings" array 1000 which stores metadata for a recording segment for a call. From the perspective of the media control platform 608, it posts a single recording segment. Thus, according to one embodiment, the array size for the "recordings array" is one. The "recordings" array includes the following parameters:

"uri" 1002 contains the URI of the posted call recording in the mass storage device 624.

"start" 1004 is a start time of the call recording.

"end" 1006 is an end time of the call recording.

"duration" 1008 is a duration of the call recording in seconds.

"parameters" 110 include certain parameters applied in the call recording. This may include, for example, IVR profile service parameters.

"metadata" 1012 are metadata parameters passed by the SIP server 612 to contain relevant metadata about the call recording, such as, for example, the number that was called 1014, number for the caller 1016, directory number of the agent who handled the call, and the date and time the call was handled 1020.

"masks" 1022 is an array of timestamps and type information that represent periods of pause and resume requests received for the recording segment.

"pkcs7" 1024 is a parameter for storing the encrypted session key provided by the media control platform 608 if the call is encrypted. The symmetric session key(s) are encrypted via a public key and stored as a base64 string.

A "metadata" parameter 1026 is also provided with a single property referred to as a "uuid" for storing a unique identifier for the call.

V. Call Recording Encryption

As discussed above, certain tenants (e.g. contact centers providing banking services) may want call recordings to be encrypted. As discussed above, one or more session key(s) may be used to encrypt the audio recordings for a tenant. The session keys may be protected via any public key cryptography mechanism known in the art. According to one embodiment, a public-key cryptography system (PKCS), e.g. PKCS#7, is utilized. Other types of public key infrastructure (PKI) may also be used, such as for example PGP (pretty good privacy) mechanism. The various keys described herein are generally referred to as cryptographic keys.

According to one embodiment, the recording crypto server 629' deployed by a tenant provides manages public key certificates for the tenant for binding a public key with the tenant. Multiple certificates may be maintained for each tenant.

FIG. 12C is a conceptual layout diagram of various components interacting with the recording crypto server 629' for allowing encryption and decryption of call recordings according to one embodiment of the invention. A tenant administrator 670 accesses the recording user interface 628" (FIG. 12B) for providing various pieces of information when uploading a public encryption key for each certificate to the recording crypto server 629'. According to one embodiment, the tenant administrator provides a private key 674 (also referred to as a decryption key) used to decrypt the session key, a customer-assigned passphrase 676 used to protect the private key, and a public key 678 used to encrypt the session key. Although embodiments of the present invention contemplate a passphrase, a person of skill in the art should recognize that the passphrase may be replaced with a password, passcode, or any other information that authenticates a user. Also, one or more public keys may be used for encrypting the session key.

The recording crypto server 629' stores the public key(s) 678 in the IVR profile 680 for the tenant. The IVR profile 680 may be maintained, for example, by the configuration server 690 (FIG. 12D). The public key is then provided to the media controller 616 for encrypting an audio recording. In this regard, when the resource manager 610 forwards a recording request to the media control platform 608, the resource manager provides a database identifier of the IVR profile for the tenant for whom the request is provided, and the media controller 616 retrieves the public encryption key from the IVR profile for performing the encryption of the session key. According to one embodiment, if the tenant does not require encryption, the certificate is not configured in the IVR profile. The media control platform does not encrypt an audio recording if the certificate is not configured for a tenant.

In regards to the private key 674 received by the recording crypto server 629', the server stores the private key in a key storage appliance 682. Security of the private key against unauthorized users is aided by encrypting the private key with the passphrase 682. In this regard, the key storage appliance is a hardware encryption appliance that encrypts the decryption key with the customer assigned passphrase. When a user 672 is ready to retrieve an audio recording, he or she accesses the playback graphical user interface 628' (FIG. 12B) to identify the appropriate recording (or portion of the recording) to listen to. The user 672 further provides the passphrase 676 along with a request for the identified recording, which is received by the web server 614' and forwarded to the recording crypto server 629'. The passphrase is used by the recording crypto server 629' to access the key storage appliance 682 and obtain the private key 674. According to one embodiment, the passphrase is used to decrypt the encrypted private key.

According to one embodiment, the recording crypto server 629' is configured to periodically rotate the public key 678 for a particular tenant. In this regard, the web server 614 may receive a session key encrypted with a first public key from the media control platform 608. After such encryption, the recording crypto server 629' may receive a new public key, along with a private key associated with the new public key, from the tenant administrator. According to one embodiment, the receipt of the public key causes retrieval and update of metadata of the call recordings stored for the particular tenant. Specifically, the session keys encrypted with the first public key are first decrypted based on the old private key, and re-encrypted using the new public key. The newly encrypted session key is stored in the call record for the call recordings maintained for the tenant.

According to one embodiment, the particular tenant administrator may provide a series of public keys to be stored in the tenant's IVR profile. The recording crypto server 629' may be configured to select, in a rotating fashion, which public key to be used for encrypting a session key. The rotating of the public key may be done on a period or non-periodic basis.

According to one embodiment, the rotation of the public encryption key may be done in batch for a plurality of call recordings. The updating of the public key without updating the session key avoids having to re-encrypt the audio data hosted in the mass storage device 624, avoiding costs associated with fetching the data from the mass storage device, re-encrypting the data, and then posting back to the mass storage device.

According to one embodiment, the playback user interface 628' is invoked for decryption and playback of encrypted audio files by an authorized user. In this regard, the user interface is invoked to select a particular audio recording, and the URI of the selected audio recording is passed to the web server 614 along with the passphrase 676. The web server fetches the encrypted session key and the encrypted audio data, and packages the two components (along with the passcode) as, for example, a single PKCS#7 component that is transmitted to the recording crypto server 629'. The recording crypto server 629' is configured to use the passcode to obtain the private key, and use the private key to decrypt the content and return the decrypted audio to the user via, for example HTTPS (Hypertext Transfer Protocol), or other secure communication protocol.

VI. Call Event Tagging for Contact Center Call Recordings

As described above, the web server 614 receives call metadata for a recording segment for a call. According to one embodiment, a list of call events is submitted to the web server 614 as part of the call recording metadata. Each call event may be associated with a timestamp to allow navigation to the associated portion of the voice file during playback.

FIG. 17 is a diagram of a structure of call recording metadata provided to the web server 614 according to one embodiment of the invention. The metadata includes "metadata" parameters 1100 and a "recordings" array 1102 similar to the "metadata" parameters 1012 and "recordings" array 1000 of FIG. 16.

The call metadata further includes an "events" structure 1104 with an array of events 1106a-1106c. With respect to one exemplary event 1106a, each even includes a timestamp 1108 in which the event occurred for identifying the portion of the voice recording associated with the event. The event data in the example further identifies a DN 1110 of the agent involved in the event, and an event descriptor 1112 (e.g. indicating that a connection was made with the DN). Other events may include, for example, a party joining the call, a party being disconnected to the call, and the like.

FIG. 18 is a conceptual layout diagram of a call record 1800 displayed by the playback graphical user interface 628' according to one embodiment of the invention. According to one embodiment, the call record 1800 is associated with a call conducted on a particular date and time 1801, between a calling number 1803 and a called number 1804. According to one embodiment, information in the call record 1800 might be collapsed until receipt of a user command to expand the call record.

Information in the call record may include, for example, call event data collected for a call. Such event data may be retrieved from the array of events 1106a-1106c stored in the events structure 1104 of FIG. 17. Each call event data may be identified with a time, a telephone number with which the event is associated, a name associated with the number, and a description of the event.

According to one embodiment, tags may be stored as part of the call recording metadata as an event parameter, and displayed under a "call tags" field 1802 when the call record 1800 is displayed. Tags may be similar to events in that tags are associated with a timestamp, a telephone number, a name associated with the number, and an event description. The timestamp indicates the time in which the tag was added. The event description indicates that a tag was added. The telephone number and name identify the person adding the tag.

According to one embodiment of the invention, tags are generated and added as part of the call recording metadata based on actions taken by the contact center agent (as identified via his telephone number and name). The action may be an express command by the agent to add a tag during a particular point of a conversation with a customer. According to one embodiment, the agent device may provide various tag icons, menu items, or the like, that the agent may select depending on a particular subject that was discussed at a particular point in time, customer sentiment (e.g. angry customer which generates an ANGRY_CUSTOMER tag), and any other information about the conversation. The tags may also be generated automatically, for example, based on analysis of customer tone of voice, and the like. In another example, identification of a particular department to which a call is transferred may cause the automatic generating of a call tag. In yet another example, the invoking of particular forms (e.g. a new credit card application form) may cause a tag associated with the form to be identified, associated with a timestamp in which the form was invoked, and added as metadata for the call recording.

According to one embodiment, call recording metadata may be searched and filtered for specific tags. For example, a supervisor may want to search for all calls tagged with a credit card tag. The display may be configured to display the call recordings having this attached data.

The tags may be used to navigate to a specific point in a call recording that may be of interest to the listener. For example, a supervisor may fast forward to the interesting part of the recorded conversation, such as, for example when the conversation switched from credit card to checking account and agent tagged the call as PERSONAL_CHECKING.

According to one embodiment, selection of an event marked by a particular call tag causes identification of the timestamp assigned to the tag, and retrieval of the portion of the audio associated with the timestamp for playing the audio. According to one embodiment, the audio starts playing from the time indicated by the timestamp. The audio plays until the listener commands the playback to stop. The event may be highlighted as the recording plays.

VII. Call Recording Stitching for Multi-Site Contact Centers

According to one embodiment, a call may be transferred from one SIP server which may be located in one location, to another SIP server which may be located in another location, such as, for example, when a call is transferred from one department to another. According to one embodiment, each SIP server 612 is configured to store call event data in a separate ICON database 632. It is desirable to query the multiple ICON databases in order to track call events associated with a particular call across multiple SIP servers.

According to one embodiment, a call uuid generated by each SIP server for the segment of the call handled by the server is associated with a separate call recording metadata. A separate audio file may also be generated for each segment of the call. According to one embodiment, the call recording metadata may be linked to other call recording metadata via, for example, "next" and "previous" properties. The "next" property may be a link (e.g. URI) to a next call metadata record generated when the call is transferred by a current SIP server to a next SIP server, while the "previous" property may be a link to a previous call metadata record generated by a previous SIP server before the call is transferred to the current SIP server.

FIGS. 19 and 20 are diagrams of the structure of call recording metadata generated for different segments of a call according to one embodiment of the invention. In the illustrated example, call recording metadata 2000 is generated for a first segment of a call which occurs before the call is transferred to another SIP server. The transfer of the call causes the generating of another call recording metadata 2002 for a second segment of the call. According to one embodiment, each metadata includes a call uuid identifying the segment of the call, and a link 2010, 2012 to the call recording in the mass storage device 624.

The call recording metadata 2000 for the first segment of the call includes a "next" link 2014 including the call uuid of the next segment of the call. The "next" link thus allows the retrieval of the call recording metadata 2002 generated for the second segment of the call. Similarly, the call recording metadata 2002 includes a "previous" link 2016 including the call uuid of the previous segment of the call. The "previous" link thus allows the retrieval of the call recording metadata 2000 generated for the first segment of the call.

According to one embodiment of the invention, although a single call may be associated with multiple call uuids generated by different SIP servers, a single recording entry may be displayed by the playback graphical user interface 628'. The single recording entry may then be expanded to display the various call events tracked for the call as described with respect to FIG. 18. The playback graphical user interface 628' may be configured to follow the links in the call metadata records generated for each call segment for identifying call events associated with multiple call segments handled by different SIP servers. By following the links and identifying all call metadata records associated with the single call, the various call recording files may be identified and stitched together for playback in a seamless manner.

Each of the various servers in the afore-described figures may be a process or thread running on one or more processors in a single or multiple computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

VIII. Network Recording and Speech Analytics

According to one embodiment, a network recording and speech analytics system and method are provided for intercepting and recording calls between two entities that may or may not be part of a contact center. The network recording system is configured to analyze the recordings on a real-time (as the call is occurring) or non-real time (after the call is complete) basis. According to one embodiment, the software and hardware resources needed to record, store, and analyze the call recordings are hosted in a remote computing environment similar to the remote computing environment of the previous embodiments. The call recordings may be encrypted prior to storing as discussed in regards to the previous embodiments.

According to one embodiment, the network recording system is configured to capture contact center agent data such as an agent's name, skill levels, queue information, agent location, and call data (also referred to as attached data) of calls handled by the agent. The call data may include the called telephone number, customer account information (if any), customer history information, and/or any other data maintained in a customer or call database. The captured data is metadata that may then be stored in association with the call recording.

According to one embodiment, calls are processed from the PSTN and forwarded to a remote computing environment where the calls are recorded as they pass-through the remote computing environment, and directed back to a called destination such as, for example, a contact center. The recording of the call is stored in a storage device such as, for example, the mass storage device 624 of FIGS. 12A-12B. Metadata associated with the call (e.g. agent data and call data) is also captured and stored in association with the call recording. Other types of metadata described in connection with the previous embodiments may also be captured and stored.

According to some embodiments, the following metadata may be captured and stored:

1) All metadata obtained via a call server (e.g. SIP server or other call controller coupled to a telephony switch) on a business premise based on the caller's telephone number. In this regard, the network recording system is configured to monitor the call routing behind the telephony switch until the call is disconnected. This enables call monitoring outside of the contact center environment, such as, for example, a financial trading environment.

2) Key words or phrases uttered during the call and captured using any speech recognition system and method conventional in the art. The utterance may be converted into text and stored as metadata for being analyzed for potential actionable event using, for example a system and method as described in U.S. application Ser. No. 13/893,036, filed on May 13, 2013, entitled Actionable Workflow Based on Interaction Analytics Analysis, the content of which is incorporated herein by reference.

3) Multi-channel metadata captured from other media channels before the call arrives at the remote computing environment. According to one embodiment, the local premise of the business may host a conversation server for capturing data from non-voice interactions with the customer using other media channels, such as, for example, web interactions, e-mails, social media interactions, and/or interactions using mobile devices, and leverage this data as part of the metadata and speech/text analysis process. The multi-channel metadata may also be included as metadata for historic record.

4) Mobile application and device information in embodiments where the caller invokes a mobile application via a mobile device to initiate the call. Such information may include, for example, a caller's location, device information, security tokens, application data, and the like.

5) Service control point (SCP) information such as subscriber information of the caller or callee captured at various routing points in the carrier network.

6) Information about the employee engaged in the call such as, for example, employee name, ID, location, computer location, skill level, title, and other data stored in a employee database.

7) Interactions between the caller and an automated response system such as, for example, an IVR.

8) Mobile device application or system information obtained over a data channel separate from the voice call. Such information may include, for example, location of the mobile device, device ID, user ID, authentication tokens, and the like. For example, a customer calling from an iPhone application may provide device, authentication, and application details out-of-band of the voice call, and the data may be stored as metadata in association with the call recording.

According to one embodiment, both the call recording and metadata, once captured, may be accessed through a web browser and secured via local encryption and userid/passwords. The web browser may be provided by the web server 614, 614' of FIGS. 12A, 12B. The web browser may also provide a playback user interface such as the playback user interface 628, 628' of FIGS. 12A, 12B.

Once the calls and metadata are stored, speech analysis tools may be invoked to analyze the stored speech data for automatic speech recognition and text-to-speech functionality. The speech analysis tools may be provided by speech servers similar to speech servers 54 of FIG. 2, and speech servers 631 of FIG. 12B. Speech analysis may be performed to determine, along with the associated metadata, agent/employee performance, quality management, compliance (e.g. compliance in the financial industry with laws such as those provided in the Dodd-Frank Act), fraud detection, and the like. Details of a system and method for automatically classifying a communication based on speech analytics is disclosed in U.S. Pat. No. 7,487,094 entitled "System and Method of Call Classification with Context Modeling Based on Composite Words," the content of which is incorporated herein by reference.

Metadata and call recordings may be stored in the remote computing environment and accessed anytime by an authorized user over, for example, the Internet. Authorized users may decide when or how often to purge the call recordings and associated metadata. Of course, all or a portion of the call recordings and associated metadata may also be stored in a local computing environment.

According to one embodiment, software and hardware needed for call recording and analysis in the remote computing environment may be managed and maintained by a call recording operator/provider. The operator may offer a call recording solution to a customer through a PPU (Pay for Use) business model. The operator may also allow speech analytics to be turned on or off as desired by the customer. For example, the customer may want to turn on speech analytics and "self-discover" customer trends without the need for special programming or implementation. The customer may also decide the percentage of calls that are to be analyzed based on the number of calls being redirected to the remote computing environment from the PSTN carrier. The customer may also decide the period of time in which recordings are maintained and how often the recording and related metadata is purged. Such options may be configured by the customer by accessing a configuration GUI provided by the call recording operator/provider. By offering call recording and analytics from a remote computing environment, the customer need not make changes to its telecommunications routing nor provision settings on its telephony switch. The customer's existing configuration and infrastructure may be leveraged to reduce efforts in providing to the customer the ability to record and analyze calls to the business.

According to one embodiment, in embodiments where the business purchasing the call recording solution is in the financial industry, certain measures may be taken to ensure that an employee of the business utilizes company issued computers and resources during a call between a customer and the employee. In this regard, a cryptographic key may be provided to the calling customer for being presented during the call. The cryptographic key may allow the employee to be authenticated to the company-issued computer to access the caller's information and conduct other transactions using the computer. For example, a trader that receives a call from a client would have to enter the key as part of a login sequence for the customer in order to access the customer's record. The company may determine when and where the application can be accessed. The key helps ensure that the customer does not bypass corporate security and logging controls.

Figure 24:
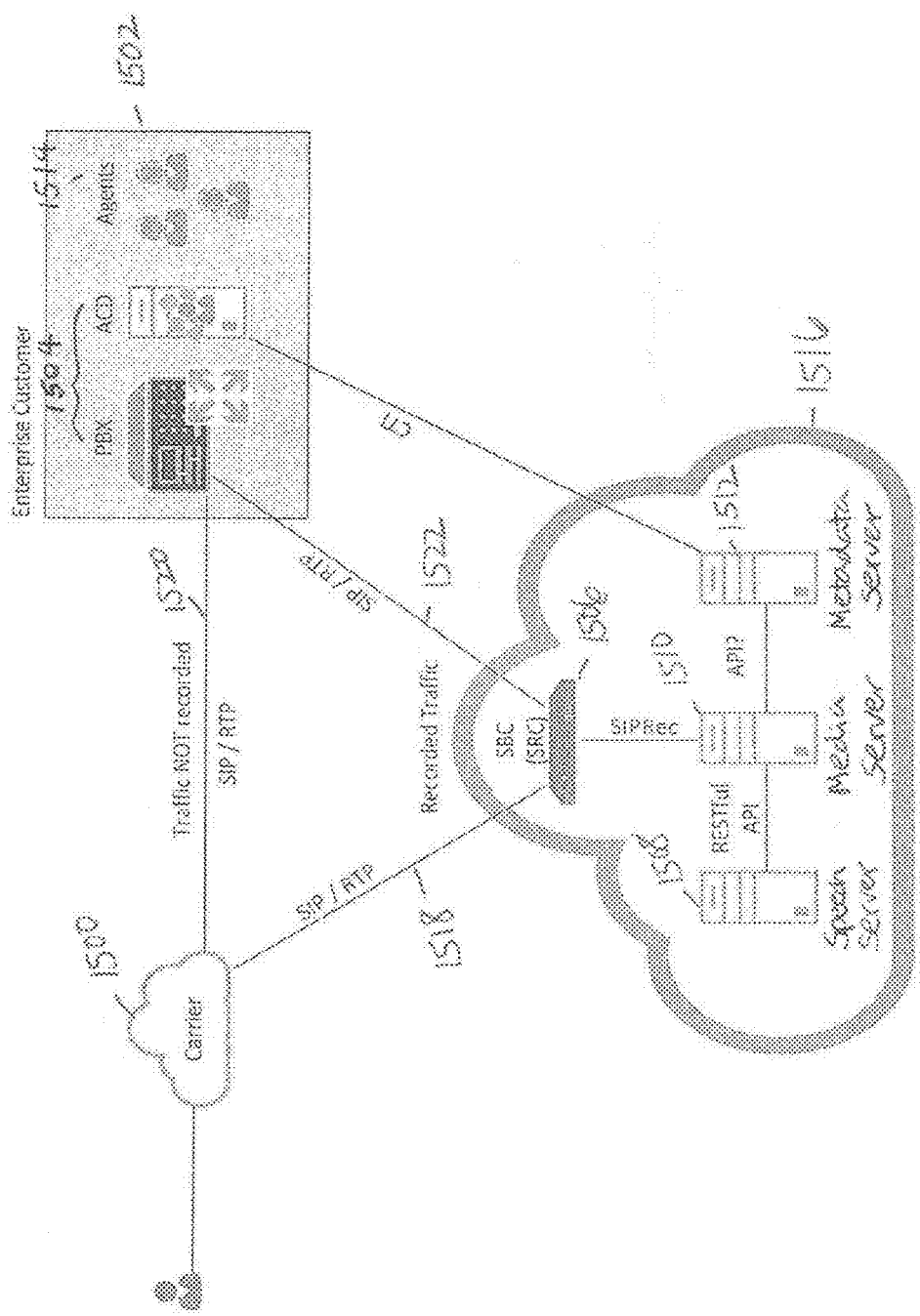
FIG. 24 is a schematic block diagram of a network recording and speech analytics system according to one embodiment of the invention.

FIG. 24 is a schematic block diagram of a network recording and speech analytics system according to one embodiment of the invention. The system includes software and hardware resources (collectively referred to as recording system) in a remote computing environment 1516 similar to the software and hardware resources in the remote computing environment 600 of FIGS. 12A and 12B. Such resources include, without limitation, an edge device 1506, speech server 1508, media server 1510, and metadata server 1512. The edge device 1506 may be similar to edge device 604 of FIGS. 12A and 12B. The media server 1510 may be similar to media server 608 of FIGS. 12A and 12B. The speech server 1508 may be similar to the speech server 631 of FIG. 12B. The metadata server 1512 may be similar to the recording processor 615 of FIG. 12B.

According to one embodiment, a call from a customer is received at a service control point, service management system, or intelligent peripheral (collectively referred to as a routing point) in, for example, a carrier PSTN network 1500. The routing point is configured with logic (e.g. software, hardware, and/or firmware) to route the call to a destination based on the called number. According to one embodiment, the routing point determines prior to routing the call whether the call is to be forwarded to the recording system in the remote computing environment 1516 over a wide area network for recording. The determination may be based, for example, on the called number, a calling number, and/or call volume. For example, the routing point may be configured to identify all (or a percentage) of calls originating from a particular number or directed to a particular number, retrieve rules configured for the matching number (s) to determine whether the call is to be recorded, and if so, forward the call to the recording system. A matching rule may provide, for example, an IP address of the edge device 1506 in the remote computing environment to which to forward the call for recording. The rule may further indicate conditions that are to be satisfied before forwarding the call to the edge device. A call leg 1518 is established via, for example, SIP signaling, between the routing point and the edge device 1506 in response to determining that the call is to be recorded. If the call is not to be recorded, a call leg 1520 is established via, for example SIP signaling, between the routing point and a destination device located at the enterprise premise 1502.

According to one embodiment, the edge device and/or media server 1510 is configured to bridge the incoming call leg 1518 with an outgoing call leg 1522 for allowing exchange of RTP traffic between the calling customer and an enterprise agent 1514. The agent may be any employee of the enterprise and not necessary a contact center agent. Routing rules may not be necessary to direct the call to the employee.

The edge device 1506 may communicate with the media server 1510 to record (e.g. replicate and store) media exchanged during the call. The recording may capture all prompts (e.g. IVR, call queue announcements, etc.) as well as customer and agent conversations. Call recording continues even if calls are transferred between agents or conference together with other agents and/or supervisors, and stops upon detecting the end of the call. According to one embodiment, the call recording is stored in a mass storage device such as, for example, the mass storage device 624 of FIGS. 12A, 12B.

According to one embodiment, the logic that determines whether a call should be recorded or not (e.g. based on call volume) is located at the edge device 1506 or media server 1510. All or a portion of that logic may also be located at a routing point in the PSTN network.

According to the embodiment where the logic is located at the edge device/media server, the routing point at the carrier PSTN network forwards all calls that match a particular number to the recording system, and it is the recording system that determines ultimately that, based on specific rules configured by a customer subscribing to the recording service, that the call is to be recorded. A separate accounting server (not shown) may also be invoked to keep track of recordings and analytics performed for the particular customer for appropriate billing of the customer.

The metadata server 1512 is configured to capture metadata related to the call for storing in a mass storage device in association with the recorded media. Such metadata may be obtained, for example, via information provided by a switch 1504 at the enterprise premise 1502. The information may include ACD statistics, queue statistics, agent availability, and the like. The captured metadata is stored in a local file system or remote database such as, for example, the call database 634 of FIGS. 12A, 12B.

The speech server 1508 may be invoked to analyze the media for key terms and/or phrases. Captured metadata may also be considered during this analysis. The recorded media, metadata, and/or analysis data (e.g. in the form of reports) may be provided to a requesting, authorized user upon receipt of a command. According to one embodiment, a web interface such as, for example, the playback user interface 628' of FIG. 12B is provided for allowing access by authorized users to reporting and call recording playback.

Each of the various servers, controllers, switches, and/or gateways in the afore-described figures may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

IX. Hybrid Cloud Architecture with Optimized Local Delivery

Figure 25:
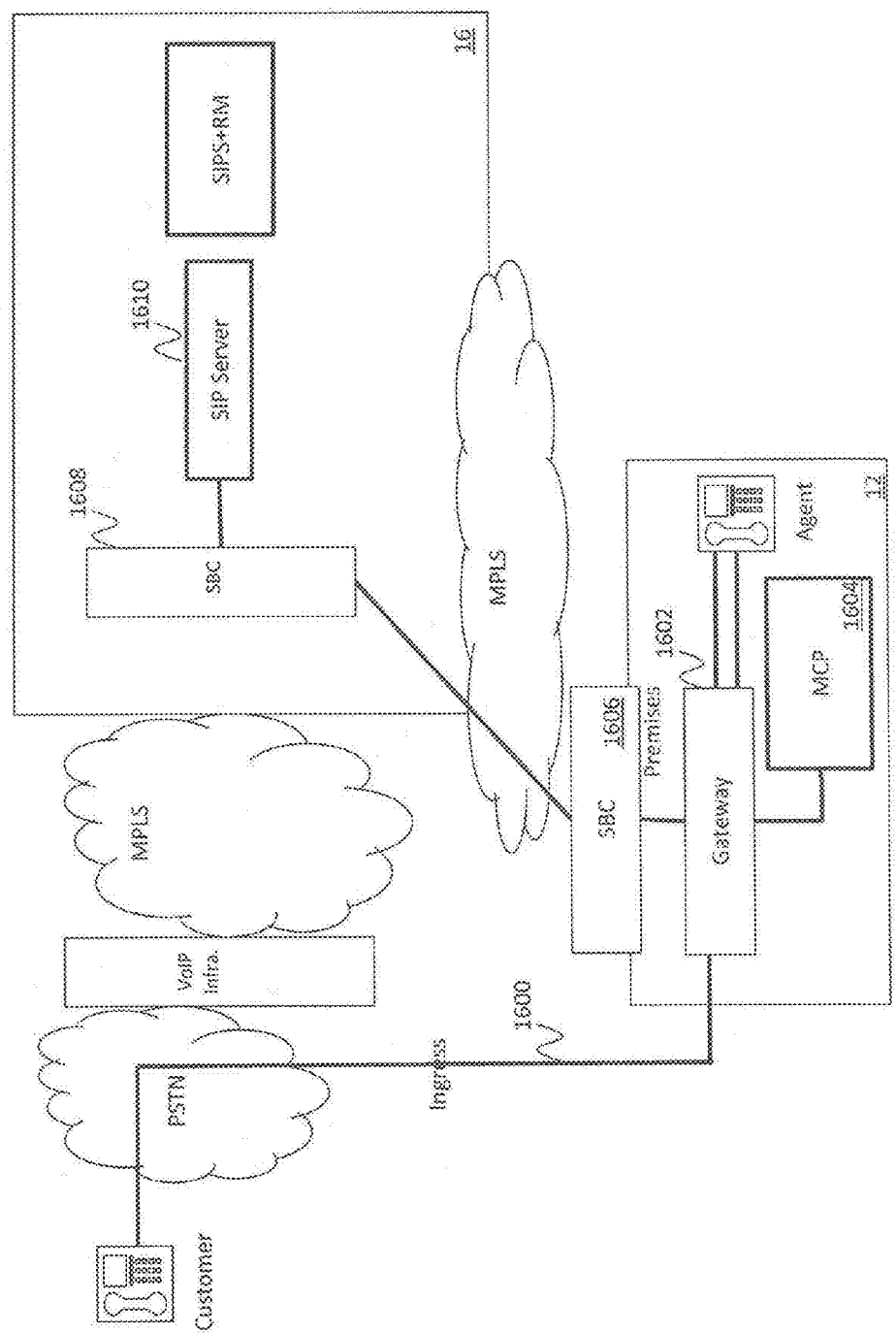
FIG. 25 is a schematic block diagram of a system for providing contact center services in a hybrid operations environment with a single contact center premise location according to one embodiment of the invention.

FIG. 25 is a schematic block diagram of a system for providing contact center services in a hybrid operations environment with a single contact center premise location according to one embodiment of the invention. The system includes premise appliances at the contact center premise 12 and a remote platform in the remote operations environment 16. In the embodiment of FIG. 25, contact center interactions such as voice or video calls arrive at the contact center premise 12 as, for example, a PSTN call over TDM line 1600. The calls are received via a switch/media gateway (collectively referred to as "gateway") 1602. The gateway 1602 may include a telephony switch configured to function as a central switch for agent level routing within the center. In this regard, the gateway 1602 may include an automatic call distributor, a private branch exchange (PBX), an IP-based software switch, and/or any other switch configured to receive Internet-sourced calls and/or telephone network-sourced calls.

According to one embodiment, rather than processing the interactions at the premise, the calls are directed to the remote operations environment 16 for processing. As discussed above, the remote operations environment 16 may be operated by a different party, such as, for example, a service provider, and/or be part of a different security domain. In this regard, the switch/gateway 1602 invokes a SIP server 1610 at the remote operations environment 16 for causing the interactions to be processed. Signaling between the gateway 1602 and the SIP server 1610 is via edge devices 1606, 1608 at the contact center premise and the remote operations environment, respectively. Each edge device may take the form of, for example, a session border controller (SBC) conventional in the art. According to one embodiment, one or more resources at the remote operations environment may invoke one or more local resources at the contact center premise 12 to process one or more aspects of the interactions. For example, a media server 1604 may be deployed at the contact center premise 12 to provide media services such as voice/video announcements, media mixing, conferencing, recording, and similar media functions. By distributing the processing in such a manner, the overall contact center can accrue a number of benefits ranging from reductions in network requirements for media traffic, additional security by maintaining the media local to the contact center, optimizing of traffic flow, and the like.

The embodiment of FIG. 25 illustrates a single premise scenario where the contact center tenant operates a single contact center premise. The overall topology may be more complicated in a multi-site environment where the tenant utilizes multiple contact center premises due to resources being distributed between two or more of those contact center premises. In order to provide security and separation between the two contact center premises, appropriate security devices such as session border controllers (SBCs) (generally referred to as edge devices) may be deployed. SBCs may provide a variety of benefits in a voice-over-IP architecture. In the various embodiments, the term SBC and edge device are used interchangeably.

One common benefit provided by a traditional SBC is topology hiding of the underlying environment. That is, the SBC hides details about the underlying network of the contact center premise including the geographic location and configuration of the components at the contact center premise. Topology hiding may occur, for example, by modifying (e.g. rewriting) SIP messages transmitted by the components at the contact center premise and hiding (e.g. by removing) information indicative of location or topology of the underlying network.

Topology hiding within a single contact center site may be inconsequential. However, topology information may be important in a multi-site environment in order to optimize media processing in order to provide differentiation between the different operations environments as well as different contact center premise sites.

Figure 26:
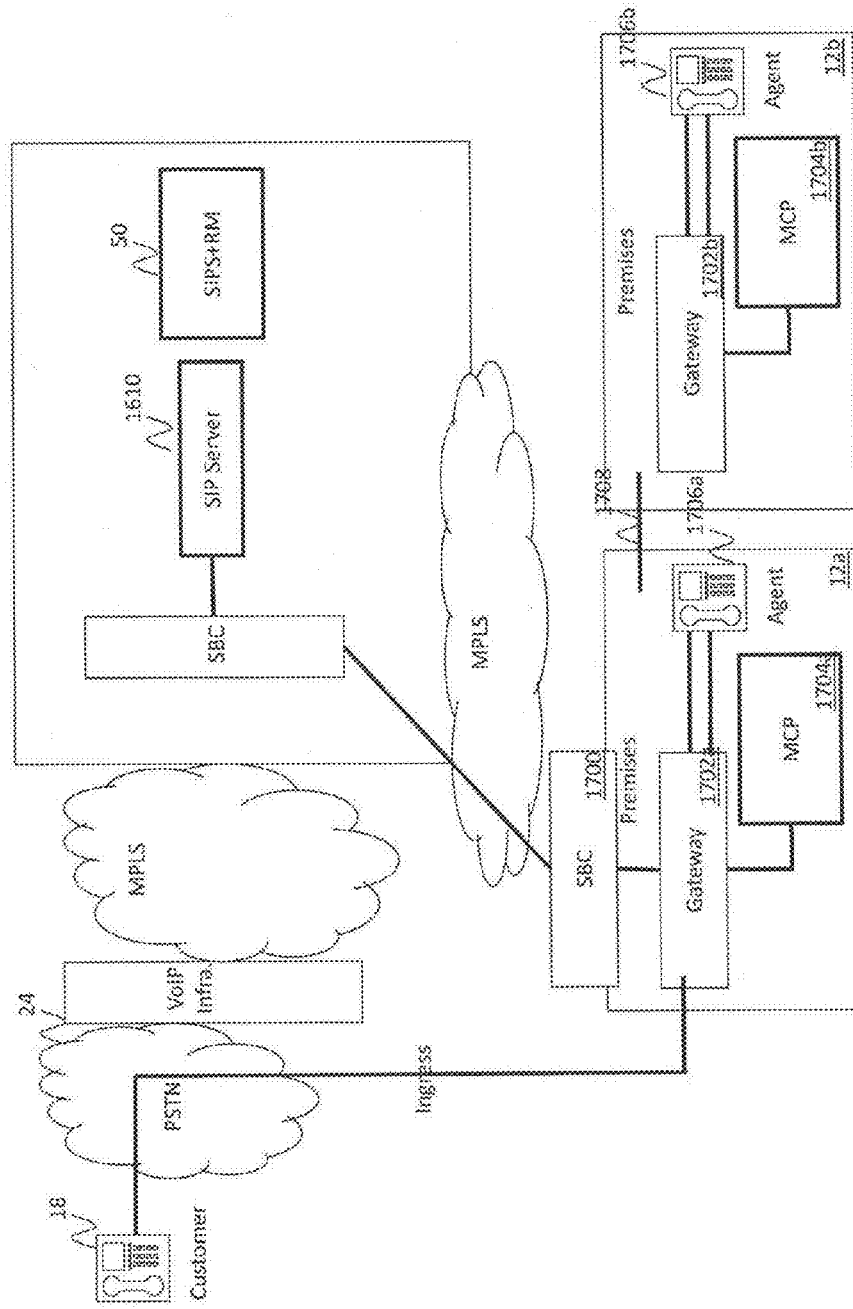
FIG. 26 is a schematic block diagram of a system for providing contact center services in a hybrid operations environment with multiple contact center premise locations according to one embodiment of the invention.

FIG. 26 is a schematic block diagram of a system for providing contact center services in a hybrid operations environment with multiple contact center premise locations according to one embodiment of the invention. According to the embodiment of FIG. 26, a contact center tenant operates a multi-site operations environment including a first contact center premise 12a and a second contact center premise 12b. A resource at the first contact center premise 12a may communicate with another resource at the second contact center premise 12b over data link 1708. In the embodiment, of FIG. 26, a single edge device, such as, for example, a single SBC 1700 is provided through which the resources in both contact center premises communicate with resources in the remote operations environment 16. Although contact center services can be provided from the two premise locations, the overall topology is hidden by the single SBC 1700.

According to one embodiment, a control message transmitted by a resource in the first or second contact center premise 12a, 12b, is forwarded to the SIP server 1610 in the remote computing environment 16 for invoking a particular contact center service. For example, the message may be transmitted by an agent end device, such as, for example, an agent computer or SIP phone. The message may adhere to a voice-over-IP protocol such as, for example, the SIP protocol. The message is forwarded to the SIP server 1610 by the SBC 1700. According to one embodiment, the SBC 1700 hides from the message identification of a location of the resource transmitting the message, and forwards the message (modified by the SBC so that the location of the resource is not visible) to the SIP server 1610.

According to one embodiment, the SIP server 1610 maintains a mapping of resources to the contact center premise/location to which the resources belong. The resources for which location information is maintained may be physical devices (e.g. media servers, gateways, edge devices). The resources may also be agents who may be identified based on telephone numbers to which the agents are logged. For example, the SIP server 1610 may group/associate the SBC 1700, media gateway 1702a, media server 1704a, and agent phone 1706a with the first contact center premise 12a and its geographic location, while media gateway 1702b, media server 1704b, and agent phone 1706b may be grouped/associated with the second contact center premise 12b and its geographic location. As a person of skill in the art should understand, any number of groupings with any combination of media gateways, SBCs, phones, terminals, media servers, and the like, may be created. According to one embodiment, the configuration of the SIP server 1610 with such mapping information may be done by an administrator upon accessing, for example, web-based interfaces.

According to one embodiment, the SIP server receives the modified message from the SBC 1700 and retrieves identification information from the message to automatically associate the message to a specific location and location resources. The identification information may be contained in one or more fields, including custom fields, of a SIP REGISTER message, SIP INVITE message, SIP SUBSCRIBE/NOTIFY message, and/or the like. The identification information may be information typically used for identifying a device, such as, for example, a telephone number or IP address. For example, an IP address of the resource in a location header of a SIP REGISTER message may be used to map the resource to a specific location. Any other metadata associated with the device may be inserted into the message and used as identification information for identifying a location. The metadata may relate to capabilities supported by the device, such as for example, a codec supported by the device. The metadata may also be custom information explicitly configured by a user. For example, data such as "Los Angeles" may be inserted into a custom field of the message and retrieved by the SIP server to identify the device's location.

As a person of skill in the art should appreciate, the identification information contained in one or more fields of the SIP message allow the location of the resource transmitting the message to be exposed to the SIP server 1610 despite the topology hiding by the SBC 1700. According to one embodiment, the identification information may be encoded to allow the information to be preserved when passing through the SBC. The location information may then be used by the SIP server 1610 to select a second resource that allows a contact center service to be provided in an optimized manner. The optimization may be in terms of cost, bandwidth use, and the like.

According to one embodiment, inbound services may be optimized to ensure that the correct media resource at the appropriate contact center premise is used to minimize traffic of real-time media when providing the inbound service. Inbound services may include for example, providing music-on-hold while a call is routed to an agent, conferencing services, call recording services, and the like. For example, assume a call from a caller using the end device 18 arrives at gateway 1702a from the PSTN 24 and is subsequently delivered to the agent phone 1706b at premise 12b. When the caller is put on hold, the SIP server 1610, in conjunction with the resource manager 50, may detect that the call was received by the gateway 1702a at the first contact center premise 12a, and select the media server 1704a at the same premise to provide on-hold music to the caller while the call is transferred. In this manner, RTP traffic is localized to premise 12a and sent over the PSTN 24 instead of traversing the wide area network.

According to one embodiment, in addition to grouping resources based on a particular geographic location, resource grouping may further be segmented based upon specific use cases. For example it may be advantageous for calls arriving at premise 12a to receive media treatments through media server 1704a while it may be more advantageous to invoke the media server 1704b at premise 12b instead of the media server 1704a at premise 12a, for other services, such as, for example, a conference performed between the end user device 18, the agent phone 1706b at premise 12b, and another party also at premise 12b. That is, instead of automatically using resources from a single site to provide a contact center service, the SIP server 1610 may be configured to pick and choose resources from different contact center premises in order to provide the most optimized service. In addition to picking and choosing resources based on the location of those resources, other attributes may also be considered, such as, for example, load experienced by the resources, codec supported by the resources, and/or the like.

The association of resources to geographic locations may also be used for providing outbound services to ensure optimized dialing based upon available media resources. Optimized dialing does not merely take into account basic cost routing considerations, which may determine the contact center site that originate the call, but also the proximity of other elements such as, for example, contact center agents or media services, to perform call progress detection (call analysis) on the call, locally. For example, in the embodiment of a small contact center site where outbound dialing and control occurs via resources in the remote computing environment 16, actual call progress detection may be performed by a media server at an alternate contact center premise rather than locally at a particular contact center premise where agents may be located. One reason for this may be in order to not tie up resources, such as, for example media servers, trunking resources, and the like, of the local premise site with such call progress detection service. The alternate site may be a centralized location with a larger pool of resources which may be configured to provide call progress detection services to multiple contact centers.

If the outbound call is to be placed using local resources in the multi-site environment of FIG. 26, the selection of which gateway to use for making the outbound call, for example, gateway 1702a or 1702b, may depend on configuration and other relevant factors such as, for example, costs, overall network topology, and the like. For example, gateway 1702a at premise 12a may be used if the outbound call can be dialed as a local call instead of using gateway 1702b, which may cause the outbound call to be dialed as a long distance call. In this regard, the resource manager 50 along with SIP server 1610 may be configured to determine resource availability of local media services and capabilities prior to placing and allocating/reserving appropriate resources at the appropriate contact center premise prior to the outbound call being placed.

Figure 27:
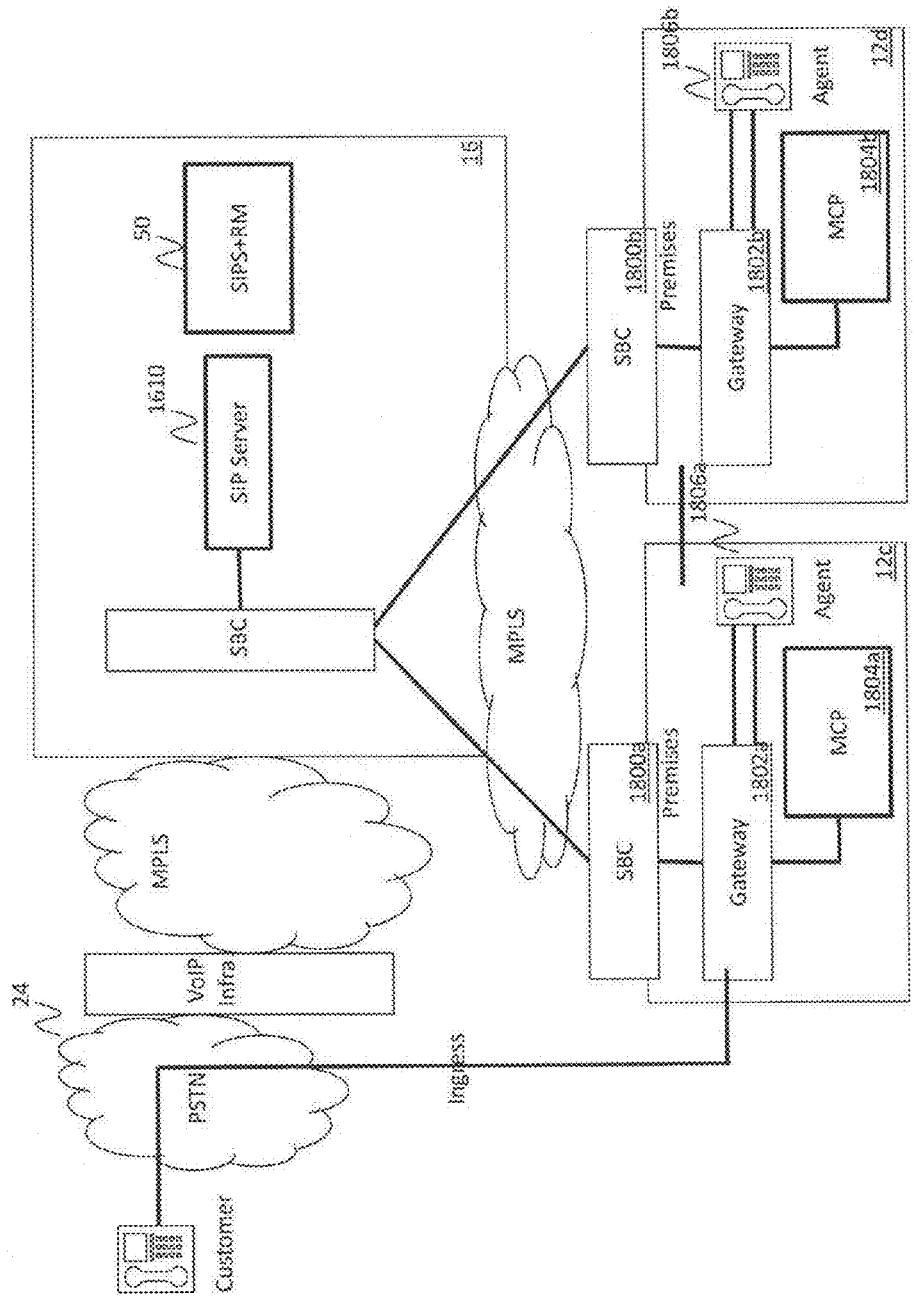
FIG. 27 is a schematic block diagram of a system for providing contact center services in a hybrid operations environment with multiple contact center premise locations according to another embodiment of the invention.

FIG. 27 is a schematic block diagram of a system for providing contact center services in a hybrid operations environment with multiple contact center premise locations according to another embodiment of the invention. According to the embodiment of FIG. 27, the contact center tenant operates a multi-site operations environment including a third contact center premise 12c and a fourth contact center premise 12d. The multi-site operations environment has also a multi-site configuration with multiple SBCs 1800a, 1800b. According to one embodiment, each contact center premise location and the corresponding set of resources are uniquely associated with its own SBC instance. For example, media gateway 1802a, media server 1804a, and agent phone 1806a may be grouped together and/or associated with SBC 1800a and also associated with the third contact center premise 12c, while media gateway 1802b, media server 1804b, and agent phone 1806b may be grouped together and/or associated with SBC 1800b and also associated with the fourth contact center premise 12d. In the embodiment of FIG. 27, the topology information of resources behind a particular SBC may be hidden by the particular SBC. However, as in the embodiment of FIG. 26, information passed in messages transmitted by each SBC 1800a, 1800b, allow the SIP server 1610 to map the source transmitting each message, to a particular geographic location, despite the topology hiding by each of the SBCs 1800a, 1800b.

Figure 28:
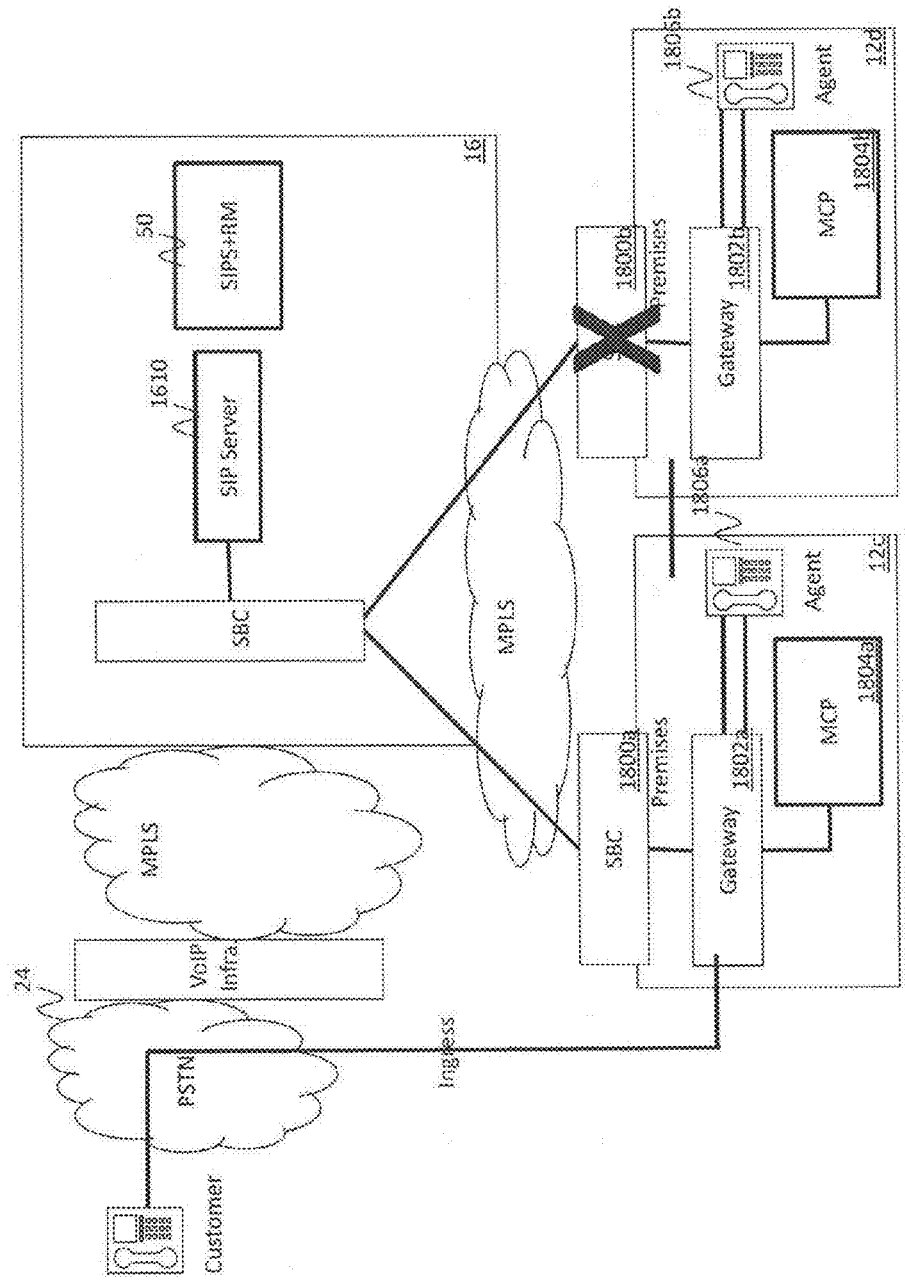
FIG. 28 is a schematic block diagram of the hybrid operations environment of FIG. 27 graphically depicting a situation where there is failure of an edge device according to one embodiment of the invention.

FIG. 28 is a schematic block diagram of the hybrid operations environment of FIG. 27 graphically depicting a situation where there is failure of the SBC 1800b in the fourth contact center premise 12d. In conventional systems, failure of the SBC 1800b may result in loss of visibility of the set of resources in the fourth contact center premise. Thus, in the example of FIG. 28, gateway 1802b tries to communicate via SBC 1800b and realizes that the SBC is non-responsive. The gateway 1802b then starts communicating with backup SBC 1800a which is functional. A control message transmitted via gateway 1802b traverses SBC 1800a and reaches the SIP server 1610. In traditional scenarios, because the SBC transmitting the message is associated with the third contact center premise 12c, the fact that the message actually originated from a resource in the fourth contact center premise 12d, is lost. Such information, however, may be desirable in deciding which other resource at which geographic location to invoke in order to optimize the rendering of contact center services.

To address the challenges exemplified via the embodiment of FIG. 28, an approach similar to the approach described with respect to the embodiment of FIG. 26 is utilized, where the association of resources is not dependent on a particular SBC. Thus, failure scenarios may be appropriately handled as contact center premise sites and associated site elements (media gateways, SBCs, media services, phones, etc.) may be uniquely identified without directly relying on the SBC to manage the unique associations. The identification of resources and their geographic locations may be via information contained in the control messages transmitted by the resources as described above with respect to FIG. 26. Thus, in the example of FIG. 28, the SIP server 1610 retrieves identification information from the message transmitted by the gateway 1802b and associates the message to the fourth contact center premise 12d despite the fact that the message was sent by SBC 1800a in the third contact center premise. An appropriate resource may then be selected based on the knowledge of the actual location for the resource transmitting the message. For example, knowledge of the message initiating from premise 12d may cause selection of agents logged onto devices in premise 12d. In another example, knowledge of the message initiating from premise 12d may cause selection of a media script for an IVR self-service system that is different than the media script used by an IVR self-service system for messages initiating from the premise 12c.

Embodiments of the present invention are naturally extensible to any number of customer (premise) locations which may exist and is capable of handling scenarios where any number of SBCs may be deployed to provide topology hiding within the local operations environment, while, at the same time, continuing to operate properly and continuing to manage the control and association of resources, even in the event of a failure of one or more SBCs (provided that there continues to be appropriate data network connectivity between the various operations environments).

Figure 29:
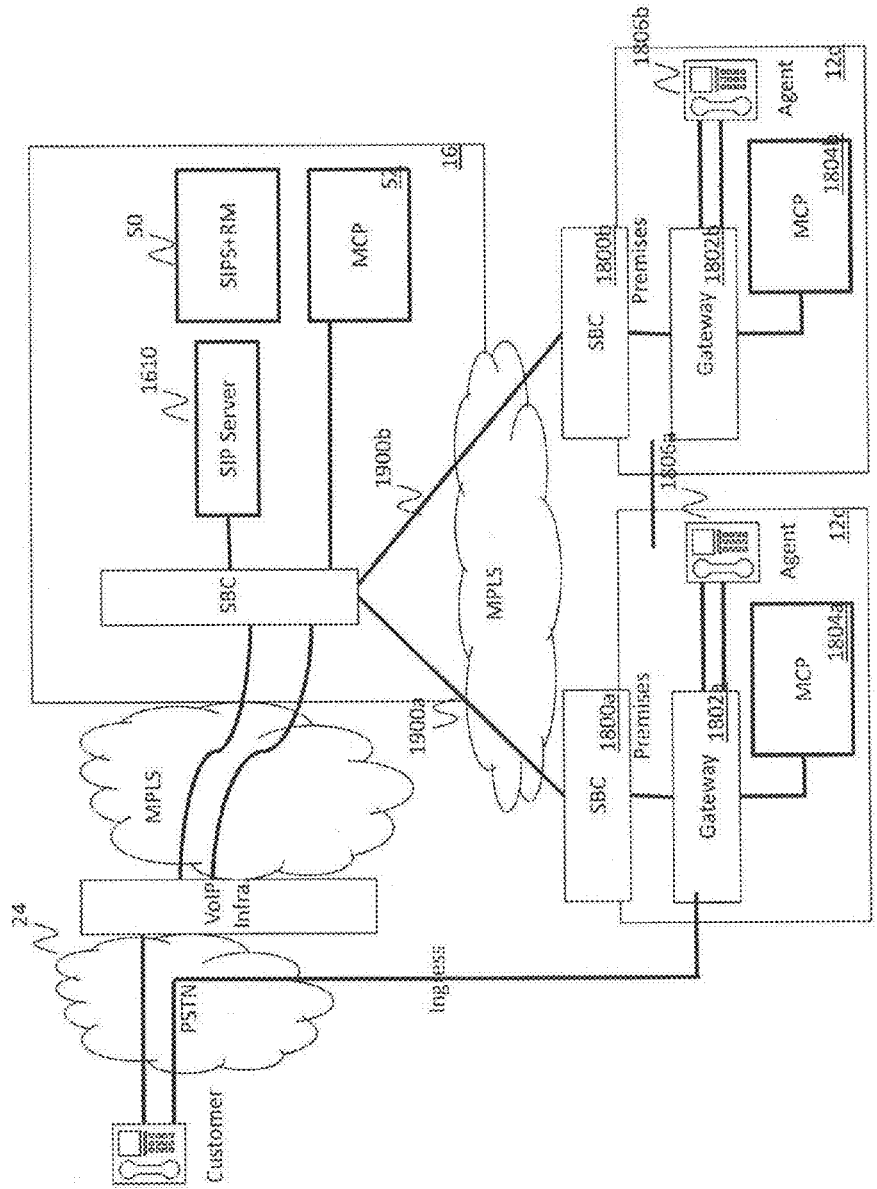
FIG. 29 is a schematic block diagram of a hybrid operations environment according to another embodiment of the invention.

FIG. 29 is a schematic block diagram of a system for providing contact center services in a hybrid operations environment according to another embodiment of the invention. The diagram illustrates multiple operations environments where interactions are received by both the contact center premise, such as, for example, the third contact center premise 12c, as well as the remote operations environment 16. Such a model may be supported for a single contact center tenant where the overall topology may utilize a mix of resources between the contact center operations environment and remote operations environment for media processing.

Interactions such as voice calls may either be directed directly to the remote operations environments 16 or overflow from the customer premise environment under a number of conditions. When this occurs, the remote operations environment is configured to behave as another contact center site. Specifically, interactions are configured to utilize localized media services based upon their specific needs and ingress functions on behalf of a customer. According to one embodiment, the specific resources that are utilized are determined by the system dynamically based upon a wide variety of criteria which may include real-time systems load, bandwidth, capability set, costs, and the like. For example if there is inadequate bandwidth to deliver the calls to specific contact center sites, the SIP server 1610, together with the resource manager 50, may take this into account and only make a subset of agents available to take calls. For example, if there is inadequate bandwidth over link 1900*a* to the third contact center premise 12*c*, the SIP server may be configured to direct all traffic over link 1900*b* to agents logged onto the fourth contact center premise 12*d*. In another example, if no agents are available, or there is insufficient bandwidth to communicate with either contact center premise, the media server 52 in the remote operations environment 16 may be invoked to prompt callers to leave a phone number for a callback.

As a person of skill in the art should appreciate, the interactions which are received by the remote operations environment are capable of utilizing a common (single) control layer ensuring transparent service delivery (which includes transparent reporting and other functions) irrespective of the topology model and variation in the location of the service elements. As a person of skill in the art should also appreciate, devices such as the SBC, media gateway, or SIP server may have overlapping functionalities allowing each device to be replaced by one of the other devices.

X. Dynamic Selection of a Dial Plan

Figure 30:
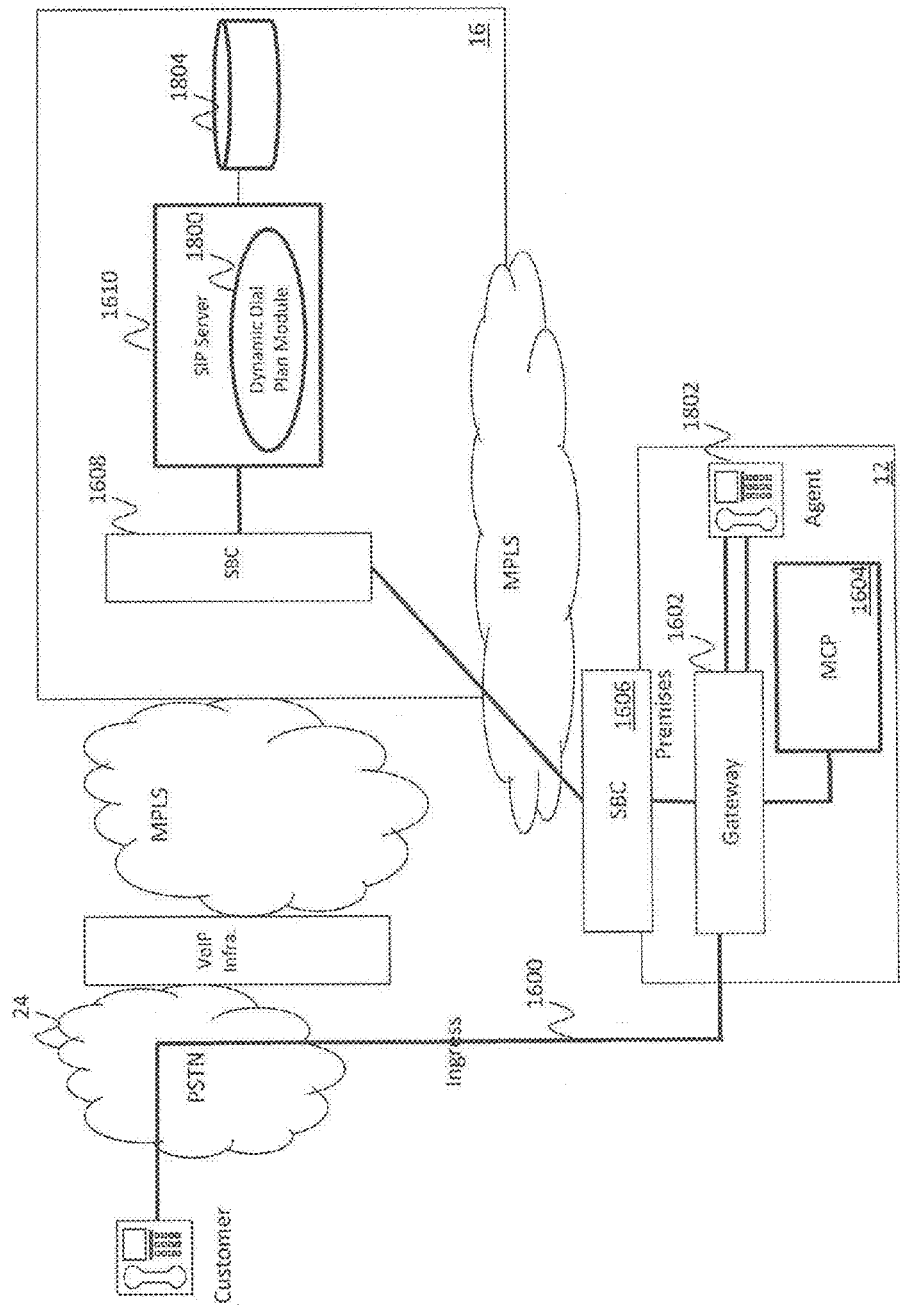
FIG. 30 is a schematic block diagram of a hybrid operations environment supporting dynamic selection of a dial plan according to one embodiment of the invention.

FIG. 30 is a schematic block diagram of a hybrid operations environment supporting dynamic selection of a dial plan according to one embodiment of the invention. A dial plan typically identifies certain sequence of digits that should be dialed by a caller using his telephony device in order to access specific telephone networks or activate specific telephone system features. For example, a dial rule included in dial plan may state that the digit "9" needs to be dialed prior to dialing an external number. Another dial rule may state that the digit "8" needs to be dialed prior to dialing an internal number. The dial plan along with the various dialing rules may be stored in a mass storage device 1804 in the remote computing environment 16 as, for example, configuration information for a particular contact center tenant. The dial plan may be accessed by, for example, the SIP server 1610 in determining which dial rules to apply to manage a call.

According to one embodiment, instead of selecting a dial rule within a particular dial plan (generally referred to as "selecting the dial plan") based on expressly entered digits on a telephony device, the SIP server is configured to dynamically select the dial plan based on state/context of an agent and/or call. The context may include information obtained from components in the remote computing environment 16 and/or contact center premise 12, such as, for example, real-time information from an agent device (e.g. telephone, desktop, etc.) 1802. In this regard, the SIP server 1610 includes a dynamic dial plan module 1800 configured to determine the context and select the appropriate dial plan. The dynamic dial plan module 1800 may be a software module stored in memory and executed by a processor in the remote operations environment 16. Of course, the module 1800 may be hosted by any other server in any other environment including the contact center premise 12.

According to one embodiment, the dynamic dial plan module 1800 is configured to identify the context and classify a call as private, business, or the like. A private call may be a call placed by an agent when not logged onto an agent phone or not in a specifically defined work state (e.g. a ready state). For example, the dynamic dial plan module 1800 may identify that the agent is not currently logged onto the agent device 1802 when the agent initiates a new call. In this case, the module may classify the call as a private call.

In another example, the dynamic plan module may identify that an agent is currently logged onto the agent device 1802 and is actively engaged in a call when the agent initiates a new call. The new call may be to transfer the current call to another agent. In this case, the module may classify the new call as a business call. In addition to classifying the call as a business call, the dynamic dial plan module 1800 may be configured to engage in other classifications based on, for example, customer attributes, call attributes, and/or the like. Customer attributes may be retrieved, for example, from billing or customer relations management (CRM) databases maintained in the mass storage device 1804. Call attributes may be gathered by the media gateway 1602 and/or other components, such as, for example, an IVR server collecting information on menu selections made by the caller.

According to one embodiment, the dynamic dial plan module may dynamically identify the context and select a dial plan to cause a call to, for example, be routed differently, have access to different phone numbers, and/or enable/disable specific telephony features and/or telephone networks. For example, if a call is classified as a private outbound call, a dial plan may be selected which causes the module to transmit a message to route the call to a different trunk. For example, the message may cause the call to be routed to a resource located in the contact center premise as opposed to routing the call to a resource in the remote operations environment 16. The resource in the contact center premise may be a billing/accounting server that keeps track of all personal calls made by the agents for billing purposes. The selected dial plan may also enable all local phone numbers but disable any long distance numbers.

In a specific example, an agent may dial a standard 10 digit number (e.g. 555-555-5555). If the agent is logged onto the agent device 1802, and in a ready state, the dialing may be placed back to the PSTN 24 through the media gateway 1602 and tracked/reported via the SIP server 1610 as a business call. If the agent is not in a ready state, or not logged in, dialing the same number may cause the call to be routed differently as a result of the dynamic dial plan module 1800 categorizing the call as a private call. For example, the call may be sent out on a different trunk through the media gateway 1602 so that different reporting can be provided. This routing may use alternate telephony facilities to access the PSTN 24 which would apply different usage/billing characteristics. The SIP server 1610 may also disallow the specific dialed sequence altogether based upon the context of the interaction.

In another example, if a call is classified as a business outbound call, a dial plan may be selected which causes the call to be routed to resources in the remote operations environment. In addition, the dial plan may enable specific telephone numbers to which a call may be transferred. For example, if upon context recognition the call is classified as relating to a Gold customer, a first dial plan may be selected that enables transfer of the call to, for example, a higher skilled supervisor, whereas if the call is classified as relating to a Bronze customer, the number to the higher skilled supervisor may be blocked, and instead, a number to a lower skilled supervisor enabled.

In a further example, an agent may be configured to answer calls directed to different contact center tenants. Recognition of the tenant to which a current call relates (e.g. based on the number dialed by the customer), may cause selection of a different dialing plan when, for example, transferring the call to another agent. For example, the first agent transferring the call may dial the same digits on his phone, but based on recognition of the specific context (e.g. that the call relates to a specific tenant), a different dial plan may be applied based on the recognition.

Each of the various servers, controllers, switches, gateways, engines, and/or modules in the afore-described figures may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

It is the Applicant's intention to cover by claims all such uses of the invention and those changes and modifications which could be made to the embodiments of the invention herein chosen for the purpose of disclosure without departing from the spirit and scope of the invention. For example, although SIP is used as an exemplary protocol for VoIP communication, a person of skill in the art should recognize that any other VoIP protocol besides SIP may be used, such as, for example, the H.323 protocol. Thus, the present embodiments of the invention should be considered in all respects as illustrative and not restrictive, the scope of the invention to be indicated by claims and their equivalents rather than the foregoing description.

The invention claimed is:

1. A method for optimized rendering of contact center services in a hybrid operations environment comprising:
receiving over a wide area network by a processor in a first operations environment, a message transmitted by a first contact center resource relating to a contact center service, wherein the message is forwarded to the processor by an edge device coupled to a second operations environment different from the first operations environment, the edge device comprising a session border controller configured to hide, from the message, network topology information of the first contact center resource;
retrieving from the message, by the processor, identification information associated with the first contact center resource, the identification information being preserved in the message by the session border controller when the message passes through the session border controller;
identifying, by the processor, a location of the first contact center resource based on the retrieved identification information; and
selecting, by the processor, a second contact center resource based on the identified location of the first contact center resource for providing the contact center service, network topology information of the second contact center resource being hidden from the processor by the session border controller.

2. The method of claim 1, wherein the identification information is at least one of a telephone number or IP address.

3. The method of claim 1, wherein the identification information is metadata specific to the first contact center resource.

4. The method of claim 1, wherein the contact center service is at least one of delivery of real-time media to a target, or recording real-time media exchanged with a target.

5. The method of claim 1 further comprising:
encoding, by the processor, the identification information contained in the message for preserving the information as the message traverses the edge device.

6. The method of claim 1, wherein the first contact center resource is an end device of a contact center agent, and the second contact center resource is a media server configured to provide media services for the contact center.

7. The method of claim 1, wherein the first contact center resource is located in the first operations environment.

8. The method of claim 1, wherein the first and second contact center resources are associated with a third operations environment separate from the first and second operations environments.

9. The method of claim 8, wherein the edge device in the second operations environment is invoked to forward the message transmitted by the first contact center resource in response to a second edge device in the third operations environment being non-responsive.

10. The method of claim 1 further comprising:
maintaining, by the processor, mapping information of contact center resources and corresponding location information; and
retrieving the mapping information for identifying the location of the first contact center resource.

11. A system for optimized rendering of contact center services in a hybrid operations environment comprising:
processor in a first operations environment; and
memory coupled to the processor, wherein the memory has stored therein instructions that, when executed by the processor, cause the processor to:
receive over a wide area network a message transmitted by a first contact center resource relating to a contact center service, wherein the message is forwarded to the processor by an edge device coupled to a second operations environment different from the first operations environment, the edge device comprising a session border controller configured to hide, from the message, network topology information of the first contact center resource;

retrieve from the message identification information associated with the first contact center resource, the identification information being preserved in the message by the session border controller when the message passes through the session border controller;

identify a location of the first contact center resource based on the retrieved identification information; and select a second contact center resource based on the identified location of the first contact center resource for providing the contact center service, network topology information of the second contact center resource being hidden from the processor by the session border controller.

12. The system of claim 11, wherein the identification information is at least one of a telephone number or IP address.

13. The system of claim 11, wherein the identification information is metadata specific to the first contact center resource.

14. The system of claim 11, wherein the contact center service is at least one of delivery of real-time media to a target, or recording real-time media exchanged with a target.

15. The system of claim 11, wherein the instructions further cause the processor to:

encode the identification information contained in the message for preserving the information as the message traverses the edge device.

16. The system of claim 11, wherein the first contact center resource is an end device of a contact center agent, and the second contact center resource is a media server configured to provide media services for the contact center.

17. The system of claim 11, wherein the first contact center resource is located in the first operations environment.

18. The system of claim 11, wherein the first and second contact center resources are associated with a third operations environment separate from the first and second operations environments.

19. The system of claim 18, wherein the edge device in the second operations environment is invoked to forward the message transmitted by the first contact center resource in response to a second edge device in the third operations environment being non-responsive.

20. The system of claim 11, wherein the memory further stores mapping information of contact center resources and corresponding location information, wherein the instructions further cause the processor to:

retrieve the mapping information for identifying the location of the first contact center resource.

* * * * *